(12) United States Patent
Dugat

(10) Patent No.: US 11,981,507 B2
(45) Date of Patent: May 14, 2024

(54) TOTE HANDLING SYSTEM WITH TOTE HANDLER AND METHOD OF USING SAME

(71) Applicant: Robotica, Inc., Cypress, TX (US)

(72) Inventor: Jay Mark Dugat, Cypress, TX (US)

(73) Assignee: Robotica, Inc., Cypress, TX (US)

( * ) Notice: Subject to any disclaimer, the term of this patent is extended or adjusted under 35 U.S.C. 154(b) by 696 days.

(21) Appl. No.: 17/151,567

(22) Filed: Jan. 18, 2021

(65) Prior Publication Data
US 2021/0380338 A1 Dec. 9, 2021

Related U.S. Application Data

(60) Provisional application No. 63/034,105, filed on Jun. 3, 2020.

(51) Int. Cl.
| | |
|---|---|
| *B25J 15/00* | (2006.01) |
| *B25J 9/00* | (2006.01) |
| *B25J 15/08* | (2006.01) |
| *B25J 15/10* | (2006.01) |
| *B25J 19/02* | (2006.01) |
| *B65G 1/10* | (2006.01) |
| *B65G 1/137* | (2006.01) |
| *B65G 47/90* | (2006.01) |

(52) U.S. Cl.
CPC .............. *B65G 1/10* (2013.01); *B25J 9/0093* (2013.01); *B25J 15/08* (2013.01); *B65G 1/1375* (2013.01); *B65G 47/90* (2013.01); *B65G 2201/0258* (2013.01)

(58) Field of Classification Search
CPC ........ B65G 1/10; B65G 47/90; B65G 1/1375; B25J 9/0093; B25J 15/08; B25J 15/10; B25J 15/106

USPC ......................................................... 294/207
See application file for complete search history.

(56) References Cited

U.S. PATENT DOCUMENTS

| | | | |
|---|---|---|---|
| 1,603,633 | A | 10/1926 | Nelson |
| 1,737,762 | A | 12/1929 | Howe |
| 2,590,359 | A | 3/1952 | Zopf |
| 2,993,583 | A | 7/1961 | Sykes |
| 3,104,004 | A | 9/1963 | Poel et al. |

(Continued)

FOREIGN PATENT DOCUMENTS

| | | |
|---|---|---|
| CN | 102079407 B | 2/2014 |
| DE | 20314281 | 12/1971 |

(Continued)

*Primary Examiner* — Paul T Chin
(74) *Attorney, Agent, or Firm* — Victor H. Segura

(57) ABSTRACT

A tote handling system and method of handling items includes a tote and a grip hand. The tote includes a tote frame including walls extending above a bottom to define a chamber shaped to receive items. The bottom and/or walls include tool reliefs secured to a wall. The tool reliefs are in an aligned positioned parallel to each other with a tool receptacle defined between the tool reliefs. The tool receptacles are shaped to receive the fingers of the grip hand therethrough for engagement with the items in the chamber. The grip hand includes a bearing movably supported by a robot, a base slidably movable along the bearing, and finger assemblies supported by the base. The finger assemblies are movable by actuators towards a closed position with fingers of the finger assemblies together and an open position with the fingers apart.

27 Claims, 44 Drawing Sheets

(56) References Cited

U.S. PATENT DOCUMENTS

| | | | |
|---|---|---|---|
| 3,135,049 A | 6/1964 | Daugherty et al. | |
| 3,137,068 A | 6/1964 | Quigley | |
| 3,232,409 A | 2/1966 | Pierson et al. | |
| 3,485,339 A | 12/1969 | Miller et al. | |
| 3,606,058 A | 9/1971 | Davis | |
| 3,668,821 A | 6/1972 | Benson et al. | |
| 3,757,973 A | 9/1973 | Lambert et al. | |
| 3,922,778 A | 12/1975 | Aalpoel | |
| 3,944,054 A | 3/1976 | Ensinger | |
| 4,014,428 A | 3/1977 | Ossbahr | |
| 4,187,755 A | 2/1980 | Shirai | |
| 4,192,496 A | 3/1980 | Baselice et al. | |
| 4,200,178 A | 4/1980 | Gunti | |
| 4,256,213 A | 3/1981 | Shaw et al. | |
| 4,269,302 A | 5/1981 | Garvey | |
| 4,290,617 A | 9/1981 | Yoshida | |
| 4,291,518 A | 9/1981 | Johnson | |
| 4,514,963 A | 5/1985 | Bruno | |
| 4,572,564 A * | 2/1986 | Cipolla | B25J 15/106 294/902 |
| 4,610,596 A | 9/1986 | Bouldin et al. | |
| 4,629,302 A | 12/1986 | Willcox | |
| 4,653,961 A | 3/1987 | Hashimoto | |
| 4,715,488 A | 12/1987 | Hewitt et al. | |
| 4,730,718 A | 3/1988 | Fazio et al. | |
| 4,783,107 A * | 11/1988 | Parker | B25J 15/0004 294/213 |
| 4,804,081 A | 2/1989 | Lenhardt | |
| 4,835,836 A | 6/1989 | Van Uitert | |
| 4,962,841 A | 10/1990 | Kloosterhouse | |
| 5,011,467 A | 4/1991 | Traegaardh | |
| 5,028,181 A | 7/1991 | Jenkins et al. | |
| 5,031,498 A | 7/1991 | Koppel | |
| 5,033,348 A | 7/1991 | Walsh | |
| 5,048,267 A | 9/1991 | Kudo et al. | |
| 5,059,082 A | 10/1991 | Tanttu et al. | |
| 5,101,703 A | 4/1992 | Tanaka et al. | |
| 5,144,789 A | 9/1992 | Focke et al. | |
| 5,150,781 A | 9/1992 | Deisenroth et al. | |
| 5,165,516 A | 11/1992 | Reed et al. | |
| 5,172,804 A | 12/1992 | Chersin | |
| 5,217,110 A | 6/1993 | Spangler et al. | |
| 5,351,809 A | 10/1994 | Gilmore et al. | |
| 5,360,161 A | 11/1994 | Schaller et al. | |
| 5,400,895 A | 3/1995 | Hollingsworth et al. | |
| 5,454,683 A | 10/1995 | Marom et al. | |
| 5,456,348 A | 10/1995 | Whetsel et al. | |
| 5,471,738 A * | 12/1995 | Burcham | B25J 15/0052 294/94 |
| 5,568,857 A | 10/1996 | Chen et al. | |
| 5,649,801 A | 7/1997 | White | |
| 5,699,892 A | 12/1997 | Shyr et al. | |
| 5,718,325 A | 2/1998 | Doster et al. | |
| 5,725,349 A | 3/1998 | Garvey et al. | |
| 5,758,362 A | 6/1998 | Focke et al. | |
| 5,854,460 A | 12/1998 | Graf et al. | |
| 5,862,907 A | 1/1999 | Taylor | |
| 5,911,300 A | 6/1999 | Mraz | |
| 5,931,071 A | 8/1999 | Mori | |
| 5,957,517 A * | 9/1999 | Chen | B25J 15/106 294/87.1 |
| 5,971,132 A | 10/1999 | Bonnet | |
| 5,984,078 A | 11/1999 | Bonnet | |
| 6,005,211 A | 12/1999 | Huang et al. | |
| 6,068,111 A | 5/2000 | Smith et al. | |
| 6,073,747 A | 6/2000 | Takino et al. | |
| 6,189,298 B1 | 2/2001 | Kuji et al. | |
| 6,220,421 B1 | 4/2001 | Hugon et al. | |
| 6,227,377 B1 | 5/2001 | Bonnet | |
| 6,264,042 B1 | 7/2001 | Cossey, Jr. et al. | |
| 6,302,408 B1 | 10/2001 | Zierpka | |
| 6,325,393 B1 | 12/2001 | Chen et al. | |
| 6,457,916 B2 | 10/2002 | Wienhold | |
| 6,471,031 B1 | 10/2002 | Duncalf | |
| 6,514,593 B1 * | 2/2003 | Jones | B29C 66/1122 428/367 |
| 6,516,937 B1 | 2/2003 | Deer | |
| 6,533,096 B2 | 3/2003 | Gilmore et al. | |
| 6,536,580 B1 | 3/2003 | Fritzsche | |
| 6,595,349 B2 | 7/2003 | Macswan | |
| 6,629,018 B2 | 9/2003 | Mondie et al. | |
| 6,629,593 B2 | 10/2003 | Zeitler | |
| 6,694,852 B1 | 2/2004 | Ours et al. | |
| 6,719,119 B1 | 4/2004 | Hendzel et al. | |
| 6,725,631 B2 | 4/2004 | Skrak et al. | |
| 6,725,752 B2 | 4/2004 | Torrazza | |
| 6,782,993 B2 | 8/2004 | Bernard et al. | |
| 6,843,365 B2 | 1/2005 | Baker | |
| 6,907,978 B2 | 6/2005 | Evans et al. | |
| 6,957,736 B2 | 10/2005 | Bonifer et al. | |
| 6,982,731 B2 | 1/2006 | Hall et al. | |
| 7,147,097 B2 | 12/2006 | Lemm | |
| 7,150,383 B2 | 12/2006 | Talken | |
| 7,174,695 B2 | 2/2007 | Porter et al. | |
| 7,182,007 B2 | 2/2007 | Berge et al. | |
| 7,261,198 B2 | 8/2007 | Tatar et al. | |
| 7,308,779 B2 * | 12/2007 | Benz | B65B 5/08 53/247 |
| 7,638,729 B2 | 12/2009 | Park et al. | |
| 7,641,043 B2 | 1/2010 | Vestergaard et al. | |
| 7,690,497 B2 | 4/2010 | Radwallner et al. | |
| 7,720,567 B2 | 5/2010 | Doke et al. | |
| 7,909,153 B2 | 3/2011 | Pogue | |
| 7,963,086 B2 | 6/2011 | Porter et al. | |
| 8,161,854 B2 | 4/2012 | Fourney | |
| 8,463,428 B2 | 6/2013 | Doke et al. | |
| 8,561,790 B2 | 10/2013 | Brayman et al. | |
| 8,684,169 B2 | 4/2014 | Itoh et al. | |
| 8,827,623 B2 | 9/2014 | Stelter et al. | |
| 9,110,773 B2 | 8/2015 | Roush | |
| 9,205,567 B2 * | 12/2015 | Rose | B25J 19/005 |
| 9,216,862 B2 | 12/2015 | Wallace | |
| 9,334,111 B2 | 5/2016 | Hoynash | |
| 9,475,653 B2 | 10/2016 | Dugat et al. | |
| 9,701,490 B2 * | 7/2017 | Morency | B25J 11/00 |
| 9,881,439 B2 * | 1/2018 | Demmeler | B65H 31/3045 |
| 9,926,094 B2 | 3/2018 | Dugat et al. | |
| 9,981,810 B2 | 5/2018 | Dugat et al. | |
| 9,988,218 B2 | 6/2018 | Dugat et al. | |
| 10,232,409 B2 | 3/2019 | Dugat et al. | |
| 10,835,928 B2 | 11/2020 | Bellar et al. | |
| 10,843,876 B2 | 11/2020 | Dugat | |
| 11,186,399 B2 | 11/2021 | Dugat et al. | |
| 11,643,285 B1 * | 5/2023 | Wei | B65G 47/90 414/751.1 |
| 11,836,672 B2 | 12/2023 | Lert, Jr. et al. | |
| 11,845,610 B2 | 12/2023 | Lert, Jr. et al. | |
| 2001/0003939 A1 | 6/2001 | Liu et al. | |
| 2001/0001516 A1 | 8/2001 | Hardgrove et al. | |
| 2002/0134209 A1 | 9/2002 | Burman et al. | |
| 2002/0162302 A1 | 11/2002 | Thomson et al. | |
| 2003/0081228 A1 | 5/2003 | Spaulding et al. | |
| 2003/0150695 A1 | 8/2003 | Cotter et al. | |
| 2004/0194428 A1 | 10/2004 | Close et al. | |
| 2004/0211651 A1 | 10/2004 | Hall | |
| 2004/0226803 A1 | 11/2004 | Brixius et al. | |
| 2004/0250670 A1 | 12/2004 | Porter et al. | |
| 2006/0074525 A1 | 4/2006 | Close et al. | |
| 2006/0206233 A1 | 9/2006 | Carpenter et al. | |
| 2006/0260451 A1 | 11/2006 | Capodieci | |
| 2007/0051585 A1 | 3/2007 | Scott et al. | |
| 2007/0025512 A1 | 6/2007 | Gertsenshteyn et al. | |
| 2007/0125209 A1 | 6/2007 | Hilgendorf | |
| 2007/0125211 A1 | 6/2007 | Hilgendorf | |
| 2007/0125212 A1 | 6/2007 | Hilgendorf | |
| 2007/0162174 A1 | 7/2007 | Doke et al. | |
| 2007/0163099 A1 | 7/2007 | Townsend et al. | |
| 2007/0221471 A1 | 10/2007 | Fourney et al. | |
| 2008/0169171 A1 | 7/2008 | Itoh et al. | |
| 2009/0065327 A1 | 3/2009 | Evangelista et al. | |
| 2009/0113853 A1 | 5/2009 | Porter et al. | |
| 2010/0272961 A1 | 10/2010 | Costin, Jr. | |

(56) References Cited

U.S. PATENT DOCUMENTS

| | | | |
|---|---|---|---|
| 2011/0268548 A1* | 11/2011 | Doll | B25J 15/00 |
| | | | 414/688 |
| 2014/0041989 A1 | 2/2014 | Wallace | |
| 2014/0290827 A1 | 10/2014 | Heeman et al. | |
| 2014/0346008 A1 | 11/2014 | Hoynash | |
| 2021/0380338 A1 | 12/2021 | Dugat | |
| 2021/0380341 A1 | 12/2021 | Dugat | |

FOREIGN PATENT DOCUMENTS

| | | | |
|---|---|---|---|
| DE | 2259273 C2 | 8/1984 | |
| DE | 19724040 C2 | 7/1999 | |
| EP | 1329388 B1 | 6/2006 | |
| JP | 2000343486 A | 12/2000 | |
| JP | 2002002636 A | 1/2002 | |
| JP | 2003081228 A | 3/2003 | |
| WO | 2006025868 A1 | 3/2006 | |

* cited by examiner

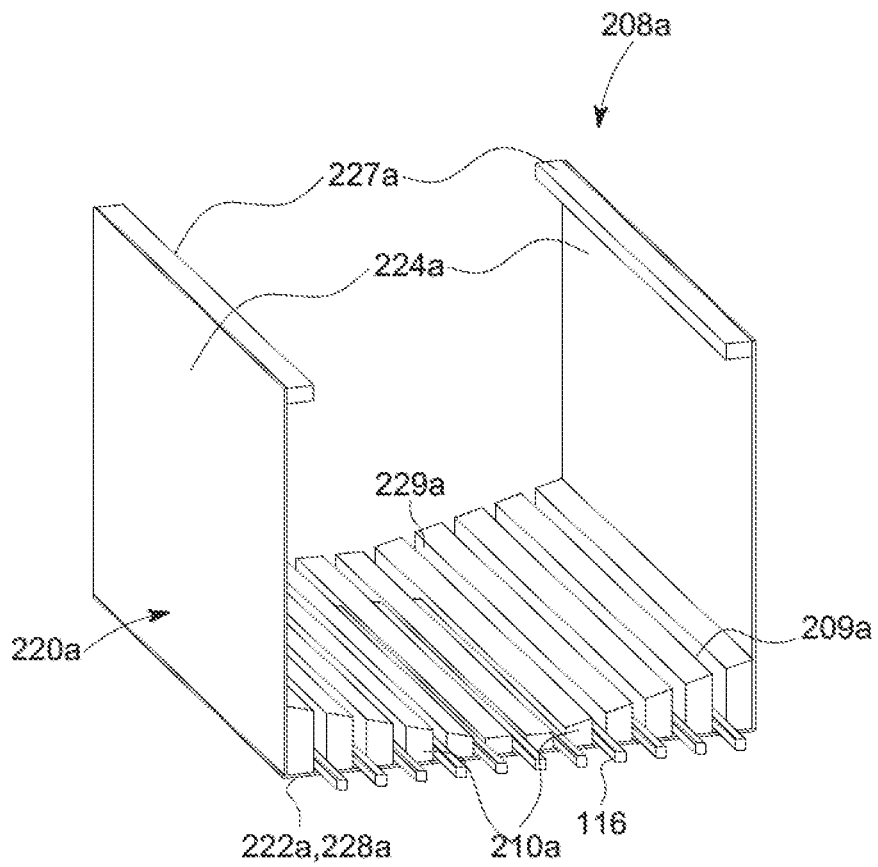
FIG. 2A
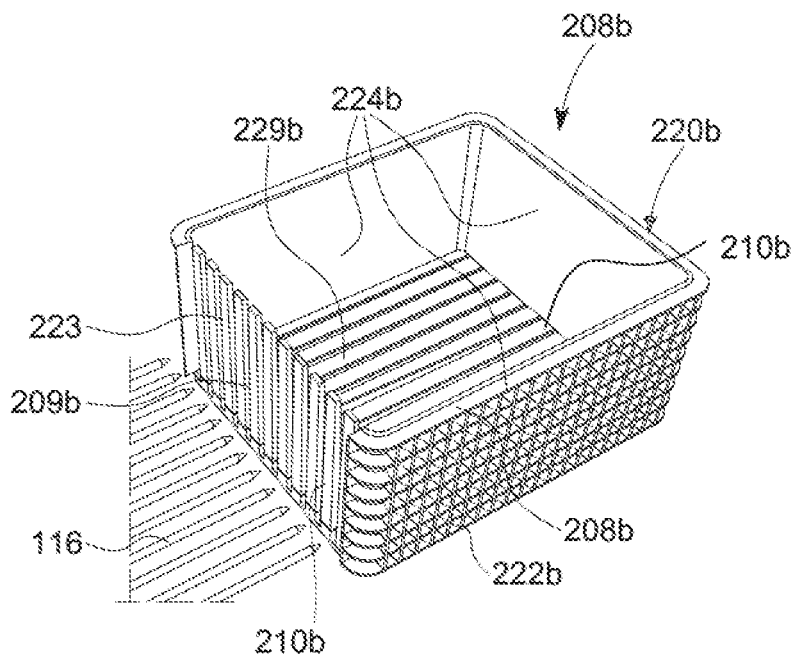
FIG. 2B1

FIG. 2B2

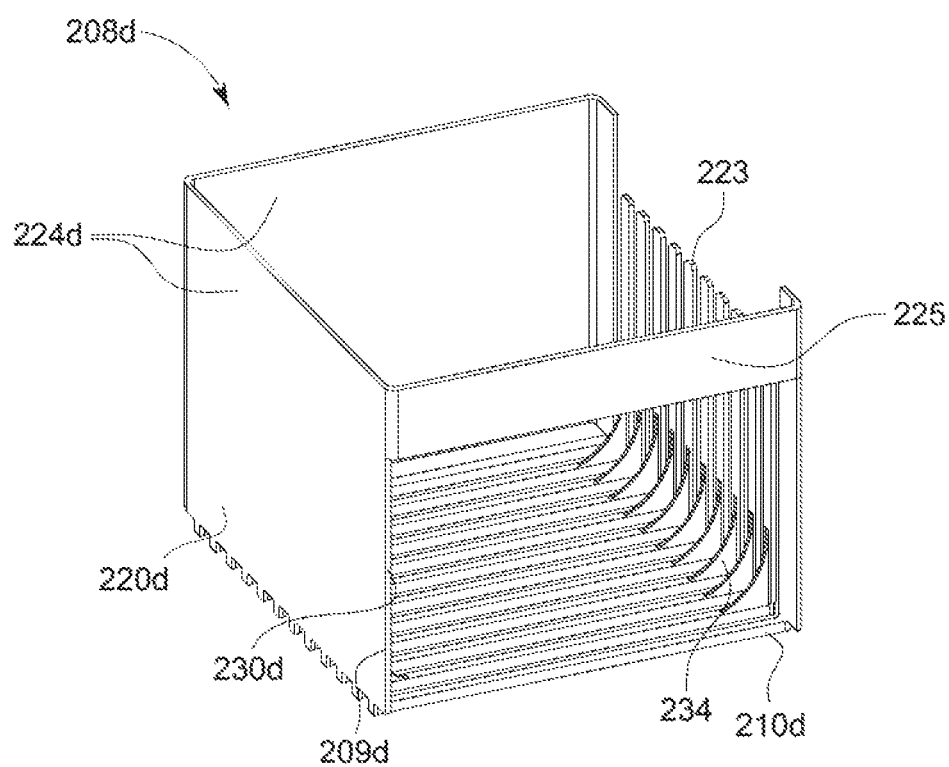
FIG. 2D1
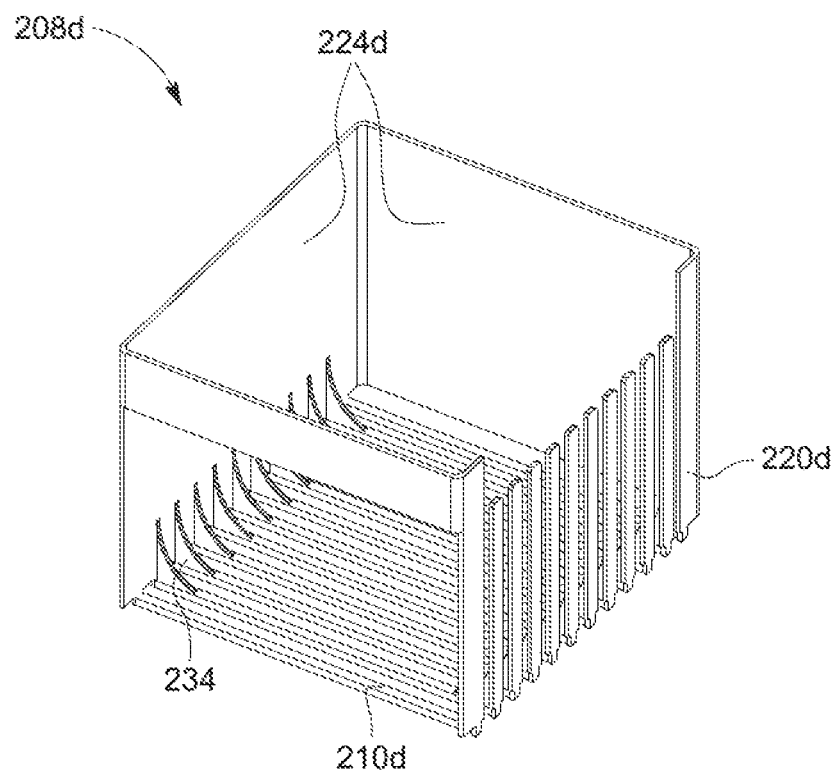
FIG. 2D2

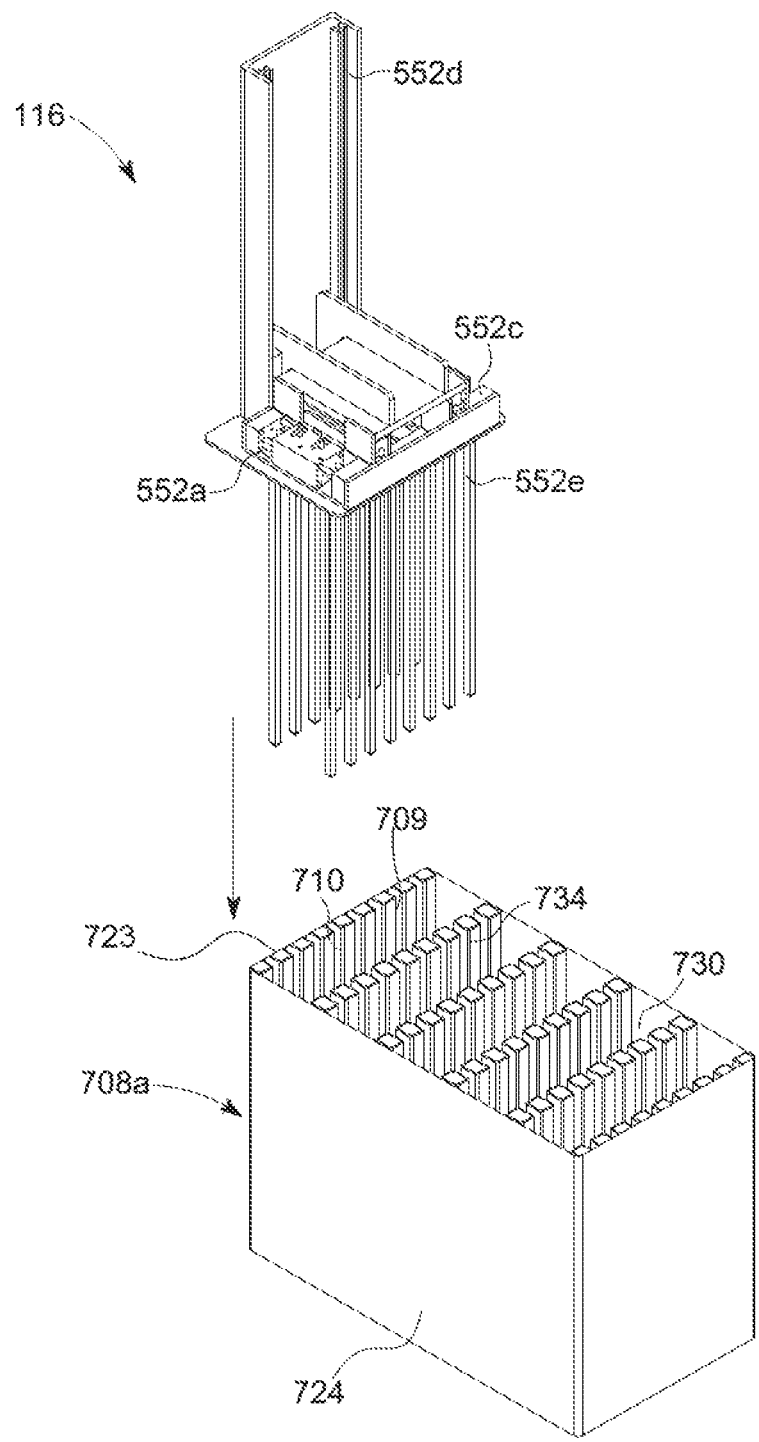
FIG. 7A1

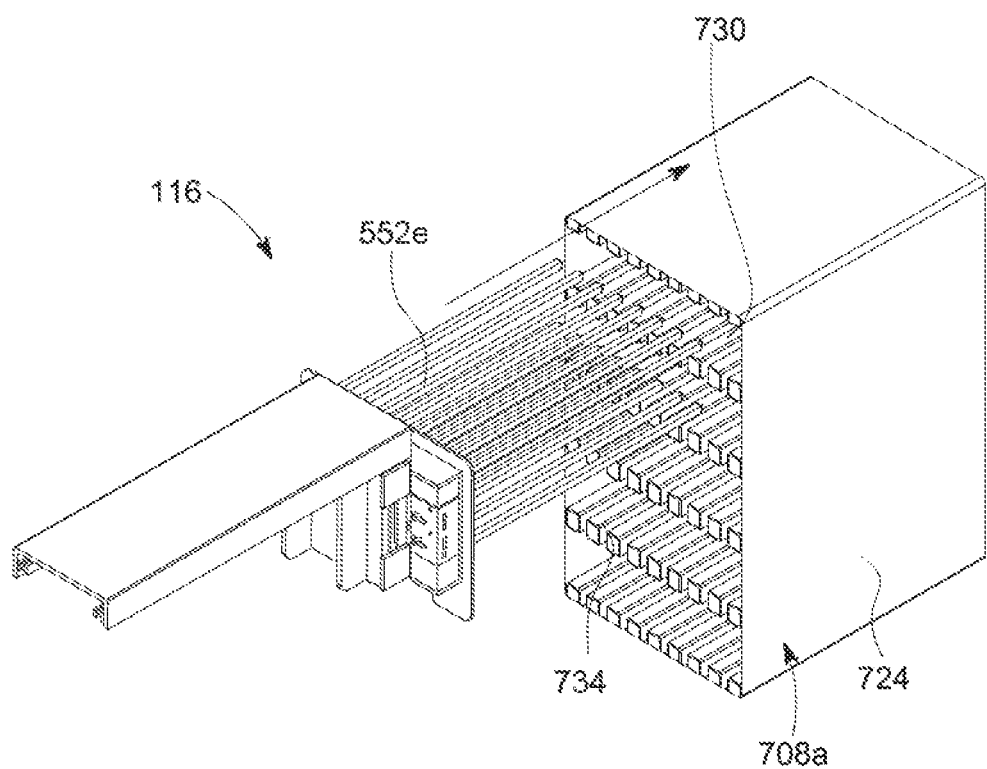
FIG. 7A2

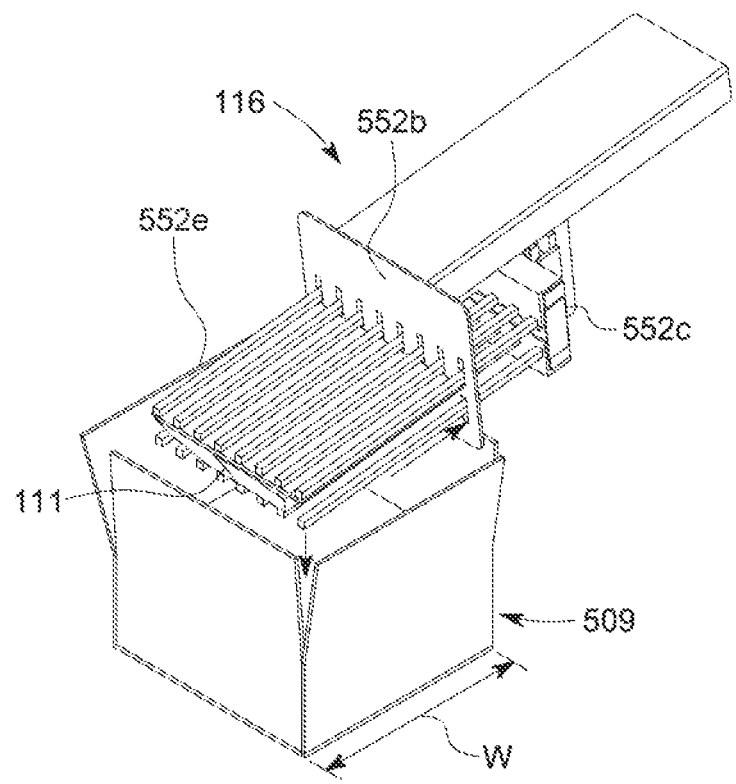
FIG. 7D1
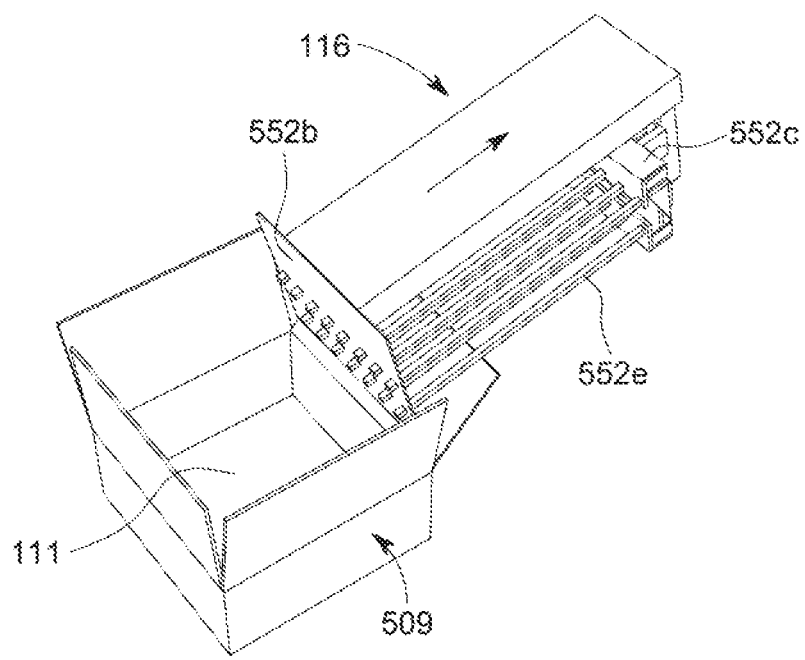
FIG. 7D2

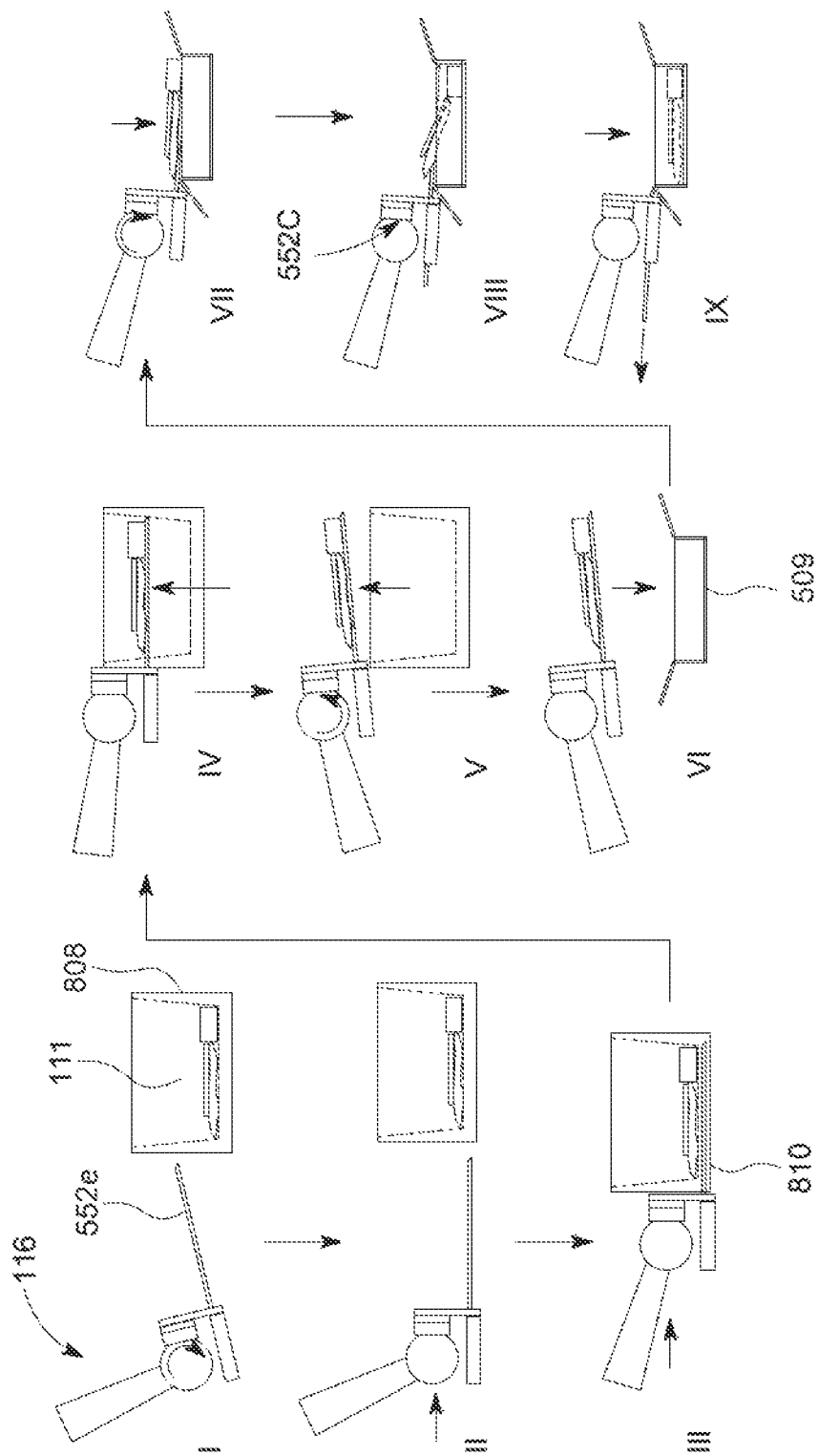

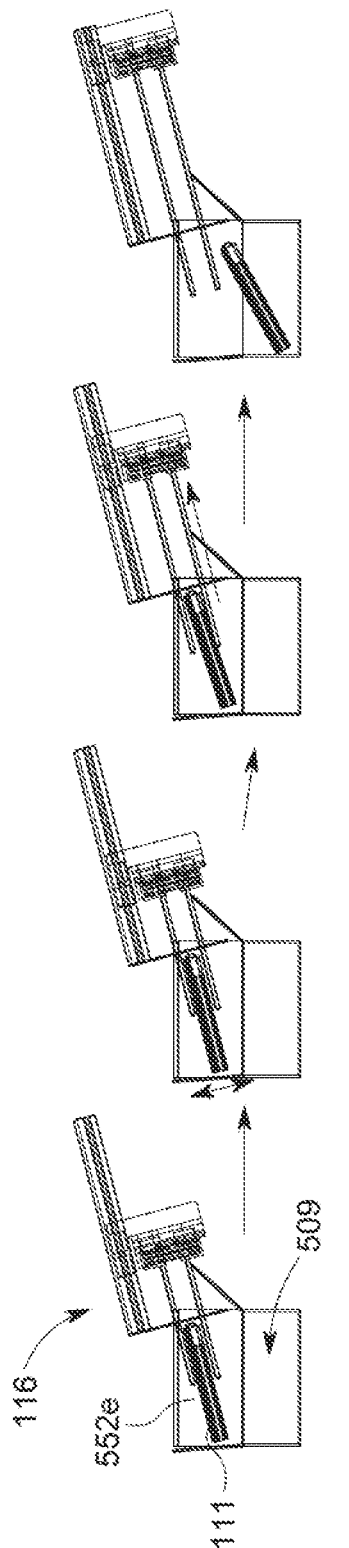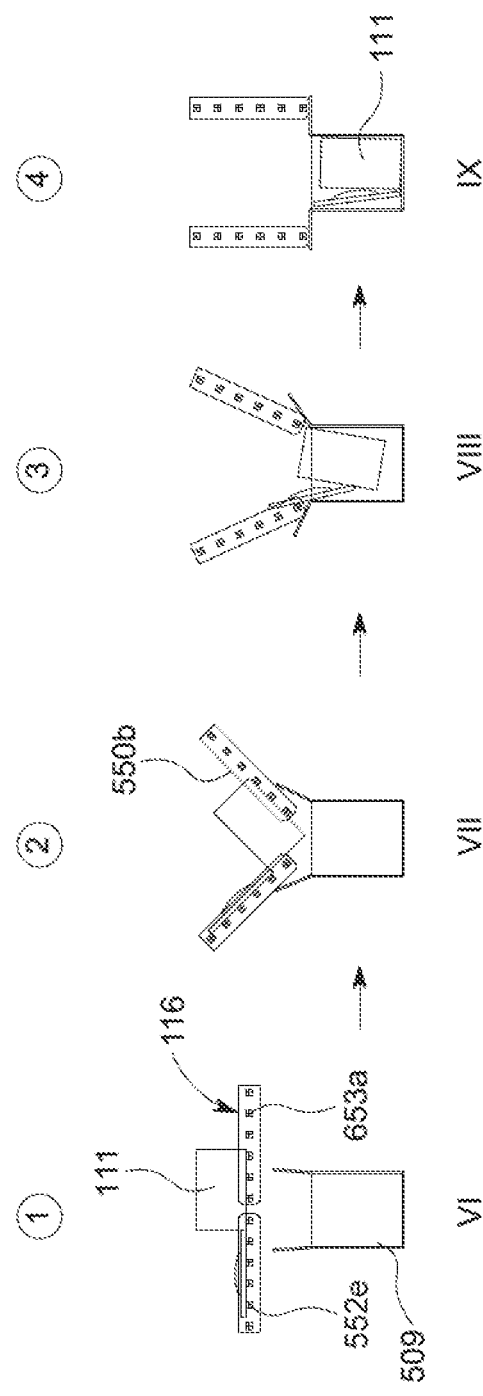
FIG. 8B
FIG. 8C

FIG. 9B1

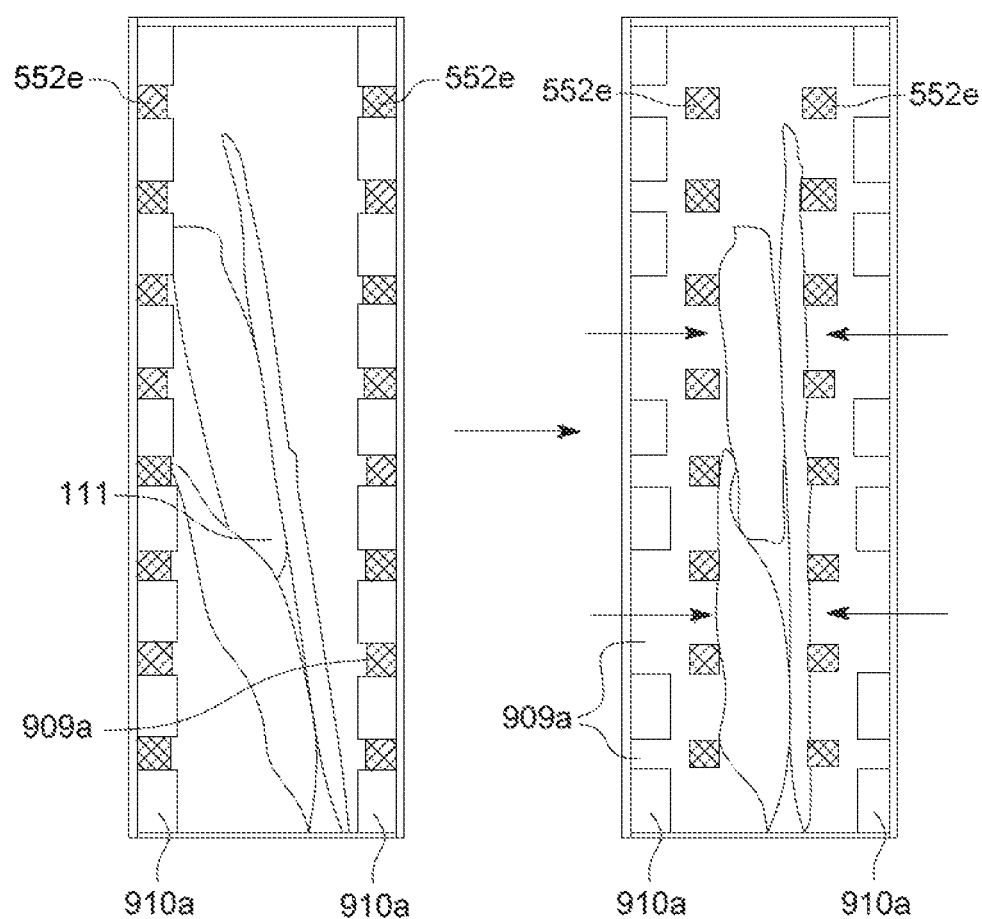
FIG. 9B2

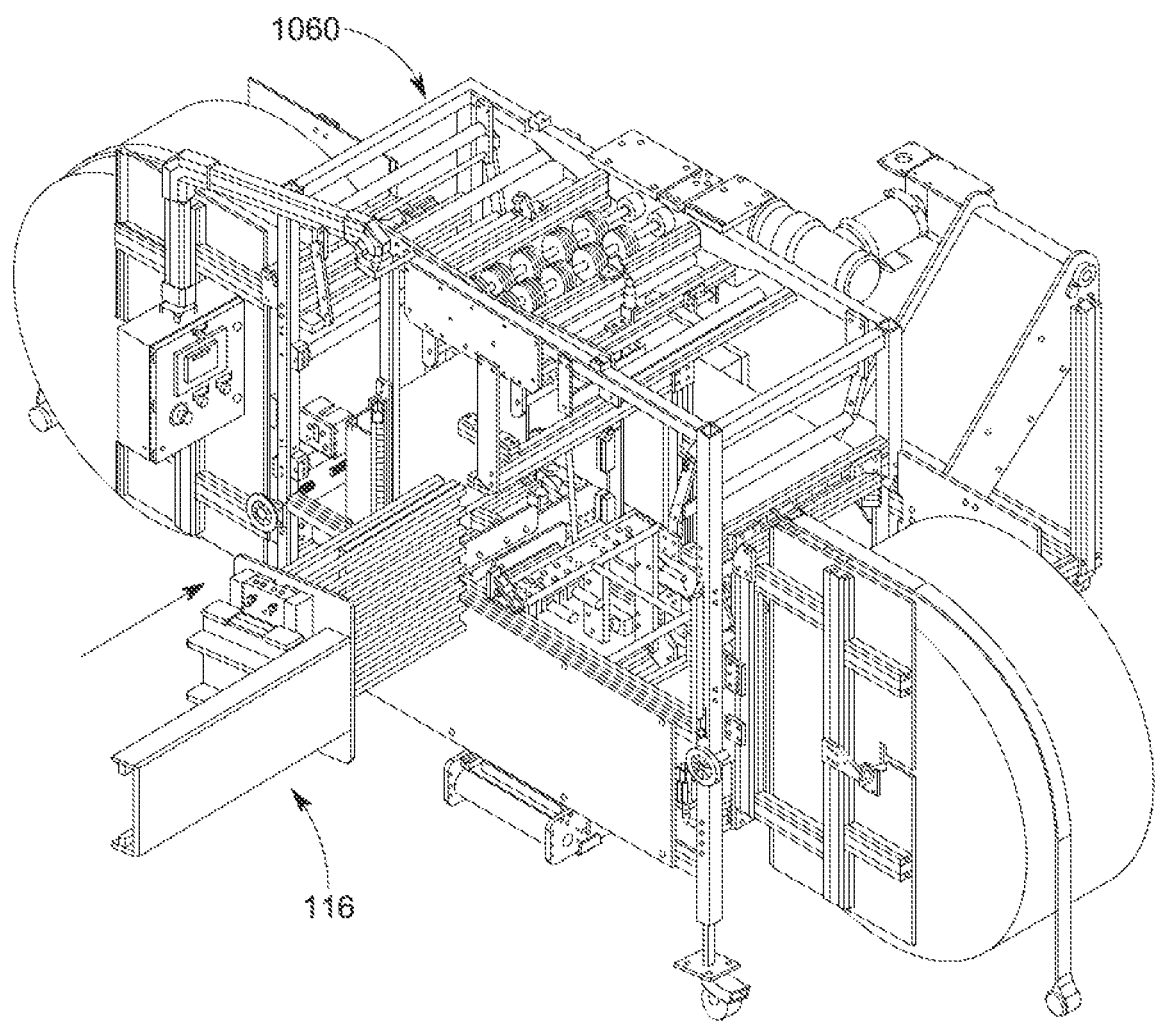
FIG. 10A1

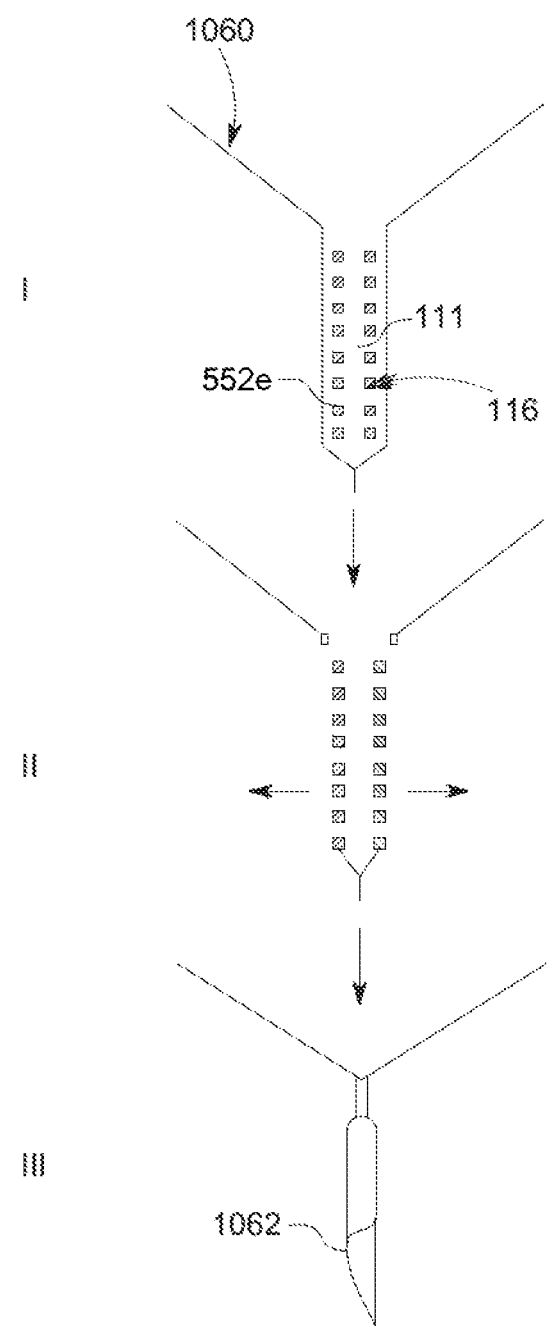
FIG. 10A2

Figure 14D

1400 - A METHOD OF HANDLING ITEMS

| 1479 - PROVIDING A TOTE HANDLER COMPRISING A GRIP HAND WITH FINGERS |
|---|
| 1481 - PROVIDING A TOTE COMPRISING A TOTE FRAME WITH A CHAMBER FOR RECEIVING THE ITEMS THEREIN, THE TOTE FRAME HAVING TOOL RELIEFS THERETHROUGH WITH TOOL RECEPTACLES THEREBETWEEN |
| 1482 - REMOVING THE ITEMS FROM THE TOTE BY PASSING THE FINGERS OF THE GRIP HAND THROUGH THE TOOL RECEPTACLES AND LIFTING THE ITEMS WITH THE FINGERS WHILE RETRACTING THE GRIP HAND FROM THE TOTE |
| 1483 - SELECTIVELY INSERTING THE FINGERS INTO RELIEFS IN ONE OR MORE CHAMBERS IN THE TOTE |
| 1484 - MAINTAINING THE ITEMS IN A PRE-DETERMINED CONFIGURATION WHILE MOVING THE ITEMS WITH THE GRIP HAND |
| 1485 - STACKING THE ITEMS IN PRE-DETERMINED CONFIGURATIONS WITH THE TOTE HANDLER |
| 1486 - SELECTIVELY GRIPPING AND RELEASING THE ITEMS BY SELECTIVELY MOVING SETS OF THE FINGERS BETWEEN AND OPEN AND CLOSED POSITION |
| 1487 - SELECTIVELY RELEASING THE ITEMS INTO THE TOTE BY SELECTIVELY EXTENDING THE FINGERS A DISTANCE INTO THE TOTE AND THEN MOVING THE FINGERS APART |
| 1488 - TILTING THE TOTE WITH THE GRIP HAND WHILE RELEASING THE ITEMS FROM THE GRIP HAND INTO THE TOTE |
| 1489 - FORMING A TOTE WALL BY STACKING THE TOTES |
| 1490 - LOADING GROUPS OF THE ITEMS INTO EACH OF THE TOTES ON A FIRST SIDE OF THE TOTE WALL AND UNLOADING THE GROUPS OF THE ITEMS FROM EACH OF THE TOTES WITH THE TOTE HANDLER ON A SECOND SIDE OF THE TOTE WALL |

# TOTE HANDLING SYSTEM WITH TOTE HANDLER AND METHOD OF USING SAME

CROSS-REFERENCE TO RELATED APPLICATIONS

This application claims the benefit of U.S. Patent Application No. 63/034,105, filed on Jun. 3, 2020 which claims the benefit of U.S. Patent Application No. 62/962,721, filed on Jan. 17, 2020, the entire contents of which is hereby incorporated in its entirety herein.

BACKGROUND

The present disclosure relates generally to material handling equipment. More specifically, the present disclosure relates to equipment, such as conveyors, robots, and shipping containers for sorting, transporting, and storing various materials.

Material handling systems are used by distributors to assemble and package items for shipment. The material handling systems may include conveyors for transporting the items from one location to another. Examples of material handling techniques that may be used are provided in U.S. Pat. Nos. 5,971,132; 4,200,178; 9,334,111; 5,984,078; 6,227,377; and 10,336,542, the entire contents of which are hereby incorporated by reference herein to the extent not inconsistent with this disclosure. Other examples of material handling devices are provided in U.S. patent/application Ser. Nos. 14/550,826; 62/210,348; 15/248,967; 14/775,551; 15/273,370; 14/859,295; and 9,926,094 commonly owned by Applicant, the entire contents of which are hereby incorporated by reference herein to the extent not inconsistent with this disclosure.

Despite advances in material handling technology, there remains a need for devices capable of efficiently manipulating items as they are processed for packaging, storage, and/or delivery, and for addressing explosive growth in ecommerce and retail business to consumer shipments which use automated solutions for processing and packing unit items. There also remains a need for techniques for efficiently moving items between shipping containers and totes without dropping or damaging merchandise. The present disclosure seeks to fill such needs.

SUMMARY

In at least one aspect, the disclosure relates to a tote for a material handling system. The material handling system comprises a mobile carrier and a grip hand comprising fingers. The tote comprises a tote frame movably positionable on the mobile carrier. The tote frame comprises a bottom and walls extending above the bottom to define a chamber shaped to receive items therein. At least one of the bottom and the walls comprises tool reliefs. Each of the tool reliefs comprises a fixed end and an unfixed end with an elongate body there between. The fixed end of each of the tool reliefs is secured to one of the walls. The tool reliefs are in an aligned positioned parallel to each other with a tool receptacle defined between the tool reliefs. The tool receptacles are shaped to receive the fingers of the grip hand therethrough for engagement with the items in the chamber. In another aspect, the disclosure relates to a grip hand for a material handling system. The material handling system comprises a robot. The grip hand comprises a bearing movably supported by the robot, a base slidably movable along the bearing, and finger assemblies supported by the base. Each of the finger assemblies comprises an actuator and fingers. The fingers extend from the actuator and are movable therewith. Each of finger assemblies is movable by the actuators towards a closed position with the fingers on each of the actuators together and an open position with the fingers on each of the actuators apart.

In yet another aspect, the disclosure relates to a tote system for handling items. The tote system comprises a mobile carrier, totes positionable on the mobile carrier, and a tote handler positioned about the mobile carrier. The tote handler comprises a foot positioned on a surface, an arm movably supported on the base, and a grip hand supported by the arm and movable therewith. The grip hand comprises a bearing movably supported by a robot, a base slidably movable along the bearing, and finger assemblies supported by the base. Each of the finger assemblies comprise an actuator and fingers. The fingers extend from the actuator and movable therewith. Each of finger assemblies are movable by the actuators towards a closed position with the fingers on each of the actuators together and an open position with the fingers on each of the actuators apart.

Finally, in another aspect, the disclosure relates to a method of handling items. The method comprises providing a tote handler comprising a grip hand with fingers, providing a tote comprising a tote frame with a chamber for receiving the items therein, the tote frame having tool reliefs therethrough with tool receptacles therebetween, and removing the items from the tote by passing the fingers of the grip hand through the tool receptacles and lifting the items with the fingers while retracting the grip hand from the tote.

In at least one other aspect, the disclosure relates to a tote handling system for manipulating items for packaging, storage, and/or delivery. The handling system comprises a tote handler with a grip hand and a tote. The grip hand comprises a movable palm with fingers extending therefrom. The tote comprises a frame for supporting the items. The frame defines a bottom comprising tool reliefs (struts) with tool receptacles therebetween. The tool reliefs may have a surface for receiving the items thereon. The tool receptacles are shaped to receive the fingers of the grip hand therethrough whereby the grip hand is capable of engaging the items in the tote without engaging the tote.

In another aspect, this disclosure relates to a handling system for manipulating items for delivery, the handling system comprising: a tote conveyor, a grip hand with fingers, and a tote with tool reliefs.

In yet another aspect, this disclosure relates to a material handling system substantially as shown and described herein.

The summary is not intended to be limiting on the disclosure or the claims provided herein, and is to be considered in light of the drawings and description provided herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 2A, 2B1-2B2, 2C, 2D1-2D2, 2E-2H are schematic diagrams depicting example totes with tool reliefs.

FIGS. 7A1-7A2, 7B, 7C, and 7D1-7D2 are schematic diagrams depicting the grip hand in use with various totes and shipping containers.

FIGS. 8A-8C are schematic diagrams depicting the grip hand performing various tote operations.

FIGS. 9A, 9B1-9B2, 9C, and 9D are schematic diagrams depicting various loading and picking operations.

FIGS. 10A1-10A2, 10B, 10C, and 10D are schematic diagrams depicting the grip hand in use with packaging equipment.

FIG. 14D is a flowchart depicting a method of handling items.

DETAILED DESCRIPTION

Figure 1A:
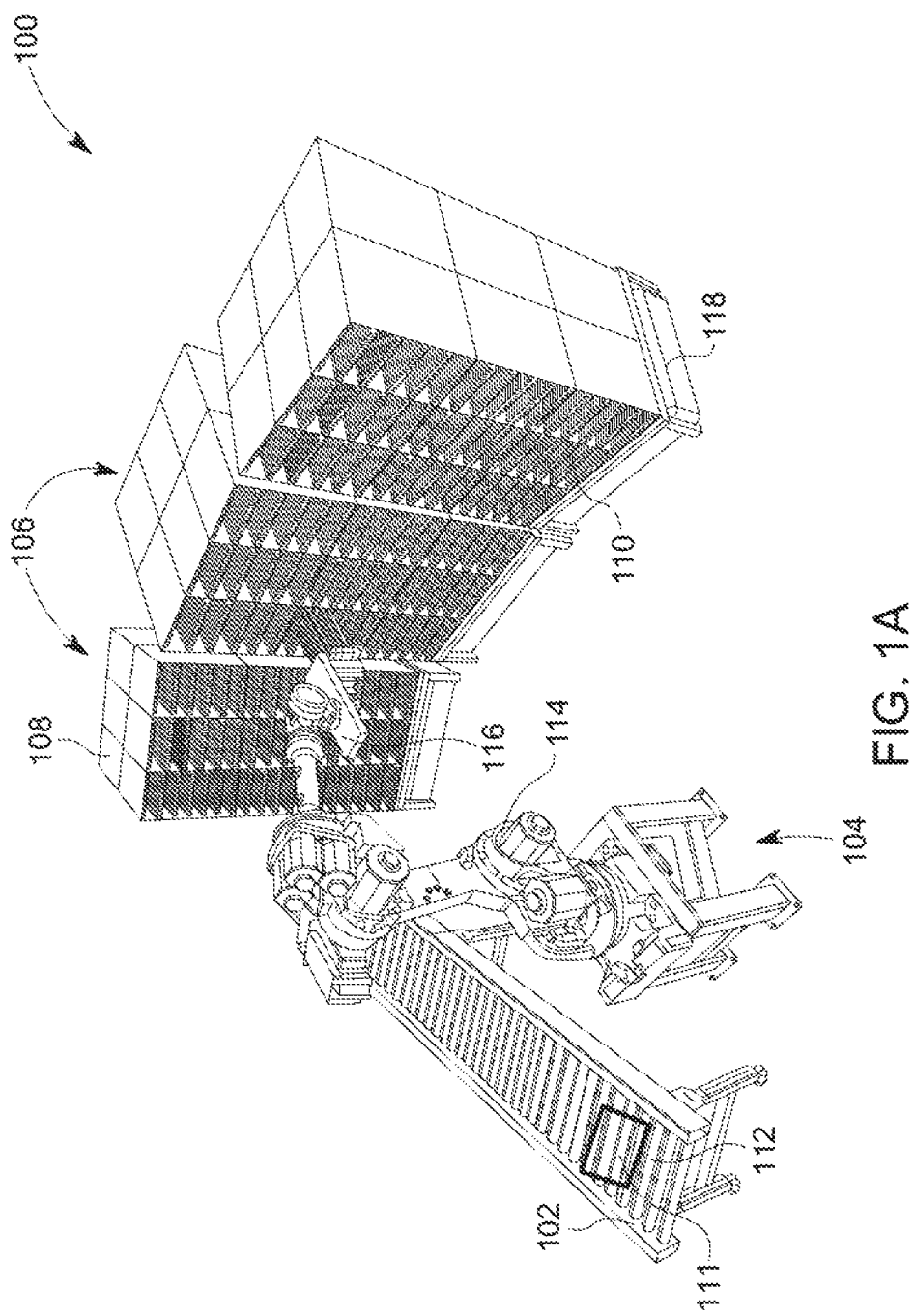
FIG. 1A-1D are schematic diagrams depicting a tote handling system, the tote handling system including a tote conveyor, a tote handler with a grip hand, and a tote wall.

The description that follows includes exemplary apparatus, methods, techniques, and/or instruction sequences that embody techniques of the present subject matter. However, it is understood that the described embodiments may be practiced without these specific details.

Tote Handling System—with Tote Handler with Grip Hand, Slotted Totes, and Tote Conveyor The present disclosure relates to a tote handling system for manipulating items for receipt, storage, packaging, and/or shipment. The handling system may include a tote conveyor, a tote handler, and totes. Manipulating the items may include packing (e.g., inserting, loading, etc.) into the totes and picking (e.g., removing, unloading, etc.) items out of the totes. The manipulating may also involve transferring the items between locations while inside or separate from the totes. The delivering may involve passing the items between various locations and/or preparing the items for transport to various locations inside a facility and/or beyond (e.g., for shipment).

"Item" refers to a unit of use goods containing consumer merchandise in individual packaging. One or more individual pieces may be contained within the unit and within the individual packaging. A "shipping container" refers to a shipping container, such as a carton, box, or other package, that houses the items received from a supplier. "Tote" refers to a container (storage or carrier) capable of carrying one or more items received from the shipping container along the tote handling system.

The tote handler includes a grip hand for moving the items to and from the tote, the tote conveyor, and/or other locations. The tote may be shaped to store the items therein. The tote may be stacked into tote walls, passed along the tote conveyor, and/or between locations manually or by the tote handler. The tote has tool reliefs with tool receptacles therebetween that support the items in the tote and that allow the grip hand to pass therethrough to engage (e.g., lift, grip or release) the items within the tote. This may allow the grip hand to pick and place the items in and out of the tote without disturbing the tote.

The tote handling system is intended to provide one or more of the following capabilities, among others: to reduce labor demands without being disruptive to existing ecommerce fulfillment operations, to automate pack out operations in order fulfillment, to provide automatic unloading and/or placement of single and multiple items, to enable placement of picked items in totes in previously picked to intermediate shipping containers, to automate picking items or item groups from put walls or mobile shelving, to enable automatic unloading and placement of items into shipping containers (e.g., boxes, polybags and other forms of packaging), to flexibly able to adapt to existing manual pick operations while eliminating most labor in pack out operations, to allow robots or pick and place machines to pick and pack multiple items into packaging without requiring the use of vision systems, to maintain multi-item arrangements and/or layering accomplished in the picking operation, to center one or more randomly scattered unit items, to provide tooling interface between the tote handler (e.g., robot) and the tote while allowing a special designed gripper to pick the entire contents of the chamber (compartment) or tote, to unload items from totes with a conveyor only and loading direct into automated bagging and carton wrap machines, to provide a low impact solution that does not drastically change the distribution center layout, to enable use with existing material handling and packaging machinery, to provide a design for intermediate shipping containers (e.g., shelving, shuttles, conveyor, and put walls) for manual or automated picking and fulfillment operations, to provide intermediate storage systems and end of arm tooling that mechanically interacts with the intermediate storage and handling, to provide devices to replace or modify intermediate storage shipping containers and devices used in order fulfillment to consolidate orders to pack out operations, to ease implementation and integration with existing technologies, to provide a means by which the intermediate storage devices are transferred to pack out stations, the reduce or eliminate costly investment by the fulfillment warehouse, to provide ease of implementation for use with existing intermediate storage devices used in order fulfillment, to impose minimal impact on existing warehouse infrastructure, to provide either a direct replacement for intermediate consolidation shipping containers or be capable of being retrofit to existing shelving, to enable use with existing equipment (e.g., conveyors, put walls, pick or put to light systems, carousels, vertical carousels, automated guided vehicles (AGV) and autonomous mobile robots (AMR)), to provide intermediate storage systems with common surfaces (e.g., floors, walls or partitions) in which unit items are put for consolidations and transfer to order pack out, to add relief to the floor and walls of totes thereby creating voids for tooling to be inserted into the tote, to allow the grip hand to fit in the voids created by the tool relief in the floor and or walls of the totes, to provide voids to allow the tooling for gripping unit items to be inserted under or around items without requiring contact with the items, and to provide tooling able to engage (e.g., clamp, grip or lift) the items without damage or disturbing the original placement of the items in the intermediate storage. Note that among embodiments exhibiting one or more of these capabilities, not all embodiments may exhibit them to the same degree.

FIGS. 1A-1D are schematic diagrams depicting a tote handling system 100 including a tote conveyor 102, a tote handler (device) 104, and a tote wall 106, the tote wall 106 including totes 108. The tote conveyor 102 as shown is a conventional linear conveyor with rollers 112 capable of sliding the tote 108 and/or other items 111 therealong. It will be appreciated that the tote conveyor 102 may include one or more conveyor portions of various shapes and sizes, with various options, such as diverters, transfers, ramps, packaging equipment, etc. (not shown) as is described further herein. While FIG. 1 shows a tote conveyor 102, any mobile carrier may be used, such as the conveyor 102, a cart, an autonomous mobile robot, an automated guided vehicle, an automatic storage and retrieval system, a shuttle, and combinations thereof.

The tote handler 104 is depicted as a six-axis handling robot (robot tote handler) 114 positionable about the tote conveyor 102 for moving the items 111 (and/or the totes 108) on and off of the tote conveyor 102. The tote handler 104 also includes the 114 robot and a grip hand (tool) 116 at an end of the handling robot 114 for engaging the totes 108 and/or the items 111. The tote handler 104 may be capable of engaging the tote 108 for transferring the items 111 to and/or from the tote 108, the tote conveyor 102, and/or other locations as is described further herein.

The tote wall 106 is shown as including multiple totes 108 stacked in groups. Three sections of the totes 108 are shown, with each section including six columns and numerous rows of the totes 108. The totes 108 are supported on a tote platform 118. The tote platform 118 may be stationary, manual with wheels, or have any other suitable structure. In this example, the tote platform 118 is an autonomous mobile robot capable of moving the totes 108 to various locations as described further herein.

The totes 108 that form the tote wall 106 are configured to support the items 111 therein. The totes 108 are also configured with tool reliefs 110 shaped to work with the tote handler 104 and the grip hand 116 to facilitate insertion and removal of the items 111 from the totes 108 by the grip hand 116 as is described further herein.

Figure 1B:
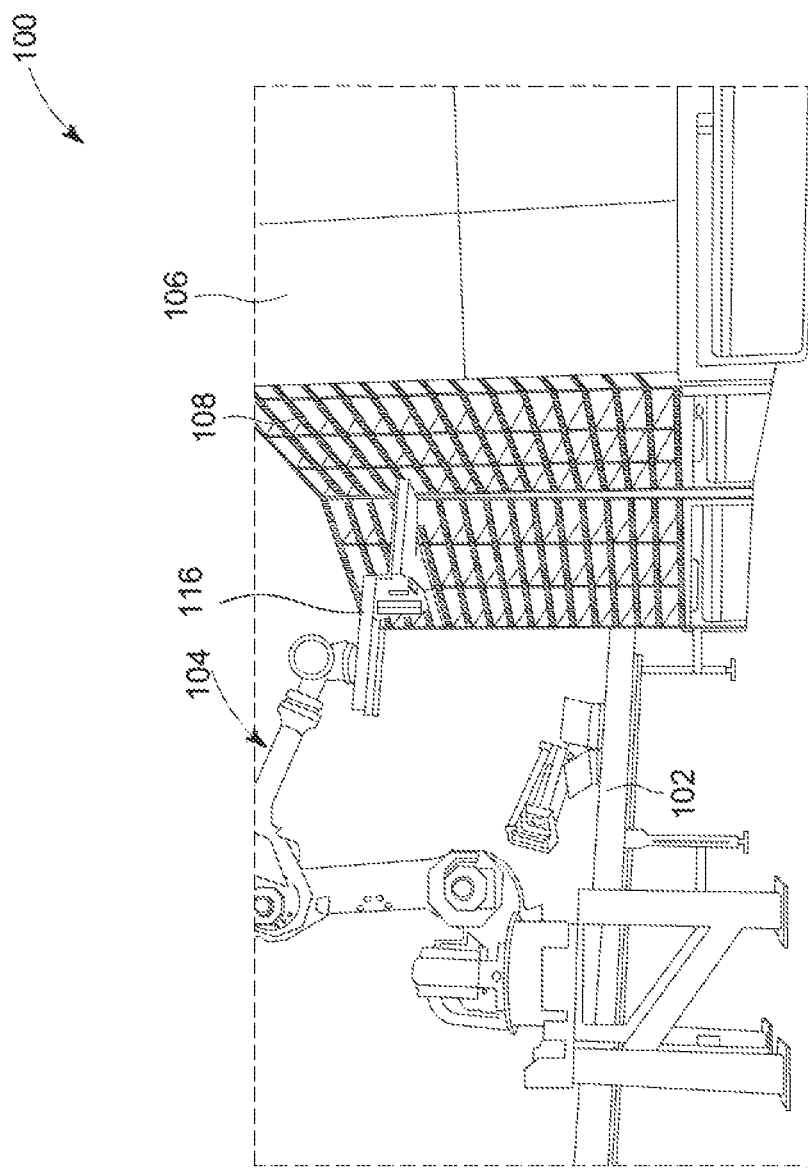
Figure 1C:
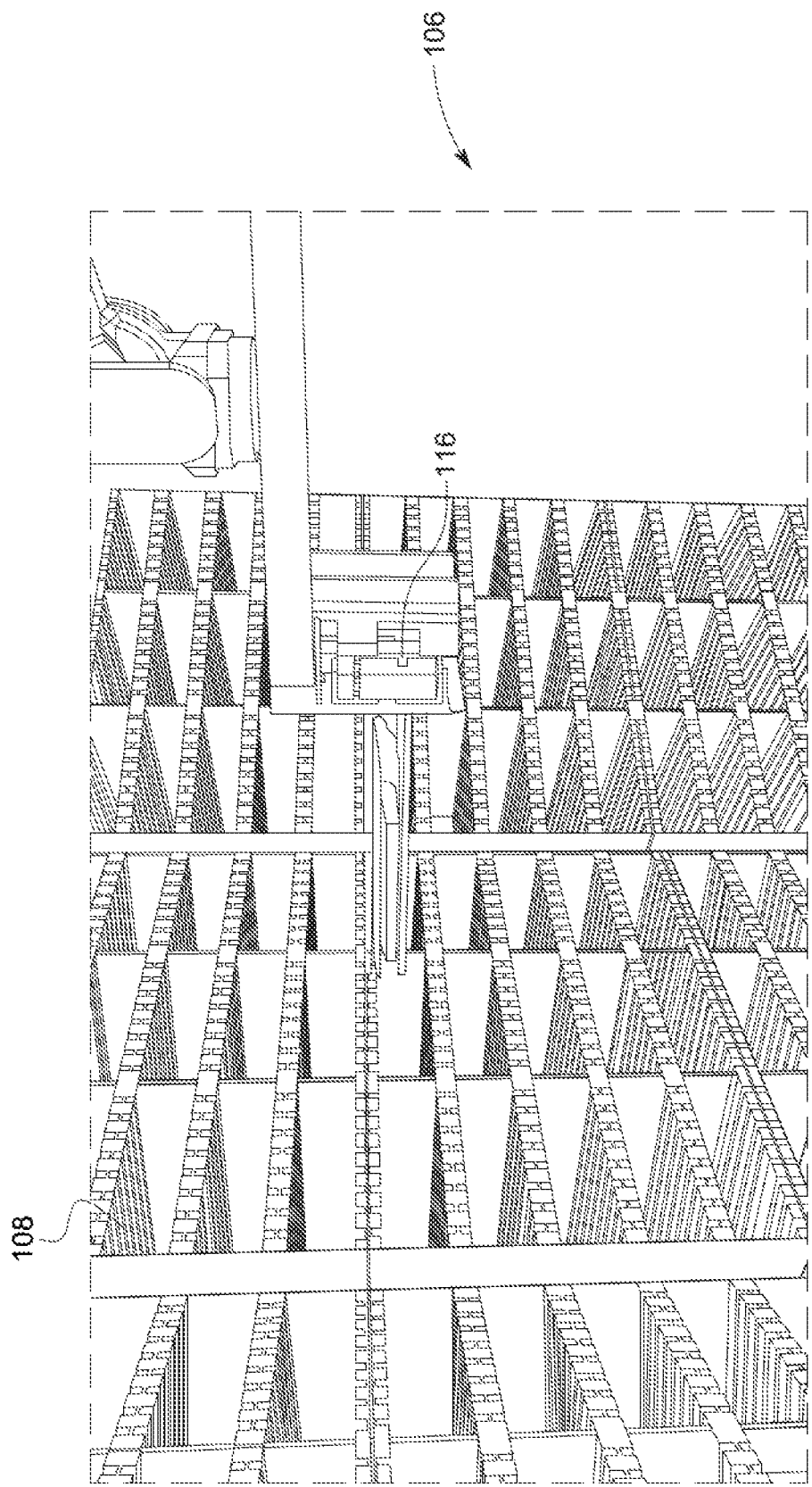
Figure 1D:
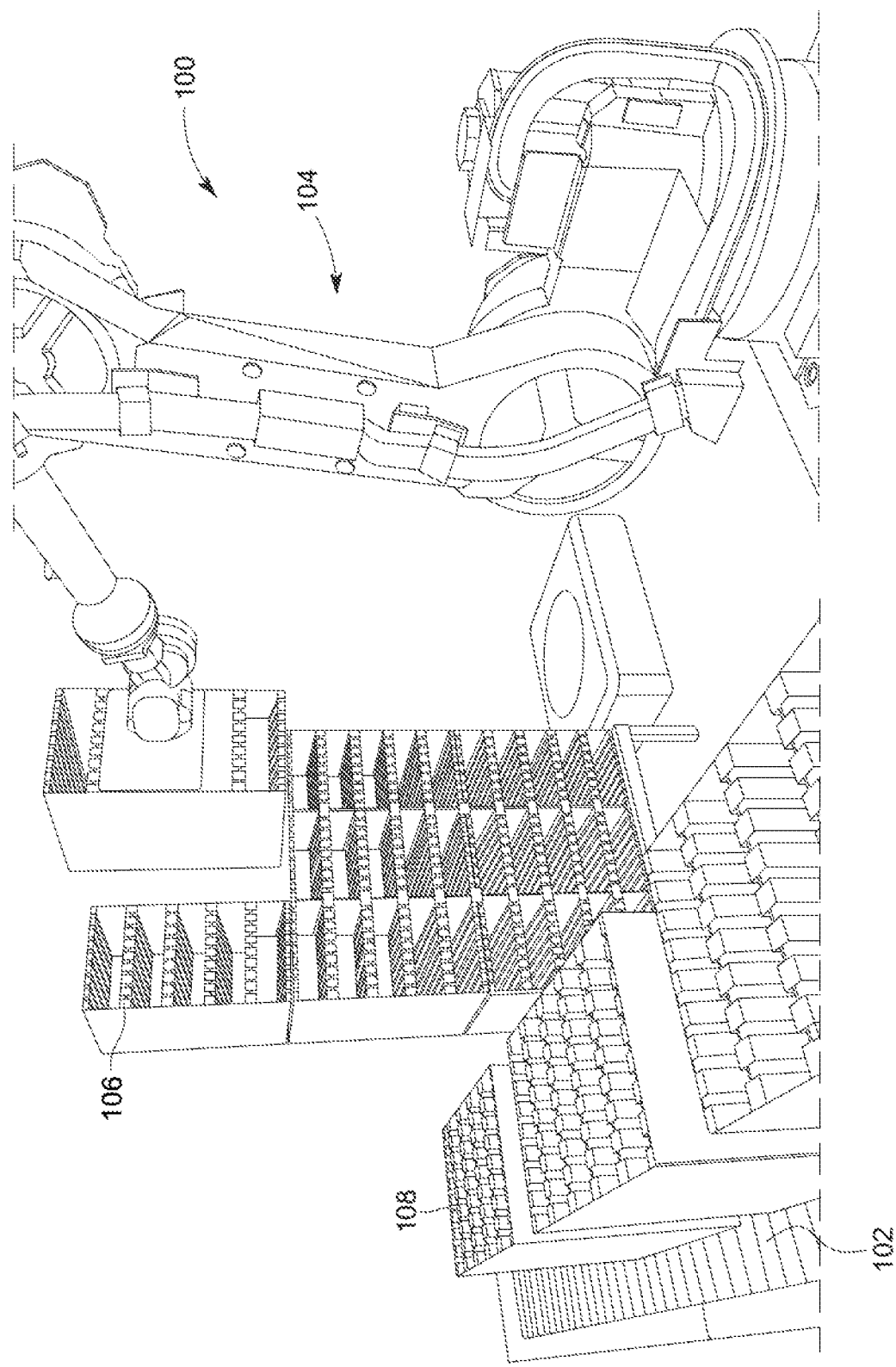

As also shown by FIGS. 1A-1D, the tote handler 104 may move items 111 and/or the totes 108 between the conveyor 102 and the tote wall 106. For example, one or more of the items 111 may be inserted into or removed from the totes 108 by the tote handler 104 as shown in FIGS. 1A-1C and discussed further herein. One or more of the totes 108 may be moved by the tote handler 104 to form the tote wall 106 as shown in FIG. 1D. The tote handler 104 may use the grip hand 116 to manipulate the items 111 and/or the totes 108 as is described further herein.

While a specific configuration of the tote handling system 100 and its components is depicted (here and in later figures), it will be appreciated from this disclosure that one or more of various configurations of the tote conveyors 102, the tote handler 104, the grip hand 116, the totes 108, and other handling equipment as described herein may be used to handle the items 111. For example, one or more tote handlers 104 and/or tote hands 116 capable of operating with the totes 108 and the tote conveyor 102 may be used in other embodiments.

Figure 2C:
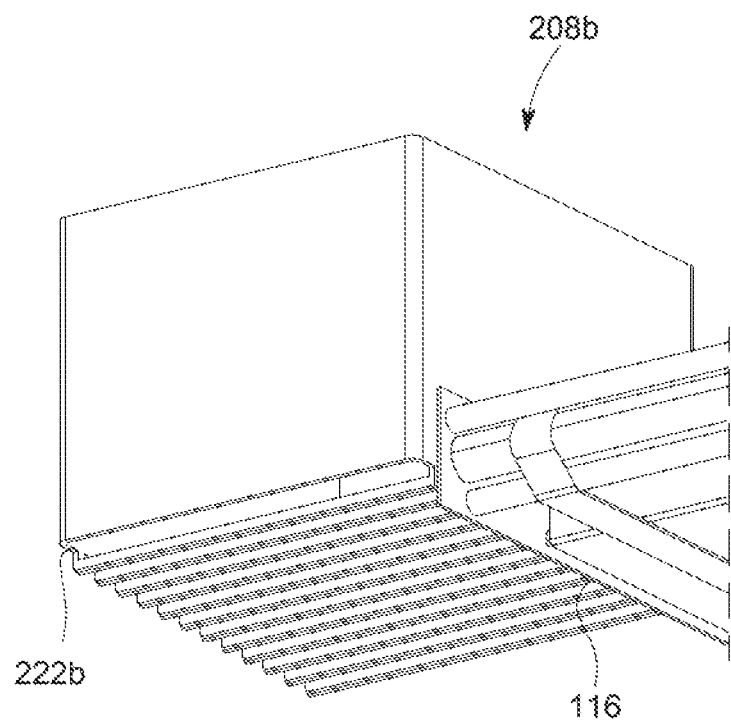
Figure 2C:
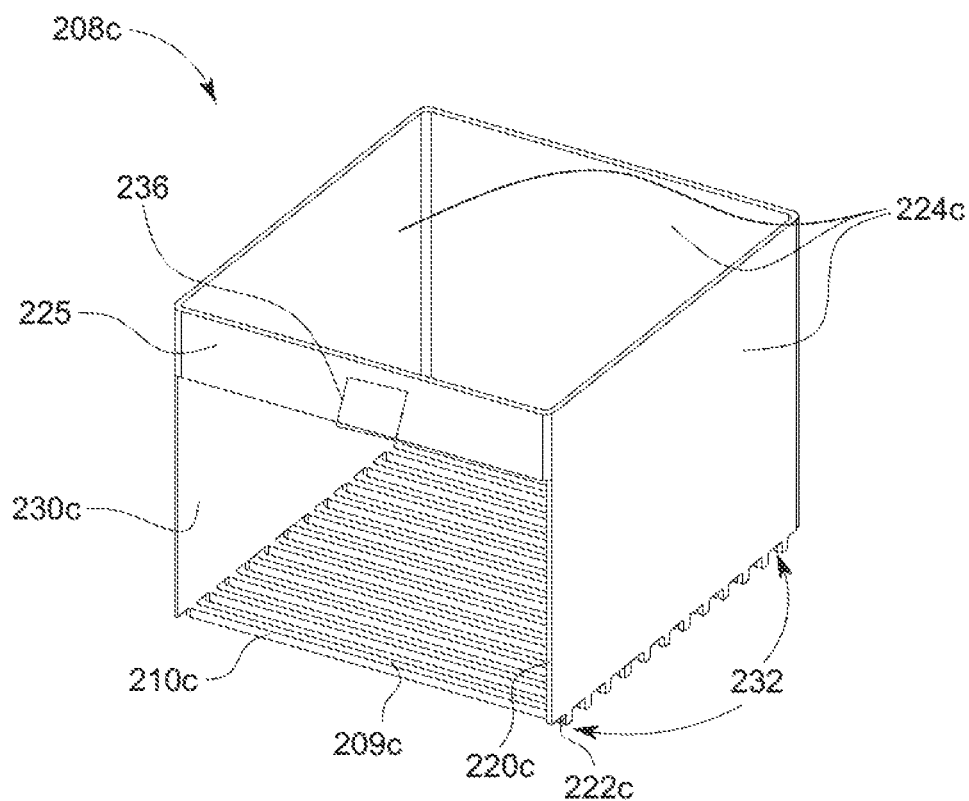

FIGS. 2A, 2B1-2B2, 2C, 2D1-2D2, 2E-2H are schematic diagrams depicting example totes 208a-h with tool reliefs 210a-h. Each of the totes 208a-h have a frame 220a-h with a bottom 222a-h and walls 224a-h. The bottom 222a-h comprises tool reliefs (struts) 210a-h with the tool receptacles 209a-h therebetween for receiving the grip hand 116 therethrough as shown in FIGS. 1 and 2B1-2B2.

While each of the example totes 208a-h shown in these figures are depicted as having a cuboid shape with a respective flat bottom 222a-h and two or more respective flat walls 224a-h with right angles therebetween, it will be appreciated from this disclosure that the shape of the tote may vary. Also, while the respective tool reliefs 210a-h and tool receptacles 209a-h (and the corresponding grip hand 116) are depicted as having a linear shape and parallel arrangement, it will be appreciated from this disclosure that the shape of these can also vary.

The totes 208a-h may be made of any suitable material capable of supporting items therein, such as metal, fiber, or plastic. The material may be, for example, a rigid plastic, such as high density polyurethane, capable of carrying the items 111. The totes 208a-h may have a structure with a strength sufficient for material handling purposes, such as for transport, use with handling equipment, and for forming the tote wall 106 of FIG. 1. The totes 208a-h may be integrally formed (e.g., by injection molding), or be formed from separate pieces that may be joined together (e.g., interlocking pieces).

The tote 208a of FIG. 2A has a rectangular bottom 222a with two rectangular walls 224a extending vertically thereabove. The walls 224a are positioned along edges of the bottom 222a on opposite sides thereof. In this example, the walls 224a are flat with lips 227a extending along a top edge thereof. The bottom 222a has a flat bottom surface 228a and a curved upper surface 229a. The curved upper surface 229a has a parabolic shape that is higher adjacent the walls 224a and lower therebetween for urging items thereon towards a middle of the tote 208a.

The bottom 222a includes a plurality of linear, parallel tool reliefs 210a extending between the walls 224a parallel thereto. Each of the tool reliefs 210a has a linear, elongate body extending from the bottom surface 228a to the top surface 229a and from one end of the bottom 222a to an opposite end of the bottom 222a. The tool reliefs 210a are secured at one end and open at an opposite end to define the tool receptacles 209a therebetween.

The tool receptacles 209a are spaces defined between each of the tool reliefs 210a. The tool receptacles 209a are depicted as linear, parallel spaces shaped to receive the grip hand 116 therethrough as is described further herein. For descriptive purposes, a portion of the grip hand 116 is depicted in the tool receptacles 209a between the tool reliefs 210a.

The tote 208b of FIGS. 2B1, 2B2 is similar to the tote 208a of FIG. 2A, except that this version has a different bottom 222b, three side walls 224b, and a slotted front wall 223. The bottom 222b is similar to the bottom 222a of FIG. 2A, except that it has a flat upper surface 229b formed from the tool reliefs 210b. The side walls 224b may be solid as shown in FIG. 2B2, or vented as shown in FIG. 2B1.

The front wall 223 in this example, is an extension of the bottom 222b. The tool reliefs 210b have a first portion that extends along the flat bottom 222b, and a second portion that extends vertically upward to define the front wall 223. The tool receptacles 209b extend between the first and second portions of the tool reliefs 210b to receive corresponding portions of the grip hand 116 oriented in alignment thereto as schematically depicted in FIG. 2B1. As further shown in FIG. 2B2, the portion of the grip hand 116 may be positioned in non-alignment (e.g., perpendicular to the tool reliefs 210b and tool receptacles 209b) for supporting the tote 208b thereon.

The tote 208c of FIG. 2C is also similar to the tote 208a of FIG. 2A, except that this version has three walls 224c and a partial wall 225. The partial wall 225 extends between an upper portion of two of the opposite walls 224c and defines an opening 230c between the opposite walls 224c and the bottom 222c that leads to a chamber defined within the walls 224c and the bottom 222c. An identifier 236 is provided on the partial wall 225 for identification as is described further herein.

The tool reliefs 210c (with tool receptacles 209 therebetween) extend perpendicularly between opposite walls 224c. The bottom 222c is provided with conveyor reliefs 232 extending from the tool reliefs 210c. These conveyor reliefs 232 may be used in conjunction with the tote conveyor 102 (FIG. 1) to move the tote 208c as is described further herein.

The tote 208d of FIGS. 2D1 and 2D2 are similar to the tote 208c of FIG. 2C with similar tool reliefs 210d, tote receptacles 209d, and opening 230d. In this version, this tote 208d has two adjacent walls 224d, the partial wall 225, and the front wall 223. As also shown in FIG. 2D1, the tool reliefs 210d are provided with a support 234 between the first and second portions of the tool reliefs 210d. An additional support 234 may also be provided between the tool reliefs 210d and the wall 224d as shown in FIG. 2D2.

Figure 2E:
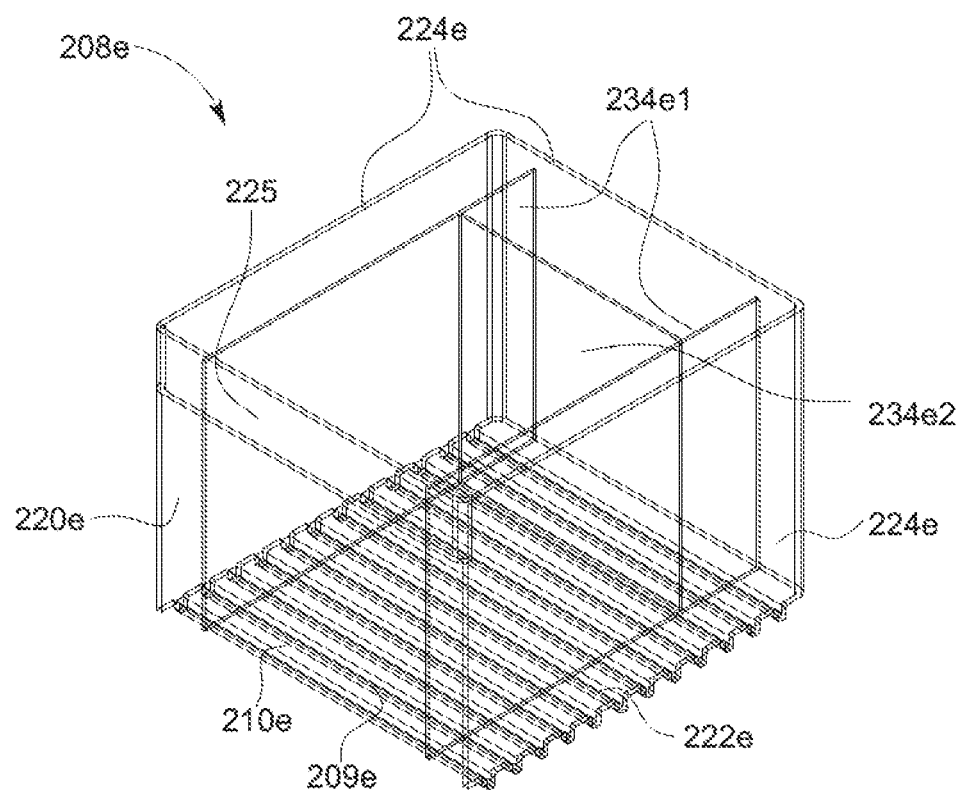

The tote 208e of FIG. 2E is similar to the tote 208c of FIG. 2C, except partition walls 234e1, 234e2 are provided within the tote 208e. These partition walls 234e1, 234e2 may be integrally formed or insertable into the tote 208e. The partition walls 234e1, 234e2 may form interior walls to subdivide the tote 208e into separate chambers (sub-compartments). As shown in this example, two of the partition walls 234e1 are parallel to opposite walls 224e and a third partition walls 234e2 extends perpendicularly between the two parallel partition walls 234e1. The third partition walls 234e2 is parallel to the partial wall 225. These partition walls 234e1, 234e2 rest on the tool reliefs 210e and may be supported by the walls 224e and/or partial wall 225.

Figure 2F:
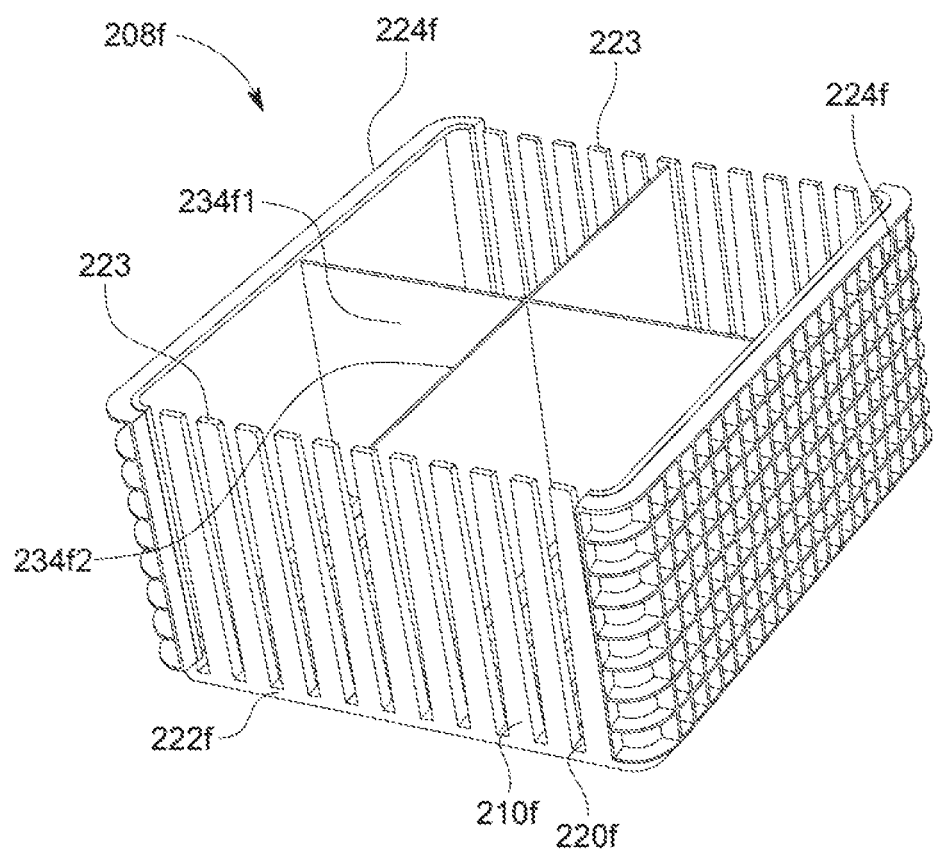

The tote 208f of FIG. 2F is similar to the tote 208b of FIG. 2B, except that this version has two opposite walls 224f, two opposite front walls 223, and partition walls 234f1, 234f2. In this version, both of the front walls 223 are formed from the tool reliefs 210f The tool reliefs 210f have a first portion along the bottom 222f, and two second portions forming each of the front walls 223. This example shows the tool reliefs 210f of the bottom 222f separate from the tool reliefs 210f of the front walls 223, but they may be continuous with the tool reliefs 209f extending from the bottom 22f and through the front wall 223 as shown for example in FIGS. 2D1-2D2.

Also, in the version of FIG. 2F, the partition walls 234f1, 234f2 are provided. The partition wall 234f2 extends between the front walls 223, and the partition walls 234f1 extends between the walls 224f The partition walls 234f1, f2 may be interlocking walls, or have separate portions. The partition walls 234f1, 234f2 divide the tote 208f into separate chambers (or sub-compartments), each accessible by the grip hand 116.

Figure 2G:
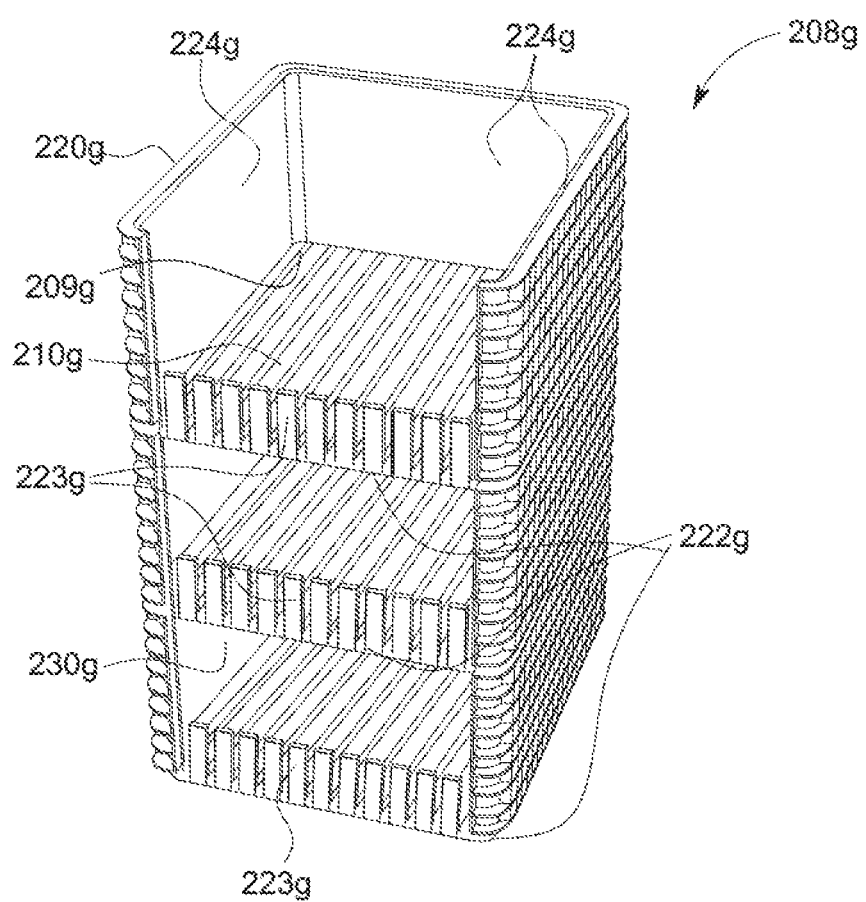

The tote 208g of FIG. 2G is similar to the tote 208b of FIG. 2B, except that this version includes multiple (three) bottoms 222g, three vertical walls 224g, and multiple (three) partial front walls 223g. Each of the three bottoms 222g are positioned at different heights between the three vertical walls 224g. The tote 208g also has three sets of tool reliefs 210g along the bottoms 222g.

Each of the sets of tool reliefs 210b has a first portion defining the respective bottoms 222g and a second portion defining the respective front walls 223g. The second portion of the tool reliefs 210g extends only partially above the bottom 222g to define the short front wall 223. A front opening 230g is defined between the front wall 224 and the walls 224g. The front opening 230g at a top of the tote 208h is open, and the other openings 230g are enclosed by a bottom 222g thereabove.

Figure 2H:
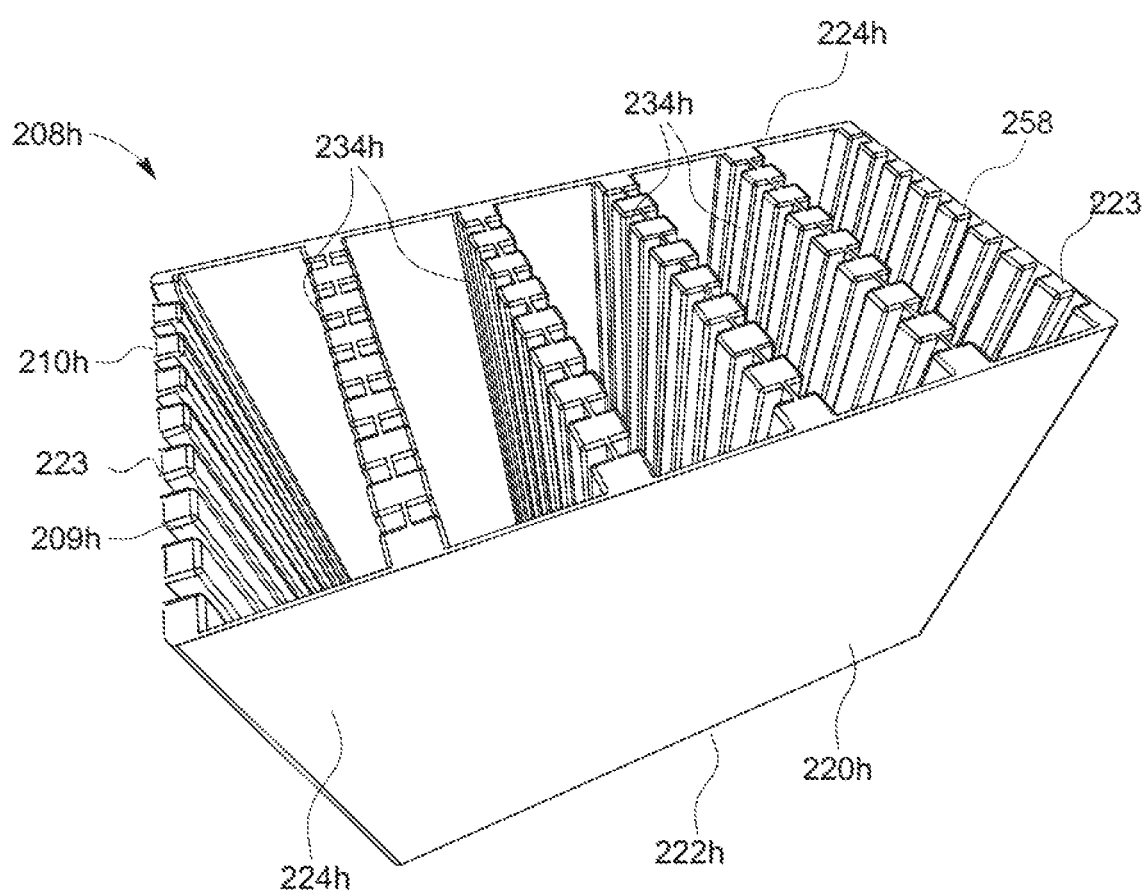

The tote 208h of FIG. 2H has a flat solid bottom 222h with two solid vertical walls 224h and two slotted front walls 223 extending above the bottom 222g. The slotted front walls 223 are each formed from a set of parallel tool reliefs 210h extending between the walls 224h. The tool reliefs 210g are spaced apart with tool receptacles 209g therebetween shaped to receive a portion of the grip hand 116 similar to the tool receptacles 209a of FIG. 2A. This version also shows detachable joints 258 in the tool receptacles 209h between the tool reliefs 210h to provide support to the tool reliefs 210h. The joints 258 may be detached when in use to allow the grip hand 116 to pass therethrough. This version also has multiple partition walls 234h extending between the walls 224h. The partition walls 234h in this example are similar to the walls 224h and are positioned parallel thereto a distance therefrom to define chambers therebetween.

The totes 208a-h may optionally be provided with additional features, such as an identifier 236 as shown in FIG. 2C. The identifier 236 may be a label with a number, bar code, or other information usable in identifying the tote and/or its contents. The identifier 236 may also be an electrical device, such as a sensor or radio frequency identification ("RFID") tag, detectable, programmable, or capable of storing information about the tote and/or its contents. Optionally, the identifier 236 may be scanned and programming applied to cycle the handling system 100 (FIG. 1) based on the information detected in the identifier 236.

Figure 3A:
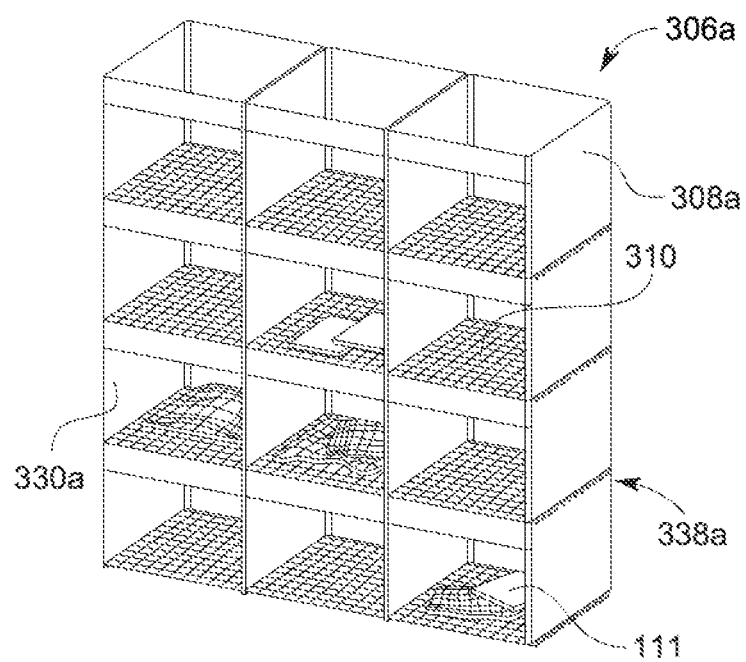
FIGS. 3A-3C are schematic diagrams depicting example configurations of the tote wall.
Figure 3B:
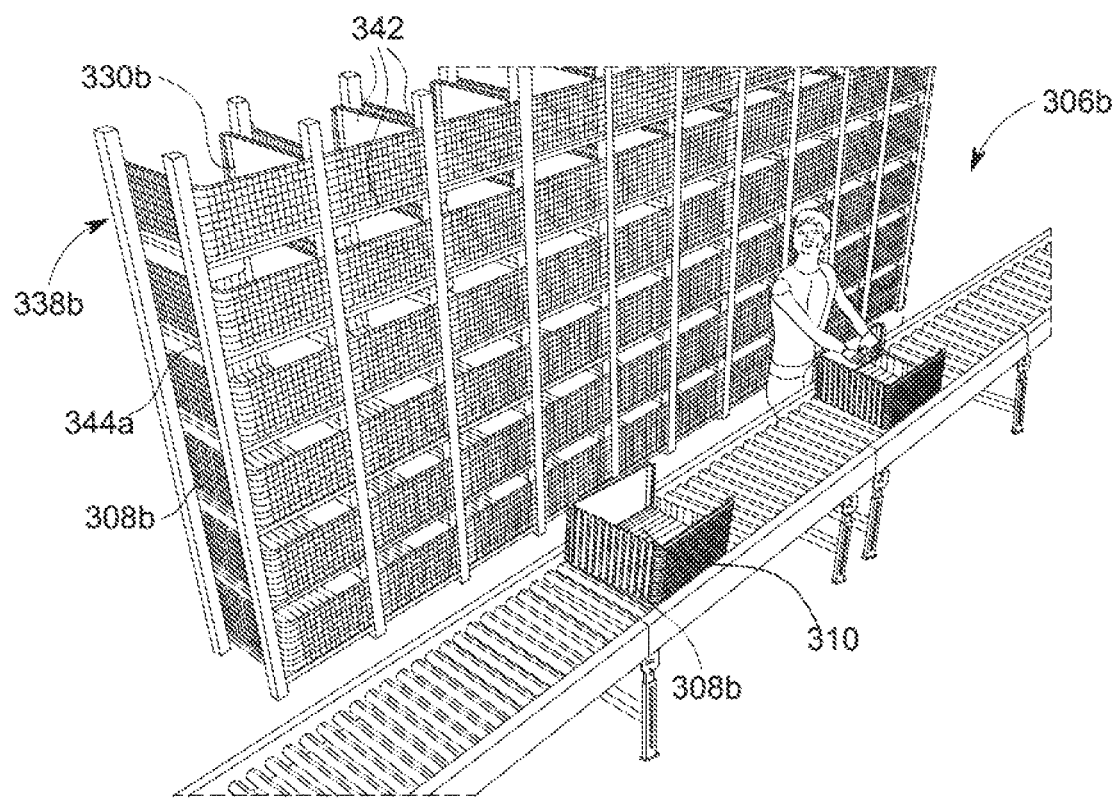
Figure 3C:
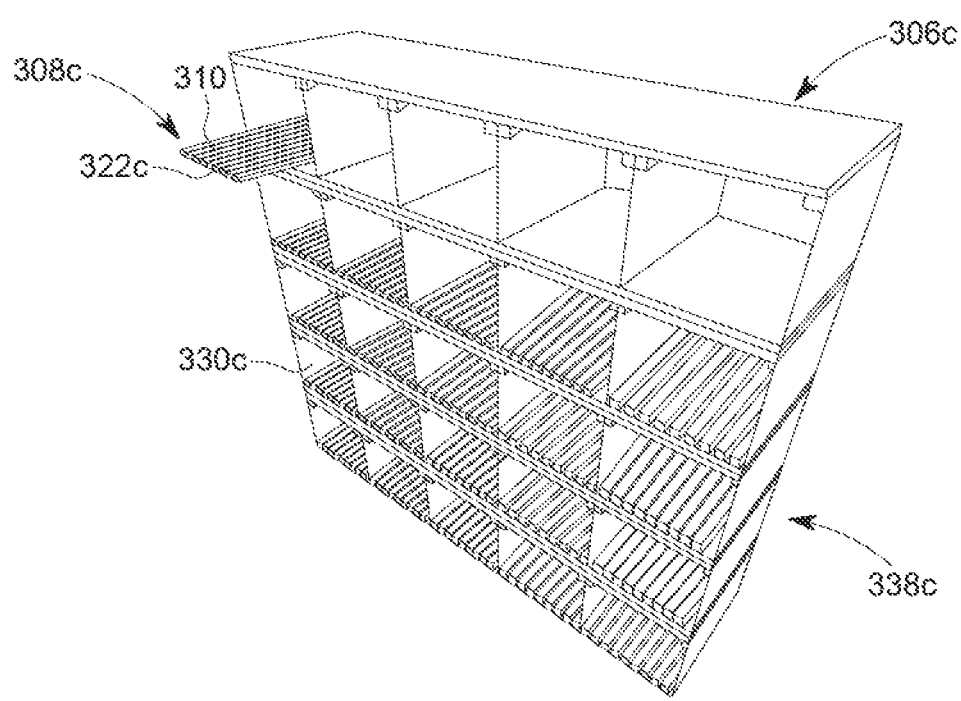

FIGS. 3A-3C are schematic diagrams depicting example configurations of the tote wall 306a-c. Each of these figures shows various totes 308a-c joined together vertically and horizontally in various manners to form various versions of the tote wall 306a-c. Each of the totes 308a-c include tool reliefs 310 capable of receiving the grip hand 116 (FIG. 1), thereby enabling selective stacking, sorting and storing of the items 111. While specific arrangements of the totes 308a-c and tote walls 306a-c are shown, various alternative combinations may be defined to facilitate loading, sorting, storing, etc.

FIG. 3A shows the tote wall 306a formed from interlocking totes 308a. The totes 308a may be similar to the totes 208c previously described in FIG. 2C. One or more of the totes 308a may be removably stacked to form a desired size of wall, such as the four rows and three columns shown in FIG. 2C. In some versions, the totes 308a may have a common top/bottom or sidewall with an adjacent tote 308a, thereby reducing components needed to form the tote wall 306a.

The totes 308a may have connectors or interlocking features (not shown) that join together when stacked with similar totes 308a. Such interlocking features may include mating connections (not shown) that allow the totes 308a to lockingly engage when pressed together. Portions of the totes 308a may join to define a frame 338a with chambers 330a shaped to receive one or more of the items 111 therein. Additional braces or support mechanism (not shown) may also optionally be provided to secure the totes 308a together.

FIG. 3B shows the tote wall 306b formed from totes 308b and a wall frame 338b. In this version, the wall frame 338b has vertical and horizontal beams 342 connected together. These beams 342 form chambers 330b shaped to receive and support the totes 308b therein. The totes 308b are similar to the totes 208b of FIGS. 2B1 and 2B2 (without the front wall 223), but any tote described herein may be used. The totes 308b may be supported in the chambers 330b by various mechanisms, such as a platform 344 connected to the frame 338b, or rails (not shown) in the frame 338b that receivably engage portions of the tote 308b.

FIG. 3C shows the tote wall 306c formed from a wall frame 338c with the totes 308c therein. In this version, the frame 338c is a conventional put wall (or place wall) structure including a series of chambers 330c with the totes 308c positioned therein. The totes 308c in this version include only a bottom 322c with the tool reliefs 310. The totes 308c may be similar to the tote 208c of FIG. 2C, except without any walls 224c or 223, but any tote with tool reliefs insertable into the chambers 330c may be used.

Figure 4A:
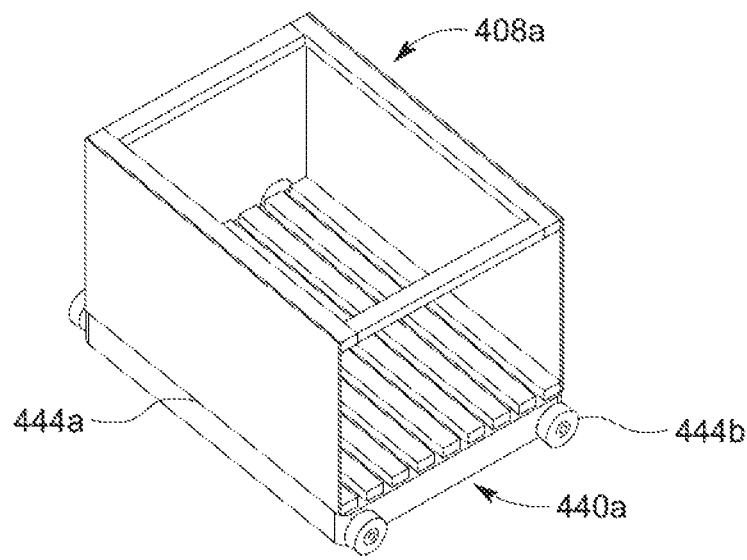
FIGS. 4A-4C are schematic diagrams depicting example mobile totes.
Figure 4B:
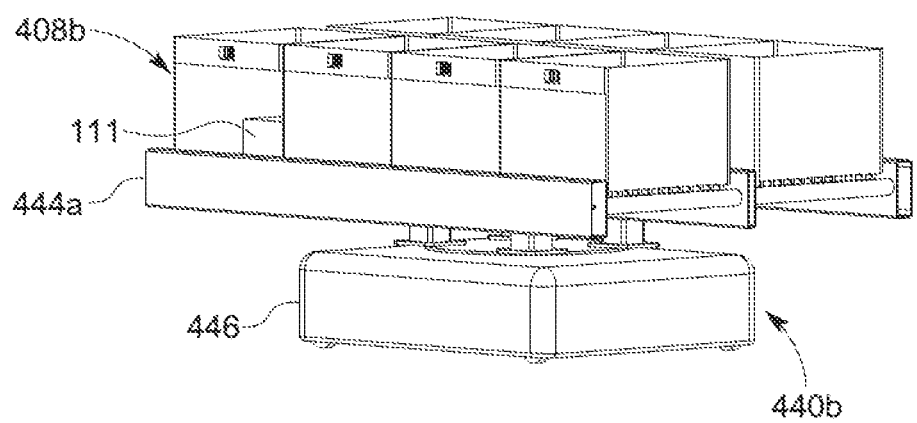
Figure 4C:
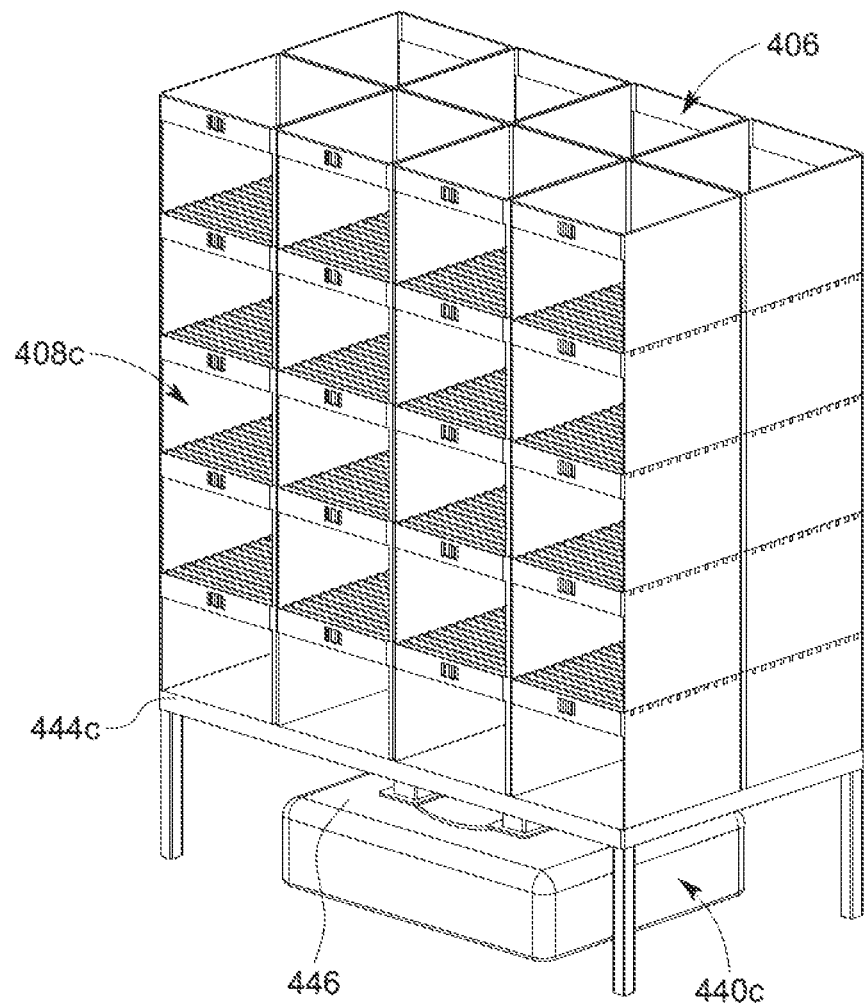

FIGS. 4A-4C are schematic diagrams depicting example mobile totes 408a-c. Each of these figures shows one or more totes 408a-c carried by a mobile based 440a-c for transporting one or more of the items 111 (as shown in FIG. 4B). While specific arrangements of the totes 408a-c and mobile bases 440a-c are shown, various combinations may be defined to facilitate loading, sorting, storing, etc.

FIG. 4A shows a single mobile tote 408a on a single mobile base 440a in a cart (or shuttle) configuration. The tote 408a is shown as being similar to the tote 208c of FIG. 2C. This tote 408a may rest on the mobile base 440a and may be removable therefrom, or may be integrally formed with the mobile base 440a. The mobile base 440a may include a separate platform 444a with wheels 444b. The platform 444a may be a solid platform or a frame shaped to support the tote 408a thereon. The wheels 444b are connected to the platform 444a to allow rolling movement thereof. The mobile base 440a may be manually pushed, or be provided with electronics for driven and/or automated movement.

FIG. 4B shows multiple totes 408b on a mobile base 440b. In this version, the totes 408b are shown as including two rows of totes 408b that are similar to the tote 208c of FIG. 2C. Two or more of the totes 408b may be interlocked together in one or more groups in a manner similar to the totes 308a of FIG. 3A. While only two rows of four totes 408b are shown, one or more rows of one or more totes 408b may be stacked and assembled to form a desired configuration.

The mobile base 440b includes two platforms 444a carried by a mobile robot 446. Each of the two platforms 444a supports a set of the totes 408b. Each of the platforms 444a may be a portion of a conveyor to allow the totes 408b to slide to/from another conveyor. The mobile robot 446 may be a conventional robot capable of carrying and transporting the totes 408b and the platforms 444a. The mobile robot 446 may be programmable and operate with the platforms 444a to move the totes 408b.

FIG. 4C shows a tote wall 406 carried by the mobile platform 440c. The tote wall 406 includes multiple stacked totes 408c. The tote wall 406 may be similar to the tote wall 306a of FIG. 3A. The mobile platform 440c includes a platform 444c and the mobile robot 446. In this version, the tote wall 406 is supported on the platform 444c above the mobile robot 446. The platform 444c may support the tote wall 406 on the mobile robot 446 during transport, and off the mobile robot 446 while at rest on the floor. The platform 444c may be connected or connectable to the tote wall 406 and/or the mobile robot 446. For example, the tote wall 406 may be defined to include the platform 444c, and the mobile robot 446 may be adapted to lift the platform 444c with the tote wall 406 thereon when transport is needed.

FIGS. 5A-5E are schematic diagrams depicting various views of portions of the tote handler 104 having a grip hand 116. The tote handler 104 is depicted as including a handling robot 114 with a grip hand 116 usable with totes 508 and other shipping containers 509 (e.g., the boxes or cartons) on the conveyors 102. The grip hand 116 is movable by the handling robot 114 about the conveyors 102, the totes 508, the shipping containers 509, and other equipment for selectively moving one or more of the items 111. The grip hand 116 may be used to move the items 111 into and out of the totes 508 and the shipping containers 509. The grip hand 116 is configured to selectively access the items 111 and move them to a desired location. The grip hand 116 is shaped to pass through the tote 508 to selectively move the items 111 in a specific arrangement as is described further herein.

The handling robot 114 may be any robot or mechanical manipulator capable of carrying the grip hand 116 and moving the grip hand 116 into desired positioned. In this example, the handling robot 114 has a foot 548a and an articulated arm 548b. The foot 548a may be a frame supported on the floor or other surface. The arm 548b includes various linkages to permit rotation, tilt, and extension to achieve movement in the x, y, and z axes. A connection 548c is provided at an end of the arm 548b to support the grip hand 116 thereon. The connection 548c may be any suitable connection capable of movably supporting the grip hand 116, such as a u-joint.

The grip hand 116 includes a palm 550a and finger assemblies 550b capable of lifting the totes 508, the shipping containers 509, the items 111, etc. The palm 550a is supported on the arm 548b by the connection 548c with the finger assemblies 550b extending therefrom. The palm 550a includes a base 552a, a backing plate 552b, and bearings 552d. The bearings 552d are attached to the connection 548c. The base 552a is movably supported (e.g., slidably movable) along the bearings 552d. The backing plate 552b is fixed to an end of the bearings 552d. The base 552a supports the finger assemblies 550b thereon for movement therewith as the base 552a slides along the bearings 552d.

The finger assemblies 550b include actuators 552c and fingers 552e. The actuators 552c are movably positioned on the base 552a. Two actuators 552c are shown, but any number may be provided. The two actuators 552c are slidably movable along the base 552a between a position closed position adjacent to each other, and an open position a distance apart. A finger plate 553 is secured to each of the actuators 552c. The fingers 552e are secured to the actuators 552c by the finger plates 553 for movement therewith. An end of each of the fingers 552e is secured to the finger plates 553 and extends therefrom. In this version, a rows of fingers 552e is supported on each of the finger plate 553 and the corresponding actuator 552c.

The fingers 552e are depicted as narrow rods secured at one end to the finger plates 553. However, the fingers 552e may be of alternative structure in alternative embodiments. The fingers 552e are depicted as being evenly spaced apart in two linear rows (one row on each of the actuators 552c) and parallel to each other, but various arrangements may be provided as described further herein.

The fingers 552e are shaped to pass through the tool receptacles 209a between the tool reliefs 210a of the totes as shown in FIGS. 2A and 2B1-2B2. Note that the fingers 552e are designed to mate with and pass through the tool reliefs 110, shown in FIG. 1. Thus, if the tool reliefs 110 have a geometry differing from that shown in FIG. 1, then the fingers 552e may likewise have a different geometry. The fingers 552e may also be sized to extend into the chambers of the totes 508 to reach into and access the items 111 therein.

The finger plates 553 are movably supported on the base 552a by the actuators 552c. The actuators 552c are positioned on and movable about the base 552a. As the actuators 552c move between the open and closed position, the rows of the fingers 552e move therewith. An item space 555 is defined between the rows of fingers 552e when in the open position. Movement of the actuators 552c may allow the fingers 552e to selectively open to receive or to release the items 111, and to close to grip the items 111 and to fit within chambers in the totes 508 as needed.

Figure 5A:
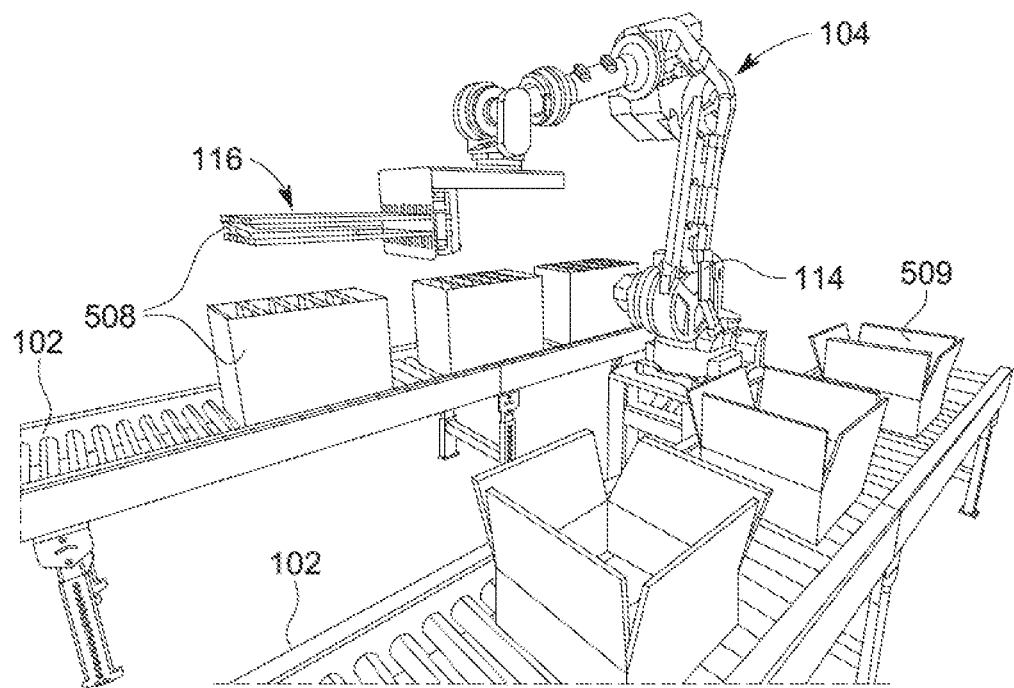
FIGS. 5A-5E are schematic diagrams depicting various views of portions of the tote handler and the grip hand.

The actuators 552c may be selectively activated to move the finger plates 336 together and apart in a gripping action, thereby moving the fingers 552e together and apart in a grip and release motion. The actuators 552c may also be selectively activated to manipulate the bearings 552d (and thereby the backing plate 552b), and/or to selectively extend and retract the fingers 552e. This motion may be used to position the fingers 552e about the shipping container 509 to unload items as shown in FIG. 5A, or to remove items from the tote 508 as described further herein. Also as shown in FIG. 5E, the grip hand 116 may be positioned with the fingers 552e in alignment with a width of the shipping container 509 for unloading therein.

The handling robot 114 and/or the grip hand 116 may be activated to selectively move in a manner that allows the fingers 552e to manipulate the items 111 as needed. Various movements may be provided. For example, the bearings 552d may be coupled to the backing plate 552b to selectively extend and retract the backing plate 552b along a length of the fingers 552e. The backing plate 552b may be moved by the bearings 552d to selectively push items 111 positioned between the fingers 552e, thereby releasing the items 111.

Figure 5B:
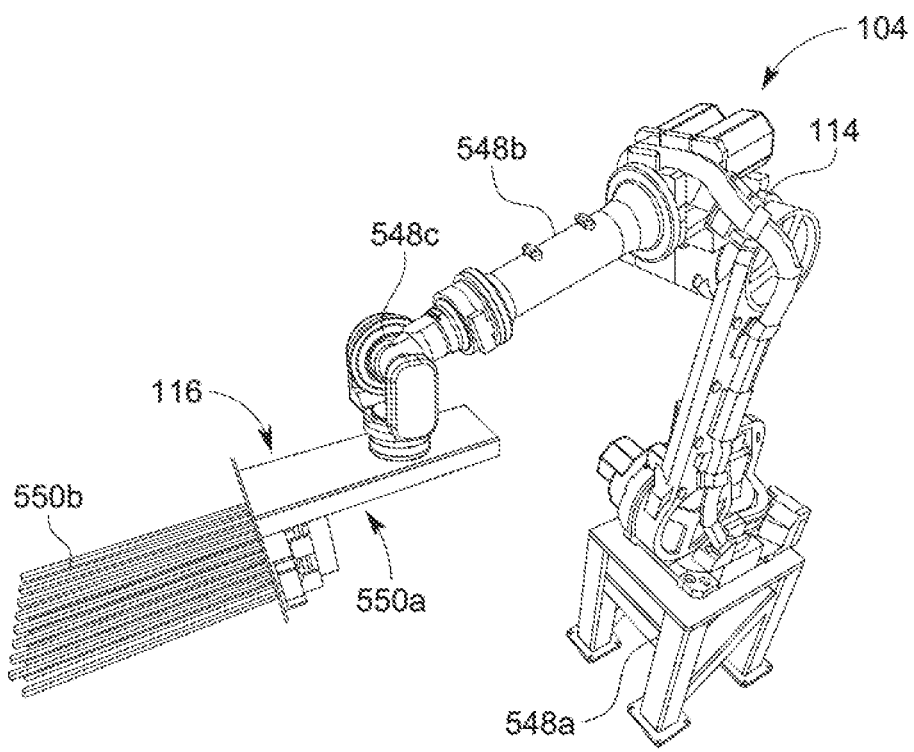
Figure 5C:
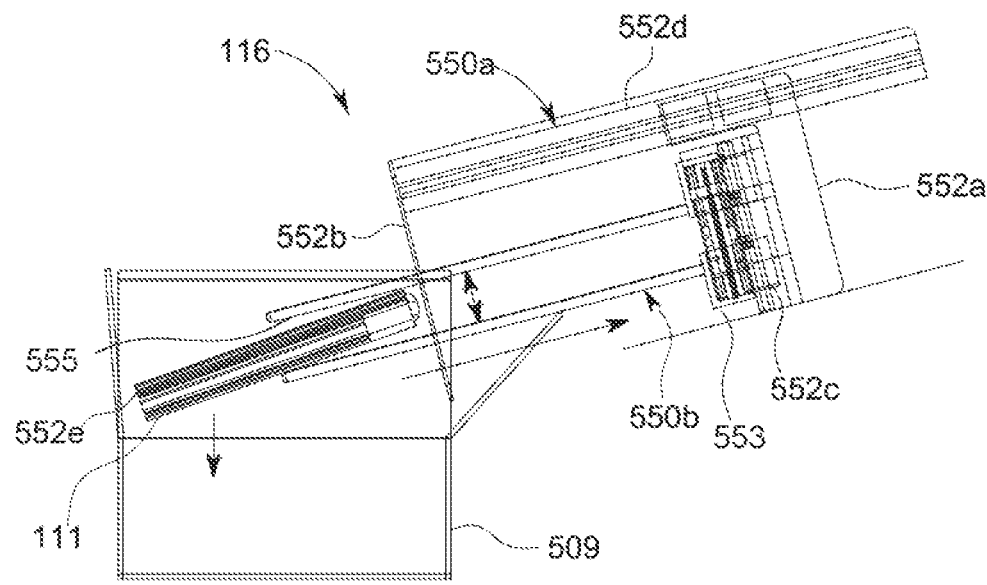
Figure 5D:
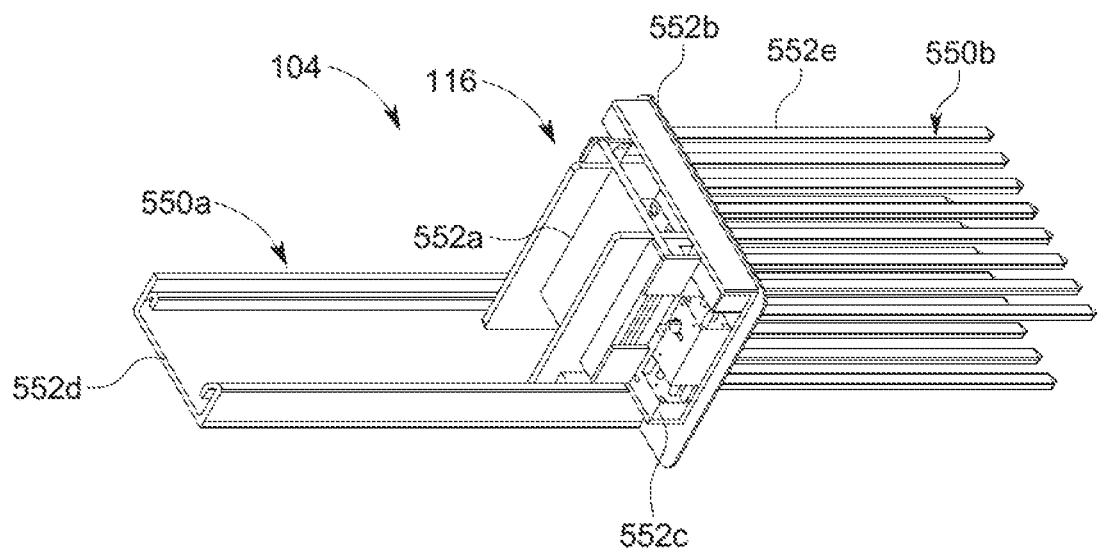
Figure 5E:
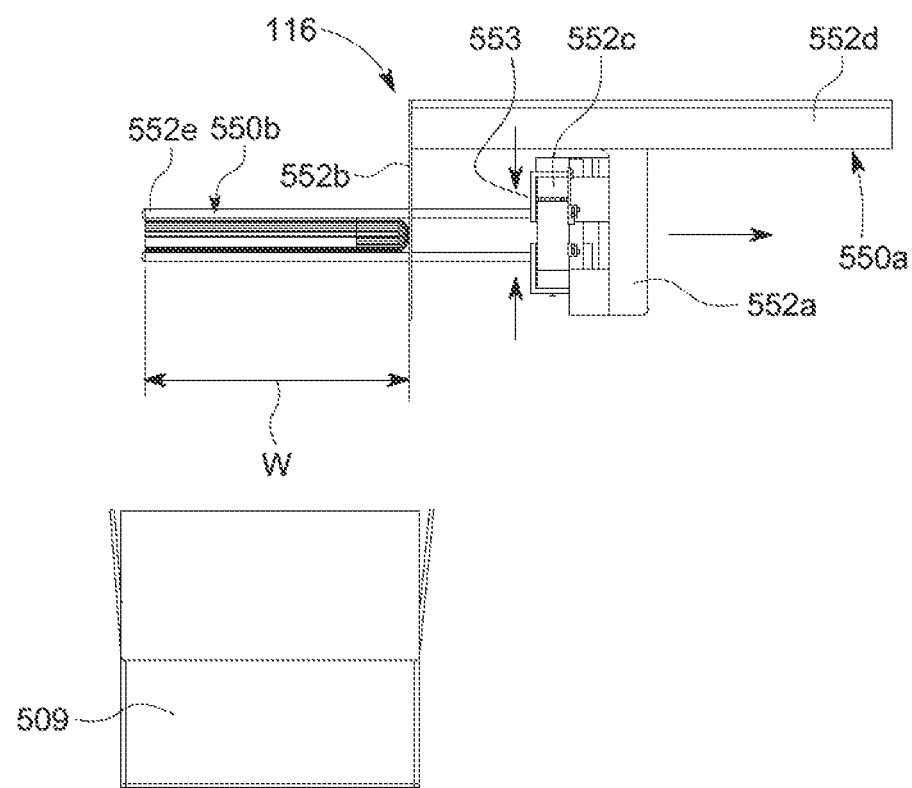

While FIGS. 5A-5C depict an example grip hand 116 with movable sets of the fingers 552e for gripping the items 111, it will be appreciated that the grip hand 116 may also be used for manipulating the totes 108, the shipping containers 509, the conveyor 102, and other portions of the handling system 100. It will also be appreciated that the grip hand 116 may be in various forms, such as the grip hand 116 of FIGS. 5A-5C, as well as other versions, such as an adjustable grip hand with selectively extendable fingers and a merger grip hand as described further herein.

Figure 6A:
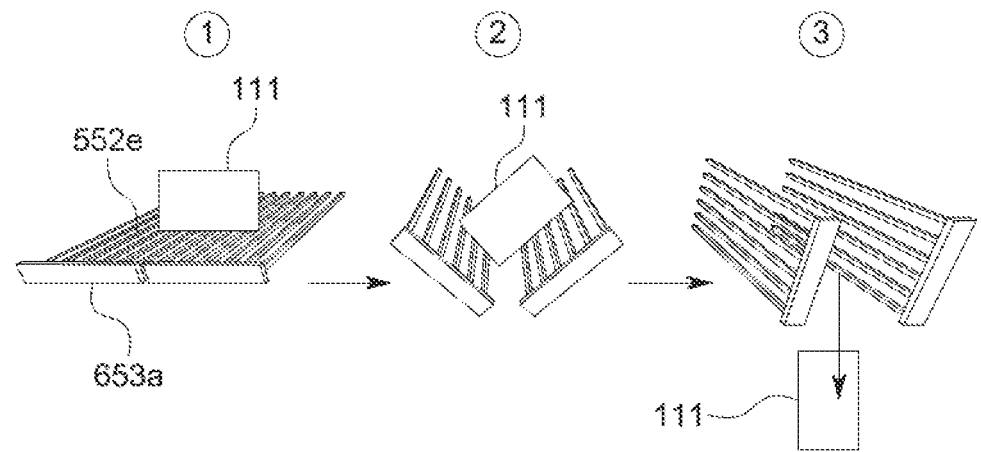
FIGS. 6A-6B are schematic diagrams depicting example configurations of fingers of the grip hand.
Figure 6B:
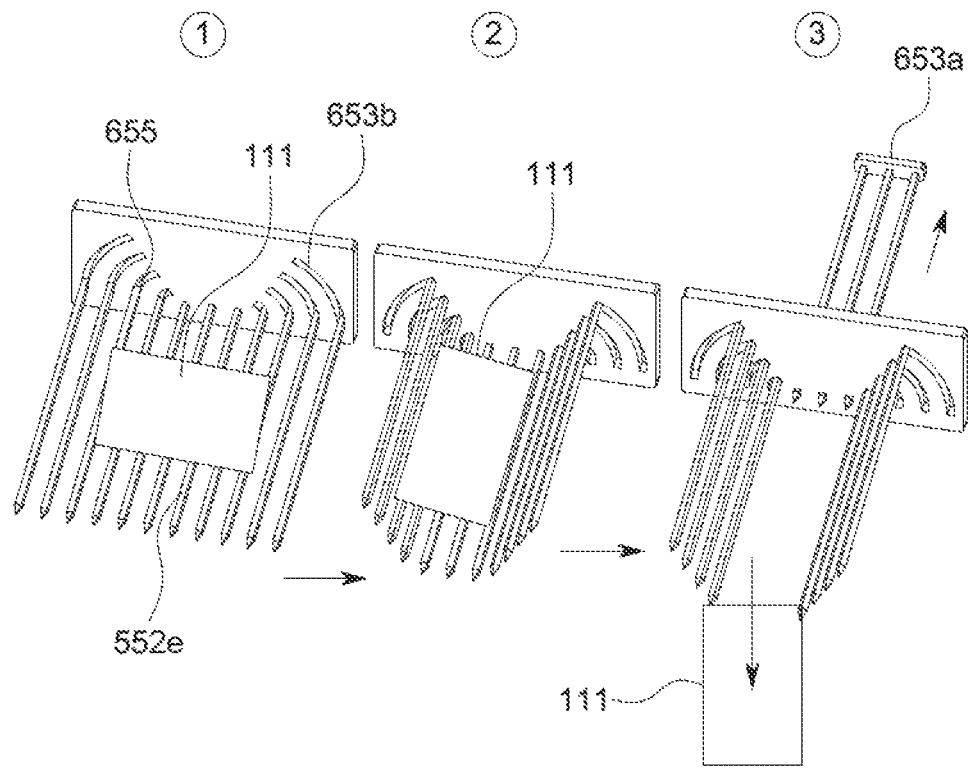

FIGS. 6A-6B are schematic diagrams depicting example configurations of the fingers 552e of the grip hand 116 (FIGS. 5A-5E). As demonstrated by FIGS. 6A and 6B, the actuators 552c may be activated for various movements about the base 552a to allow for extension, retraction, rotation, etc. of the finger assemblies 550b.

As shown in the flat configurations of FIG. 6A, the fingers 552e may be secured to one or more finger plates 653a. The finger plates 653a may act as (or be coupled to) the plates 553 supported and moved by the actuators 552c on the base 552a of the palm 550a as shown in FIGS. 5A-5E. One or more of the finger plates 653a and corresponding fingers 552e may be arranged to interact with (e.g., lift, grip, etc.) the items 111.

As shown in position 1 of FIG. 6A, the fingers 552e may define a flat surface for supporting the items 111. This flat position may be used for lifting and scooping the items 111. As shown in position 2, the finger plates 653a may be rotated to an angle to support and center the items 111 thereon. As shown in position 3, the finger plates 653 may be rotated to a parallel position to allow the item to fall therebetween (e.g., into the shipping container 509 of FIG. 5E).

As shown in the angled (or curved) configuration of FIG. 6B, finger plates 653a and the guide plates 653b may be provided about the fingers 552e to provide a path for movement of the fingers 552e. As shown in position 1, the fingers 552e may be in a flat orientation about the guide plate 653b. As shown in position 2, an outer portion of the fingers 552e move through slots 655 in the guide plates 653b to define a curved shape for supporting and centering the items 111 on the fingers 552e. An inner portion of the fingers 552e carried by the finger plate 653a may be retracted using the finger plate 653a to define an opening between the fingers 552e to release the items 111 as indicated by the arrow (position 3).

FIGS. 7A-7D2 are schematic diagrams depicting the grip hand 116 positioned in various orientations about the totes 708a-c and shipping containers 509 for use therewith. As shown by these figures, the grip hand 116 may be positioned to pass into various types of totes and shipping containers in various orientations to insert or remove items 111 therefrom.

FIGS. 7A1 and 7A2 show the grip hand 116 being inserted vertically and horizontally, respectively, into the tote 708a. The tote 708a may be similar to the tote 208h of FIG. 2H. This version has side walls 724, front wall 723, chambers 730, and vertical walls 734. As shown in these views, the tote 708a may be positioned in various orientations (e.g., vertically and horizontally) during use with the grip hand 116. The handling robot 114 (FIG. 5A or 5B) may be activated position the grip hand 116 in the proper orientation about the tote 708a for use therewith. The grip hand 116 may be positioned such that the fingers 552e are aligned with the chamber 730 of the tote 708a.

The fingers 552e are insertable into the chamber 730 by advancement of the base 552a along the bearing 552d (and/or by advancement of the grip hand 116 by the robot 114). Once in the chamber 730, the actuators 552c may be engaged to move the fingers 552e together to grip the item(s) 111 for removal from the chamber 730, or to spread the fingers 552e apart to release the item(s) 111 into the chamber 730. Optionally, the grip hand 116 may be advanced to pass the fingers 552e through the receptacles 709 between the tool reliefs 710 of the tote 708a, thereby passing through one or more of the partition walls 734 and one or more of the chambers 730 in the tote 708a.

Figure 7B:
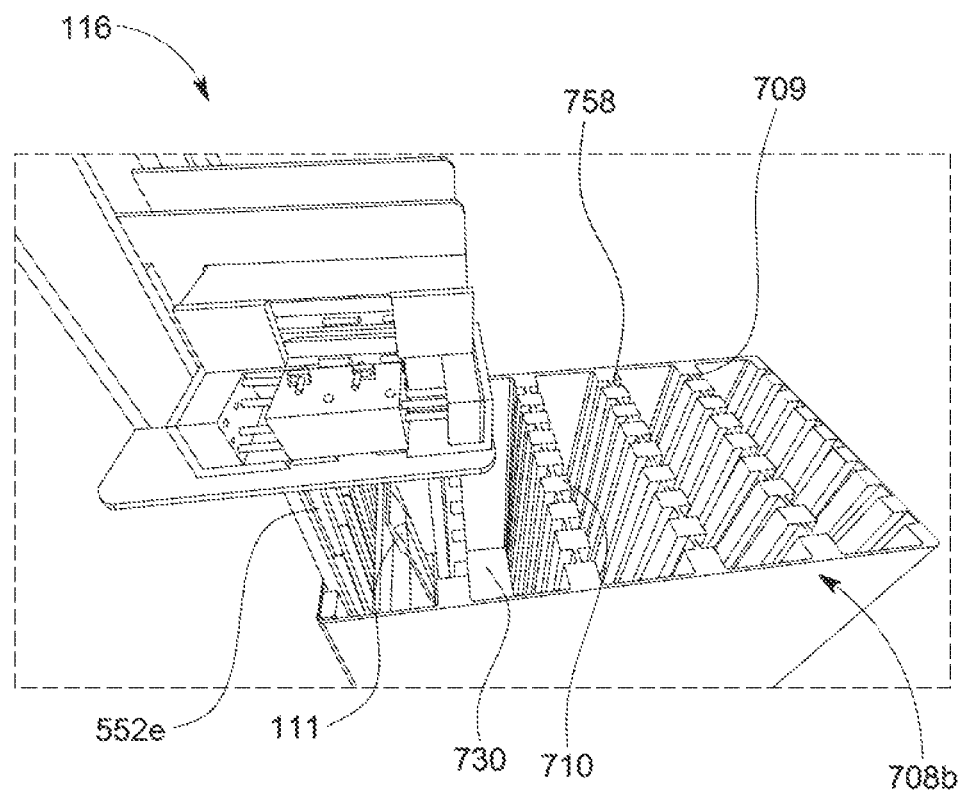

FIG. 7B shows the grip hand 116 in use with the tote 708. The tote 708b is similar to the tote 708a, except that the tool reliefs 710 have been joined by joints 758. The joints 758 may partially or completely obstruct the receptacles 709 to prevent the fingers 552e from passing between the separate chambers 730 of the tote 708b. This version may be used to isolate the items 111 in each chamber 730 and/or to contain the fingers 552e in a single chamber 730 during a gripping operation. The receptacles 709 may be closed, but still define a depression between the tool reliefs 710, thereby permitting the fingers 552e to pass into the receptacles 709 to lift the items 111.

Figure 7C:
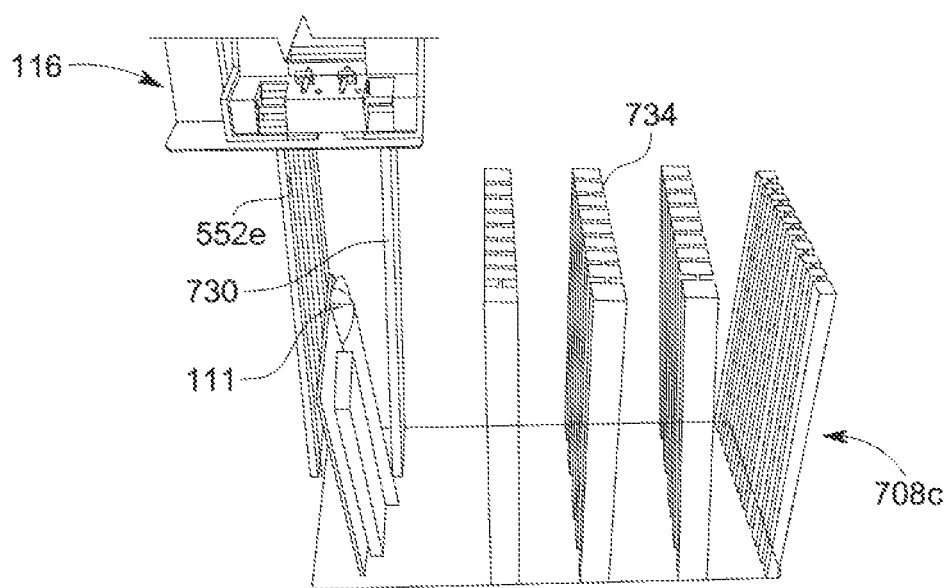

FIG. 7C show the grip hand 116 performing a release operation in the tote 708c. The tote 708c may be similar to the tote 708a with multiple partition walls 734 supported on the bottom 722. For descriptive purposes, some of the side walls 724 of the tote 708c of FIG. 7A1 have been removed to show the items 111 and fingers 552e therein. As demonstrated by this view, the tote 708c may have various configurations including one or more partition walls 734 and one or more chambers 730. As also demonstrated by this view, the grip hand 116 may be positioned so that the fingers 552e enter the chamber 730 and release the items 111. The fingers 552e may be positioned for non-contact with the partition walls 734 (or the side walls 724) of the tote 708c.

FIGS. 7D1 and 7D2 show the grip hand 116 positioned about the shipping container 509 for performing an unloading operation. The shipping container 509 in this version is a box, but any shipping container or tote may be used. In FIG. 7D1, the grip hand 116 is positioned above the shipping container 509 with the item 111 gripped between the fingers 552e. The grip hand 116 may be positioned at an angle above the shipping container 509 in alignment with an opening in the tote 708d. The fingers 552e are in an extended position with the backing plate 552b adjacent an edge of the shipping container 509. The fingers 552e may be sized and positioned to correspond to the width W of the opening in the shipping container 509 to facilitate the unloading operation.

As shown in FIG. 7D2, the fingers 552e may be retracted away from the shipping container 509 and into the grip hand 116 using the actuators 552c. Once retracted, the items 111 are free to fall into the shipping container 509. The backing plate 552b may act as a stop to prevent the items 111 from retracting with the fingers 552e. The fingers 550b may also pass through slots in the backing plate 552b. The backing plates may be used to prevents the items 111 from being carried into the finger assemblies 550b, thereby leaving the items 111 in place when the finger assemblies 550b are retracted through the backing plate 552b.

FIGS. 8A-8B are schematic diagrams depicting the grip hand 116 performing various tote operations. In each of these figures, the grip hand 116 picks (e.g., lifts, grips, etc.) the item 111 from the tote 808 and/or releases (places) the item 111 into a shipping container 509. These diagrams also demonstrate the capability of maintaining an orientation of the items 111 as positioned in the tote 808 when moving the items 111 to the shipping container 509. The tote 808 may be any of the totes described herein with tool reliefs and tote receptacles shaped to receive the fingers 552e therethrough (see, e.g., tool reliefs 210a-h and tool receptacles 209a-h of FIGS. 2A-2H).

FIG. 8A shows the grip hand 116 performing a 'pick and place' tote operation. This operation involves picking (e.g., lifting or scooping) the items 111 up from the tote 808 in steps I-V, and then placing (e.g., lowering) the items 111 in the shipping container 509 in steps VI-IX. In step I, the grip hand 116 is positioned adjacent the tote 808. In step II, the fingers 552e of the grip hand 116 are rotated into alignment with the items 111 in the tote 808. In step III, the fingers 552e are advanced into the tote 808 between the tool reliefs of the tote 808 and then in step IV pass through the receptacles of the tote 808 to lift (scoop up) the items 111. The items 111 rest on the row of fingers 552e. In step 5, the fingers 552e are rotated by the grip hand 116 as the items 111 are lifted from the tote 808 to prevent the items 111 from falling from the fingers 552e.

With the pick operation completed, the items 111 may now be carried by the grip hand 116 to the shipping container 509 to perform the place operation. In step VI, the grip hand 116 is moved to a position with the fingers 552e aligned above the opening in the shipping container 509. In step VII, the grip hand 116 is lowered so that the fingers 552e with the items 111 thereon extend into the opening in the shipping container 509. In steps VIII and IX, the fingers 552e are retracted as described in FIGS. 7D1 and 7D2 to place (e.g., release) the items 111 into the shipping container 509. As shown in these figures, the tote fingers 552e may be positioned at a flat or angled orientation during the operation to facilitate or restrict movement of the items 111 as needed.

FIG. 8B shows the grip hand 116 performing a gripper placing operation for packing the shipping container 509. In this version, the grip hand 116 includes two rows of the fingers 552e that grip the items 111 therebetween as previously described in FIGS. 7D1 and 7D2. In step VI of this version, the grip hand 116 is moved to a position with the fingers 552e aligned above an opening in the shipping container 509. In step VII, the actuators 552c of the grip hand 116 is activated to open the rows of the fingers 552e and un-grip the items 111. In steps VIII and IX, the fingers 552e are retracted as described in FIGS. 7D1 and 7D2 to place (e.g., release) the items 111 to fall into the shipping container 509.

FIG. 8C shows the grip hand 116 packing the shipping container 509 in a split finger packing operation. In this version, the steps VI-IX of packing operation are used to move the items 111 between sets of fingers 552e of the grip hand 116. The actuators 552c of the grip hand 116 rotate the fingers 552e between a horizontal position as shown in step VI to an angled position in step VII, to an open position in step VIII, and to a vertical position in step IX in a manner similar to the fingers 552e of FIG. 6A. In steps VI to VII, the grip hand 116 is moved from a horizontal to an angled position above the tote 808b with the items 111 resting above the opening of the tote 808b on the fingers 552e. As the fingers 552e are rotated, a space is provided between the fingers 552e to allow the item 111 to fall between the sets of the fingers 552e to allow the item 111 to fall into the tote 808b as shown in positioned VIII and IX.

FIGS. 9A, 9B1-9B2, 9C, and 9D are schematic diagrams depicting various loading and picking operations. Each of these figures shows the items 111 loaded onto a tote 908a, b, and the fingers 552e of the grip hand 116 passing through the tote 908a, b to remove the items 111. For descriptive purposes only a portion of a tote 908a, b with tool reliefs 910a, b and the receptacles 909a, b is shown. As demonstrated by these figures, the items 111 may be loaded into the tote 908a, b and removed in a pre-determined position by the grip hand 116.

Figure 9A:
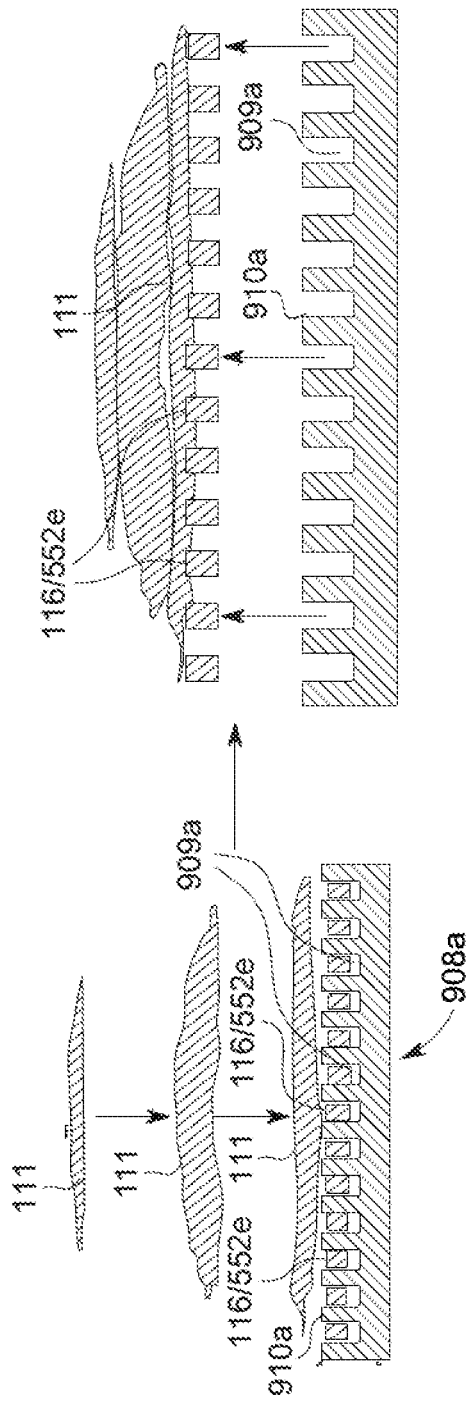
Figure 9A:
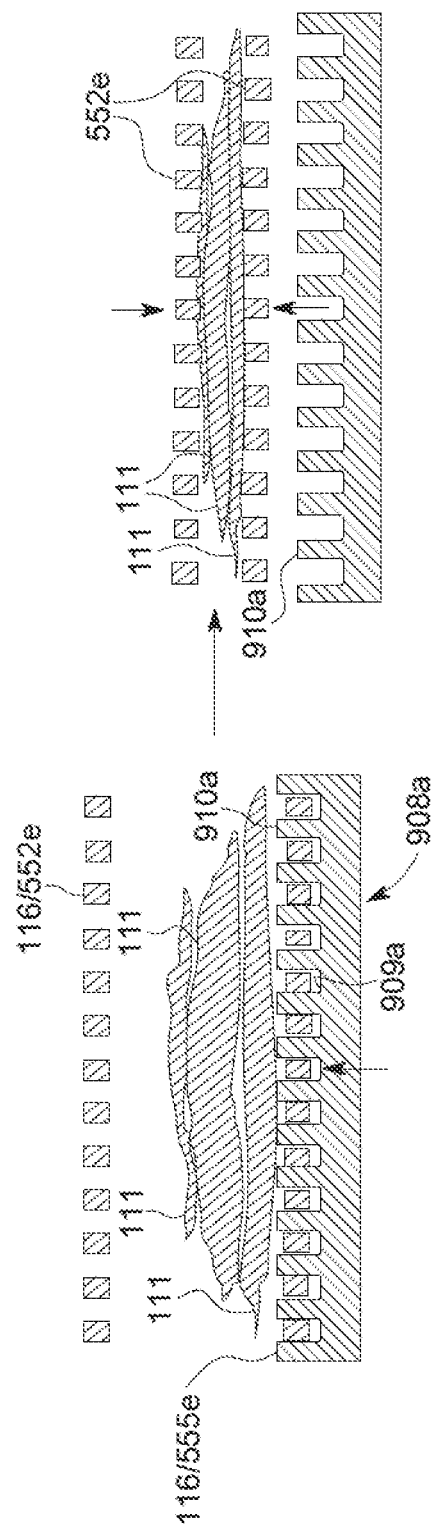

FIG. 9A shows a loading and picking operation using a lifting configuration similar to that of steps I-V of FIG. 8A. In this version, the items 111 are vertically stacked on the flat tool reliefs 910a, and one set of the fingers 552e lifts the items 111 from the tote 908a. The fingers 552e of the grip hand 116 extend between the tool reliefs 910a and into the receptacles 909a below the items 111. The fingers 552e may then be lifted, thereby also lifting the items 111 therewith.

FIGS. 9B1 and 9B2 show a loading and picking operation using a gripping configuration similar to that of FIG. 8B. FIG. 9B1 shows the tote 908a in a horizontal position, and FIG. 9B2 shows the tote 908a in a vertical position with the items 111 loaded and picked therefrom. In FIG. 9B1, the items 111 are vertically stacked and the fingers 552e of the grip hand 116 are inserted into the tote 908a to remove the items 111 similar to the operation in FIG. 9A. In this version, the grip hand 116 includes two sets of fingers 552e capable of moving together to grip the items 111, with one set of the fingers 552e pass into the receptacles 909a between the tool reliefs 910a as in FIG. 9A and the other set of fingers 552e above the items 111. The grip hand 116 may lift both sets of the fingers 552e, thereby also lifting the items 111 from the tote 908a. The sets of fingers 552e may also move together to grip the items 111 in a reverse operation to the movement of the fingers 552e as described in FIG. 5E. In FIG. 9b2, the items are stacked horizontally with the fingers 552e extending into the tote 908a to grip and remove the items 111.

Figure 9C:
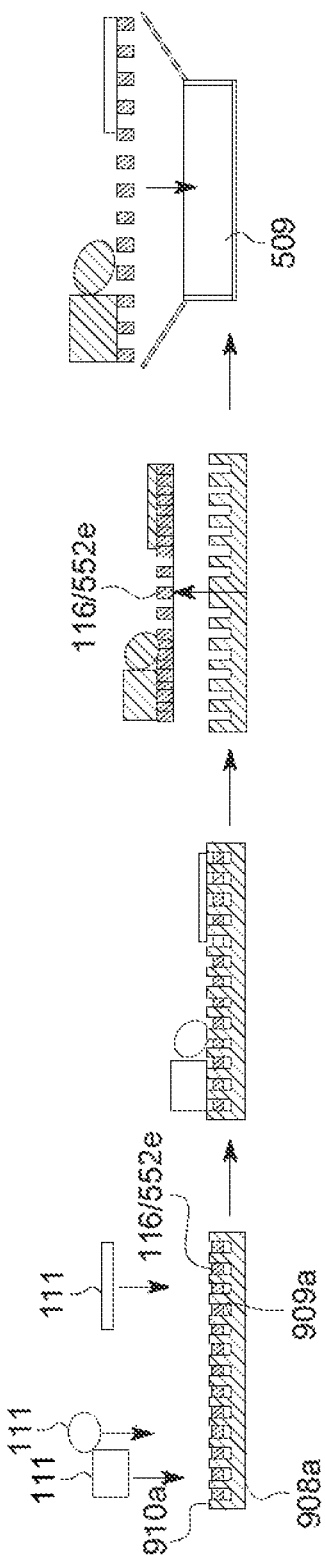

FIG. 9C shows a loading and picking operation using a lifting configuration. This version is similar to that of FIG. 9A, except that, in this version, the items 111 are stacked horizontally about the tool reliefs 910a of the tote 908a. The grip hand 116 has a single set of fingers 552e capable of lifting the items 111 and placing them in the shipping container 509 similar to the operation of steps VI-IX of FIG. 8A. As demonstrated by this figure, the fingers 552e are inserted into the receptacles 909a of the tote 908a to lift the items 111 while maintaining a horizontal arrangement of the items 111 as the fingers 552e lift the items 111 and drop them into the shipping container 509.

Figure 9D:
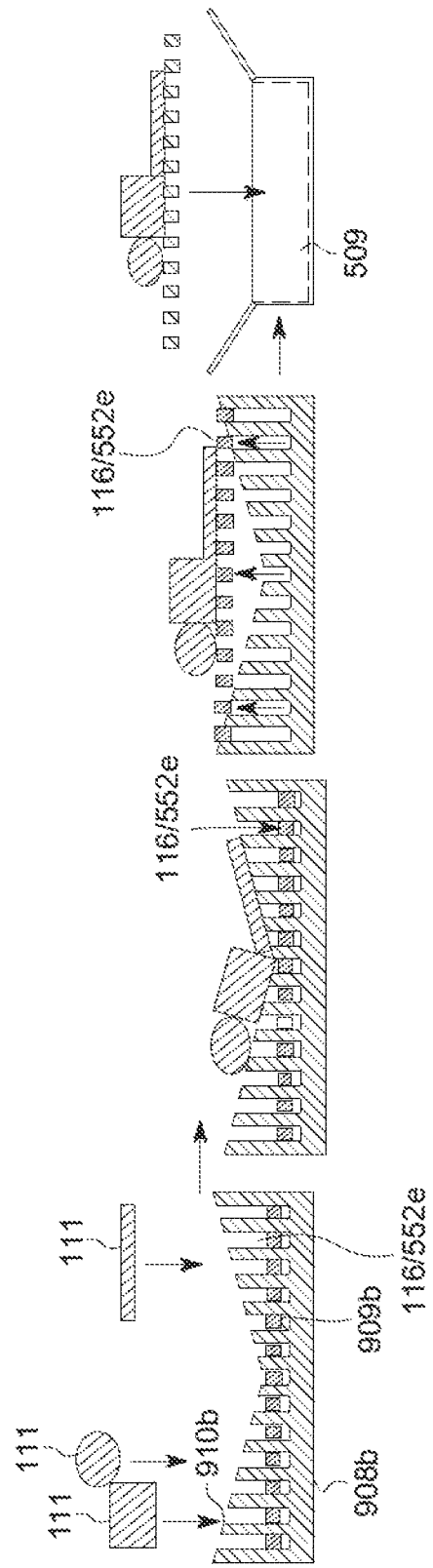

FIG. 9D shows a loading and picking operation using a slanted placement operation. This version is similar to the version of FIG. 9C, except that the tote 908b has slanted tool reliefs 910b similar to those of FIG. 2A. As the items 111 are placed on the slanted tool reliefs 910b, the items 111 are urged toward a middle of the tote 908b and centered along the tool reliefs 910b. The fingers 550 of the grip hand 116 then lift the items 111 and place them in the shipping container 509 in a similar manner to the operation of FIG. 9C.

Figure 10B:
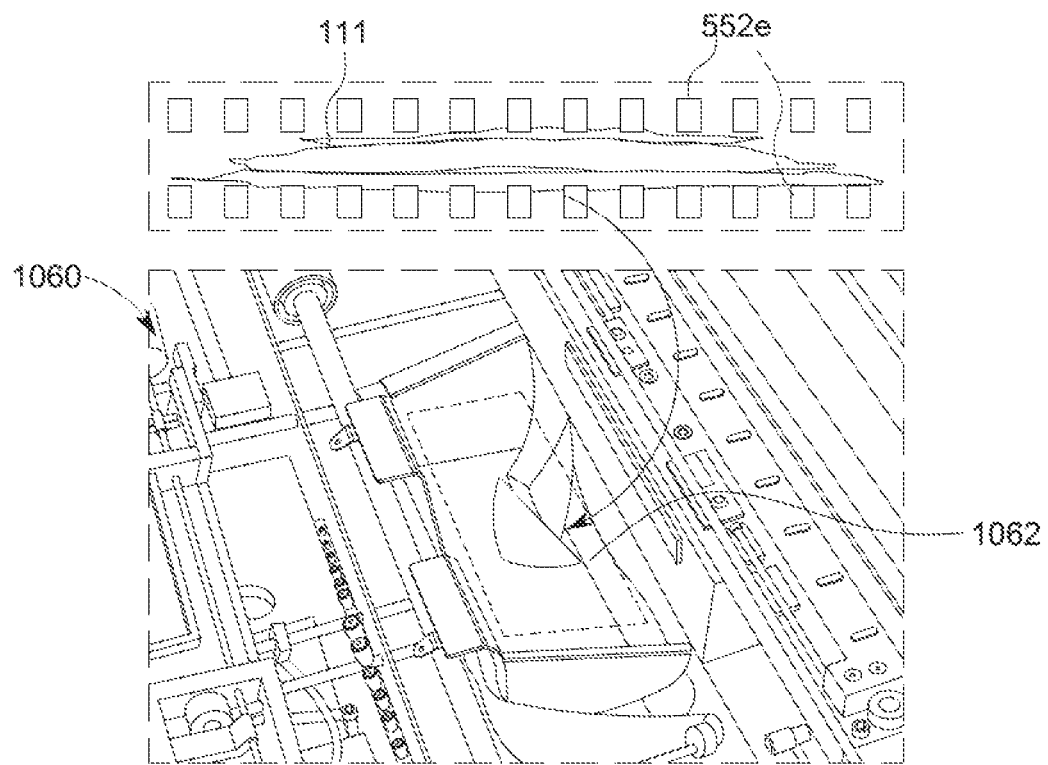

FIGS. 10A-14C show various tote operations using conveyors and other handling equipment. FIGS. 10A1-10A2, 10B, 10C, and 10D are schematic diagrams depicting the grip hand 116 in use with packaging equipment 1060 for packaging the items 111. As shown in FIG. 10A1, the grip hand 116 delivers the items 111 to the packaging equipment 1060. As shown in FIG. 10A2, the grip hand 116 has two sets of fingers 552e gripping the items 111. Upon insertion into the packaging equipment 1060, the fingers 552e expand and then release the items 111 into the packaging equipment 1060 in a manner similar to FIG. 8B. The items 111 are inserted into the packing machine 1060 with the fingers 552e (step I), the fingers 552e move to an ungripped position (step II), and then the fingers 552e are retracted to release the items 111 so that the packing equipment 1060 may surround and seal the items with the plastic 1062 (step III).

FIG. 10B shows a portion of the packing machine 1060 depicting the unloading of the items 111 from the fingers 552e in greater detail. In this example, the packaging equipment 1060 is a semi-automatic polybag machine capable of encasing the items 111 in plastic 1062. As also shown, the items 111 are stacked between the fingers 552e during insertion into the machine.

Figure 10C:
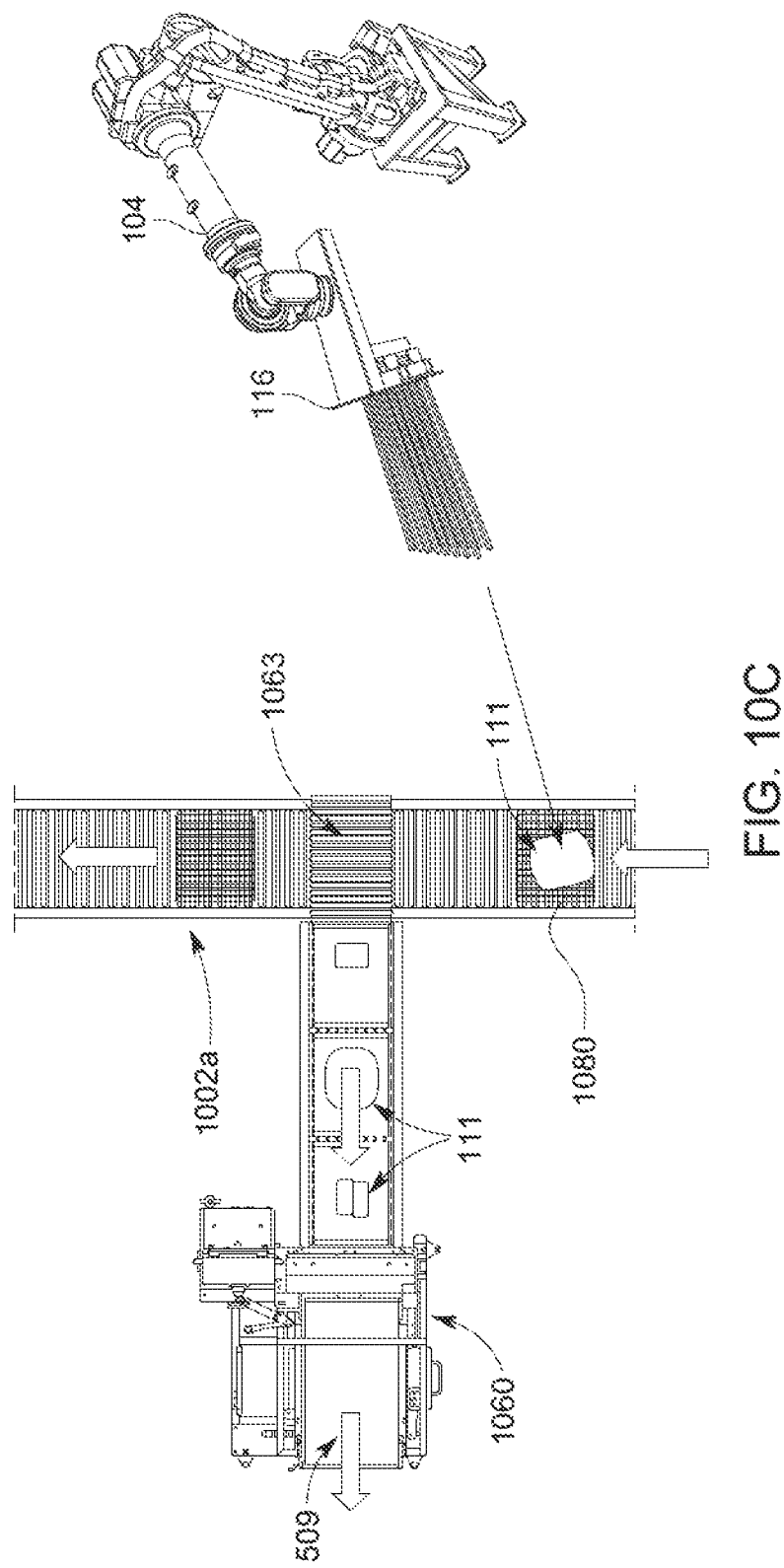

FIG. 10C conceptually shows the grip hand 116 in use with a tote conveyor 1002a. In this example, the tote handler 104 passes items 111 into totes 1080 on the tote conveyor 1002a. The tote conveyor 1002a passes the totes 1080 to the packaging equipment 1060. Various devices may be provided along the tote conveyor 1002a, such as a transfer (or diverter) 1063 for passing the totes 1080 between conveyors, and a packaging equipment 1060 for packaging (e.g., box, bag, cover in plastic, etc.) and labeling the items 111 for shipment in the shipping containers 509.

Figure 10D:
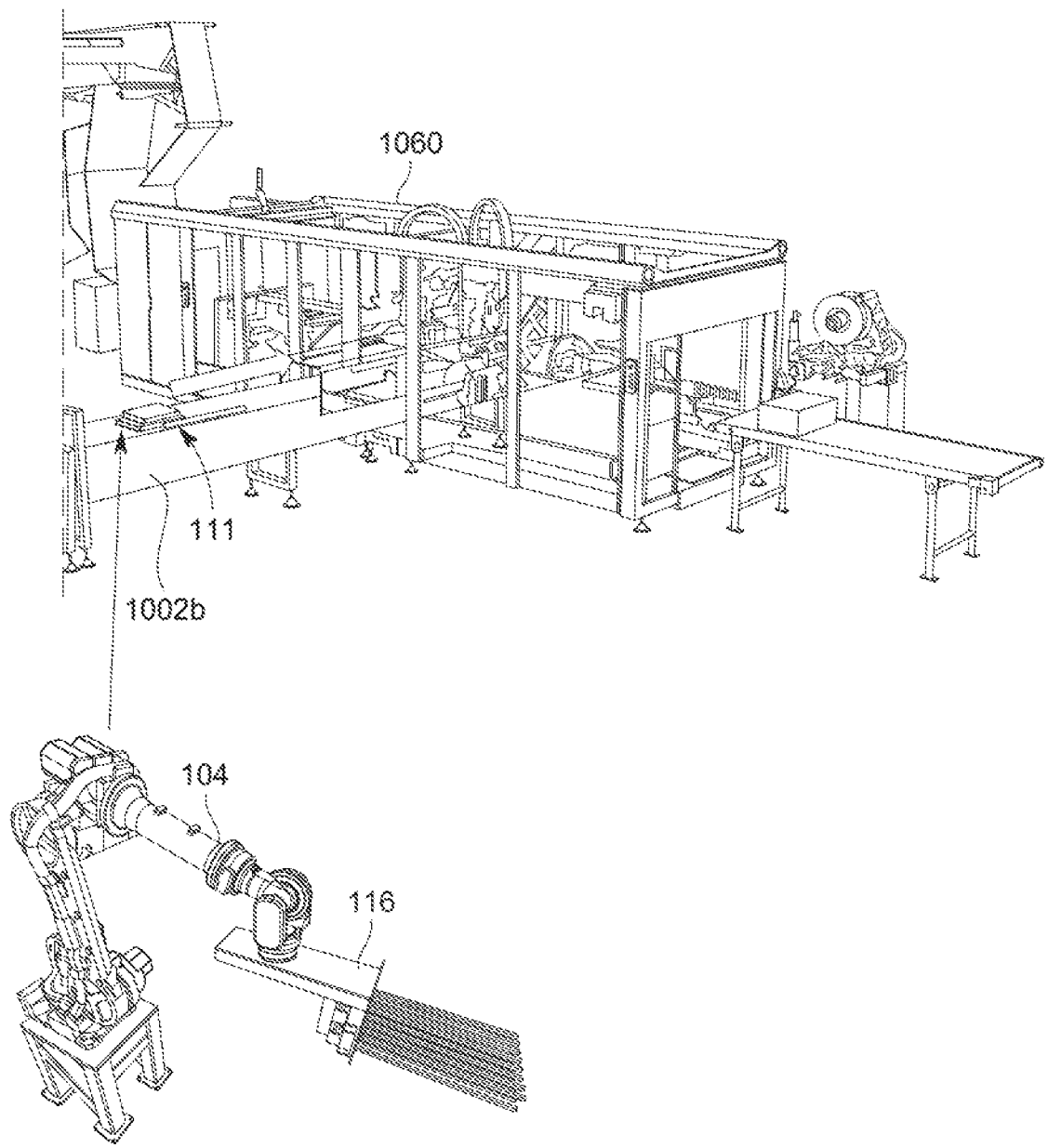

FIG. 10D shows the tote handler 104 in use with another tote conveyor 1002b.

As shown in this example, the tote handler 104 may unload the items 111 from the tote 1080 onto the tote conveyor 1002 in a specific configuration for packaging in the packaging equipment 1060.

FIG. 11A-11E are schematic diagrams depicting various configurations of the tote conveyor 1102. As shown in these views, the tote 1108 may be used with a variety of tote conveyors for performing transport operations for moving the totes 1108 to desired locations for picking, placing, loading, and/or other tote operations. The tote conveyors 1102 may have a variety of conveyor portions 1102a1, 1102a2 that form desired pathways, and may have transfers 1103 for directing the totes 1108 therebetween. The tote handler 104 may be positioned about one or more of the conveyor portions 1102a1, 1102a2 for picking, placing, or otherwise handling the items 111 about the conveyor 1102 for use with various equipment as demonstrated by FIGS. 10A-10D.

Figure 11A:
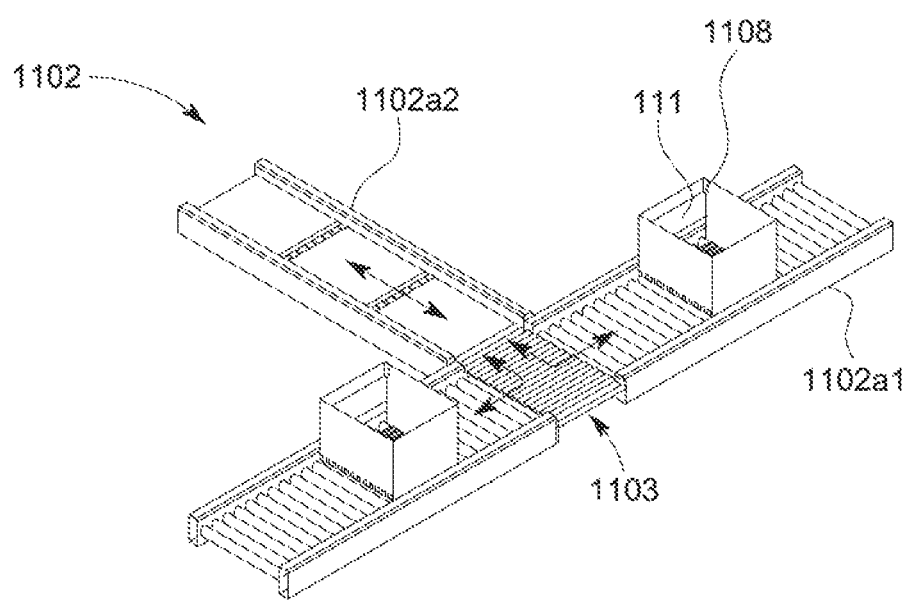
FIG. 11A-11E are schematic diagrams depicting various configurations of portions of the tote conveyor.
Figure 11B:
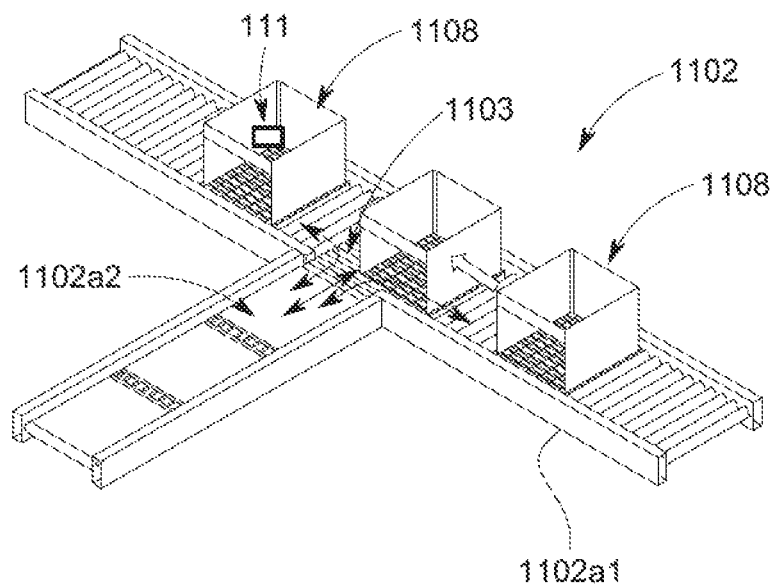

FIGS. 11A and 11B show the tote conveyors 1102 as including first conveyor portions 1102a1 and a second conveyor portion 1102a2 connected by a transfer 1103 for transporting the tote 1108 and items 111. The first and second conveyor portions 1102a1, 1102a2 may be conventional conveyors with rollers, belts, or other devices capable of supporting and transporting the totes 1108. The first and second conveyor portions 1102a1, 1102a2 may be passive or driven by a motor or other device. The transfer 1103 may be a conventional transfer 1103, such as a belt or roller transfer (or diverter), capable of redirecting the totes 1108 from the first convey portion 1102a1 to the second conveyor portion 1102a2.

In the example of FIG. 11A, the tote 1108 with items 111 therein passes from the first conveyor portion 1102a1 to the second conveyor portion 1102a2 via the transfer 1103. The items 111 are unloaded from the tote 1108 at the second conveyor portion 1102a2. The empty tote 1108 then returns to the first conveyor portion 1102a1 via the transfer 1103 and continues along a remainder of the first conveyor portions 1102a1.

In the example of FIG. 11B, multiple totes 1108 with the items 111 may be staged for selective movement from the first conveyor portion 1102a1 to the second conveyor portion 1102a2, thereby unloading items 111 from each of the totes 1108 in a specific order. The conveyor 1102 may be programmed to selectively advance one or more of the totes 1108 in a desired sequence for selective sorting and unloading the items 111.

Figure 11C:
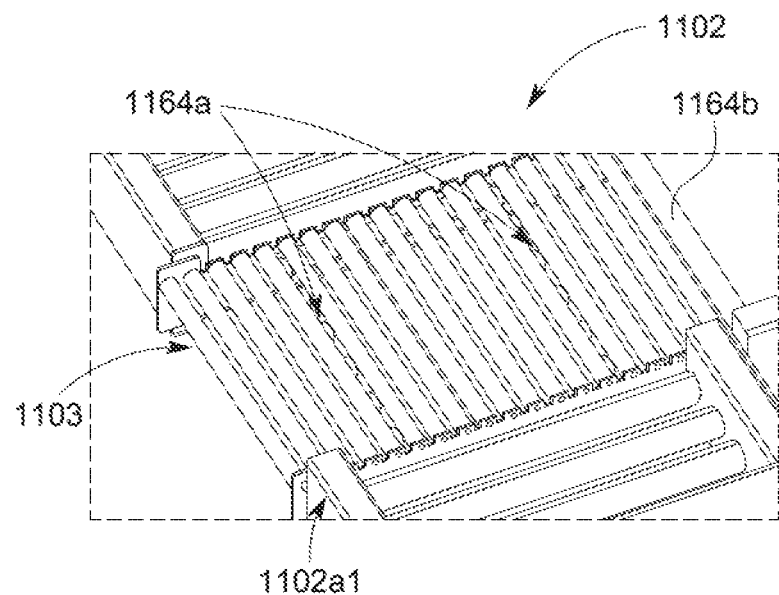
Figure 11D:
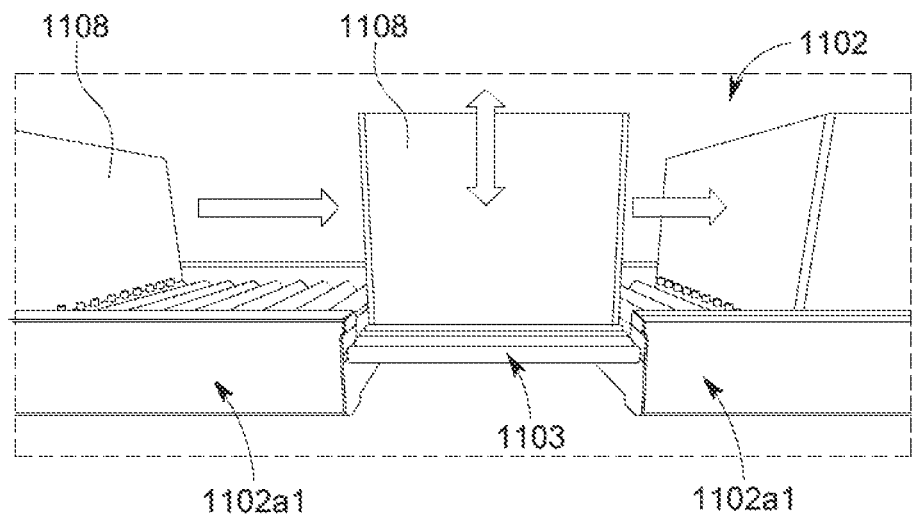

FIGS. 11C and 11D show portions of the conveyor 1102 in greater detail. As shown in FIG. 11C, the transfer 1103 may include transfer belts 1164a and long rollers 1164b that are selectively activated to engage the tote 1108 and steer the tote 1108 in the desired direction to the desired conveyor portion 1102a1 or 1102a2 (FIGS. 11A and 11B). The transfer belts 1164a may be bands that lift above the transfer rollers 1164b and rotate in a direction aligned with the first conveyor portion 1102a1. The transfer rollers 1164b may be positioned below the first conveyor portion 1102a1 and be positioned at a level similar to the second conveyor portion 1102a2 (FIGS. 11A and 11B). The transfer rollers 1164b may be driven to rotate in a direction aligned with the second conveyor portion 1102a2 (FIGS. 11A and 11B).

As shown in FIG. 11D, the conveyor portions 1102a1 are conventional roller driven conveyors connected to the transfer rollers 1164b of the transfer 1103. The tote 1108 is advanced from the first conveyor portion 1102a1 onto the transfer 1103 by raising and rotating the transfer belts 1164a. The transfer belts 1164a lower to allow the transfer rollers 1164b to engage and drive the tote 1108 onto the second conveyor portion 1102a2 as shown in FIGS. 11A and 11B. The second conveyor portion 1102a2 may then move the tote 1108 to and from the transfer 1103. The transfer 1103 may advance the tote 1108 back onto the first conveyor portion 1102a1 in either direction after the tote 1108 returns from the second conveyor portion 1102a2 (FIGS. 11A and 11B). One or more of the transfers 1103 and conveyor portions 1102a1, 1102a2 may be used to cycle the items 111 to desired locations as needed.

Figure 11E:
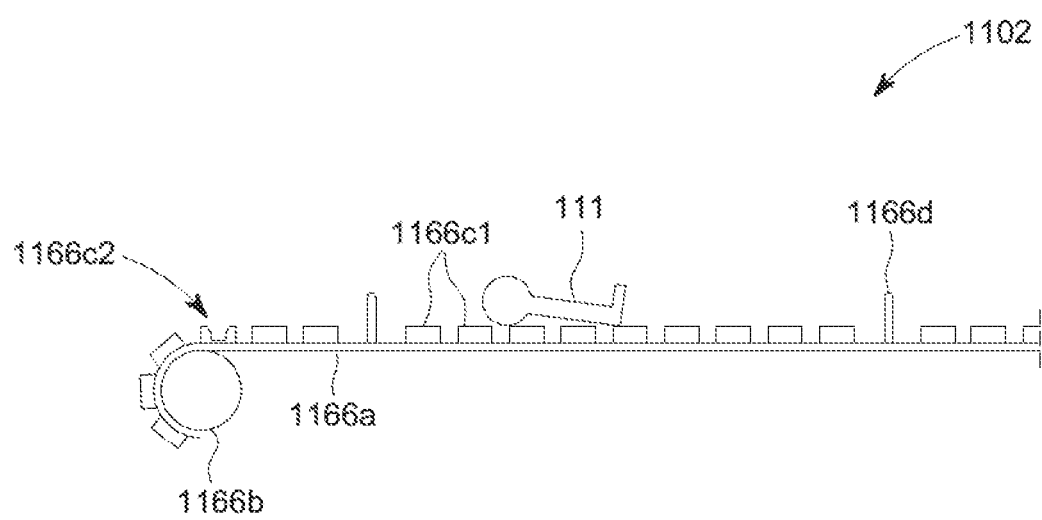

The tote conveyor 1102 may be provided with additional features to facilitate transport operations. For example, as shown in FIG. 11E, the conveyor 1102 may be belt conveyors with a belt 1166a driven around a head stock roller 1166b and provided with tool reliefs 1166c1 and belt reliefs 1166c2 for engaging the tote 1108. For descriptive purposes only a portion of the conveyor 1102 is shown, but may continue around the headstock roller to form a complete loop. The tool reliefs 1166c1 may include raised portions to support the totes 1108. The belt reliefs 1166c1 may include raised portions that support and flex the belt 1166a as it rotates around the head stock roller 1166b. Cleats 1166d may also be provided to separate certain totes 1108 and/or items 111 placed on the conveyor 1102. Other features, such as cutting devices, scanners, limit switches, computers, bins, and other devices may be provided about the tote conveyor 1102.

FIG. 12A-12H are schematic diagrams depicting various configurations of a tote transfer 1103. As shown in these views, the tote 1208 is configured to carry item 111 and to operate with the tote transfer 1103 to facilitate movement of the tote 1208 by the transfer 1103. The transfer 1103 may engage the tote 1208 and change a direction of travel of the tote 1208. The tote transfer 1103 may move the tote 1208 about the first conveyor portion 1102a1 and the second conveyor portion 1102a2 as described in FIGS. 11A-11D.

Figure 12A:
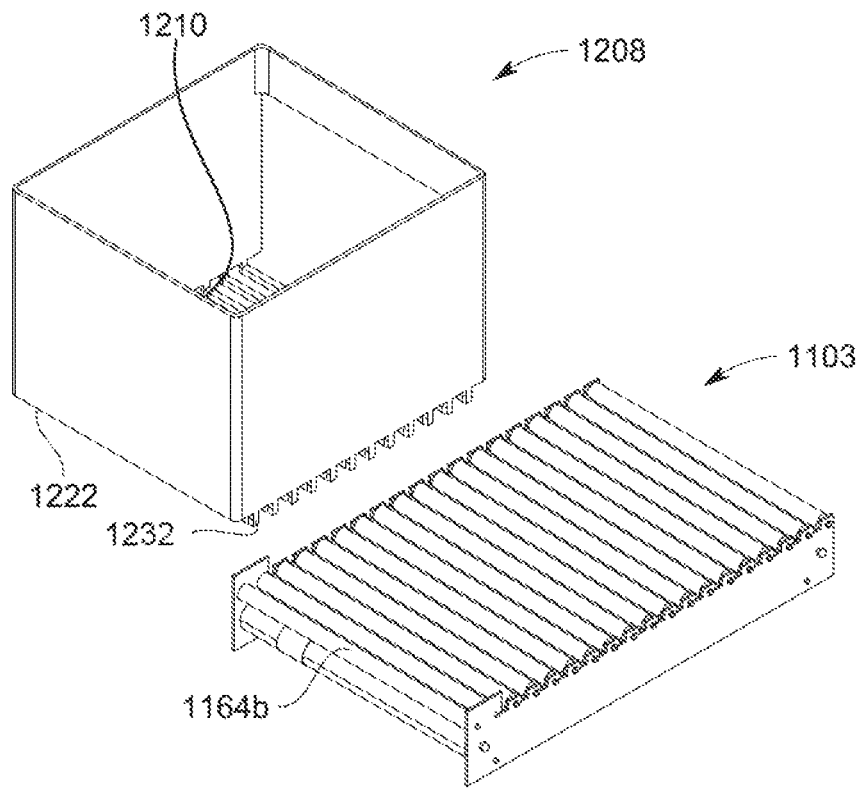
FIG. 12A-12H are schematic diagrams depicting various configurations of a conveyor tote and a conveyor tote transfer.
Figure 12B:
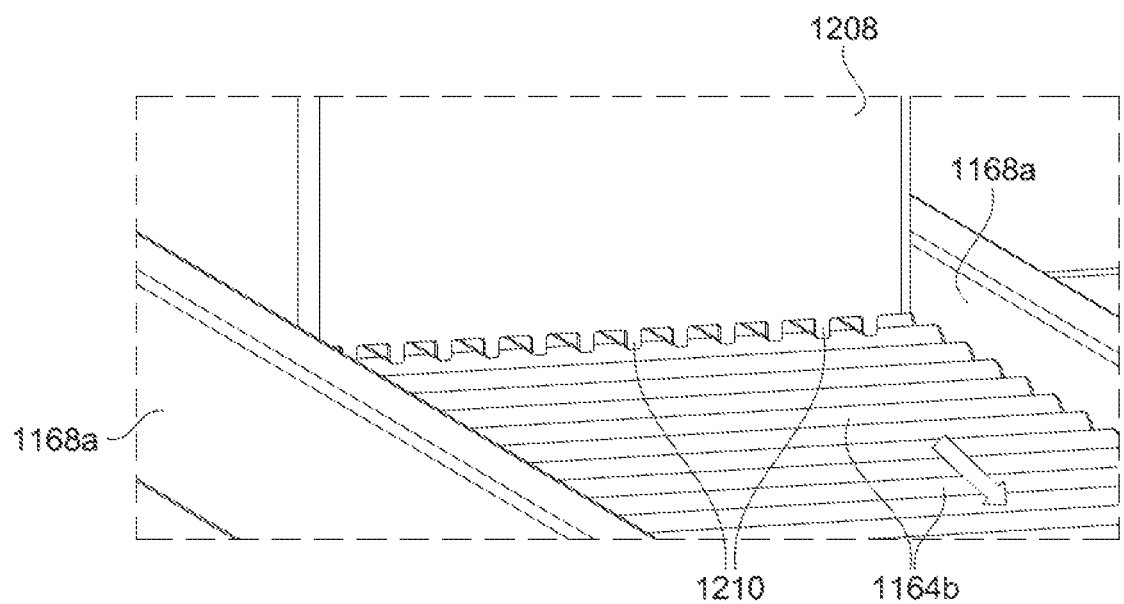
Figure 12C:
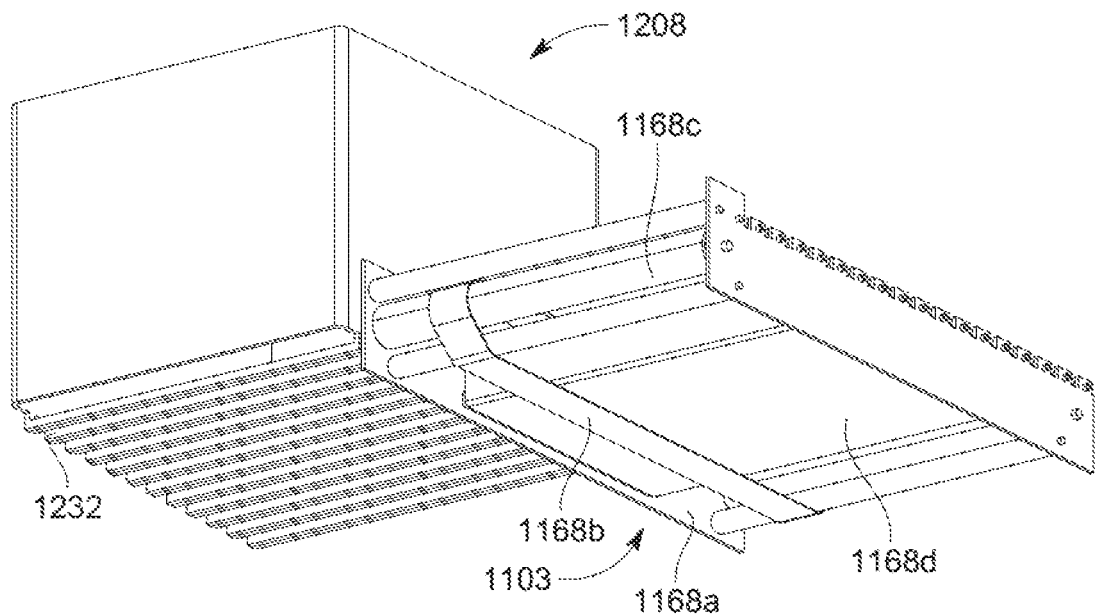
Figure 12D:
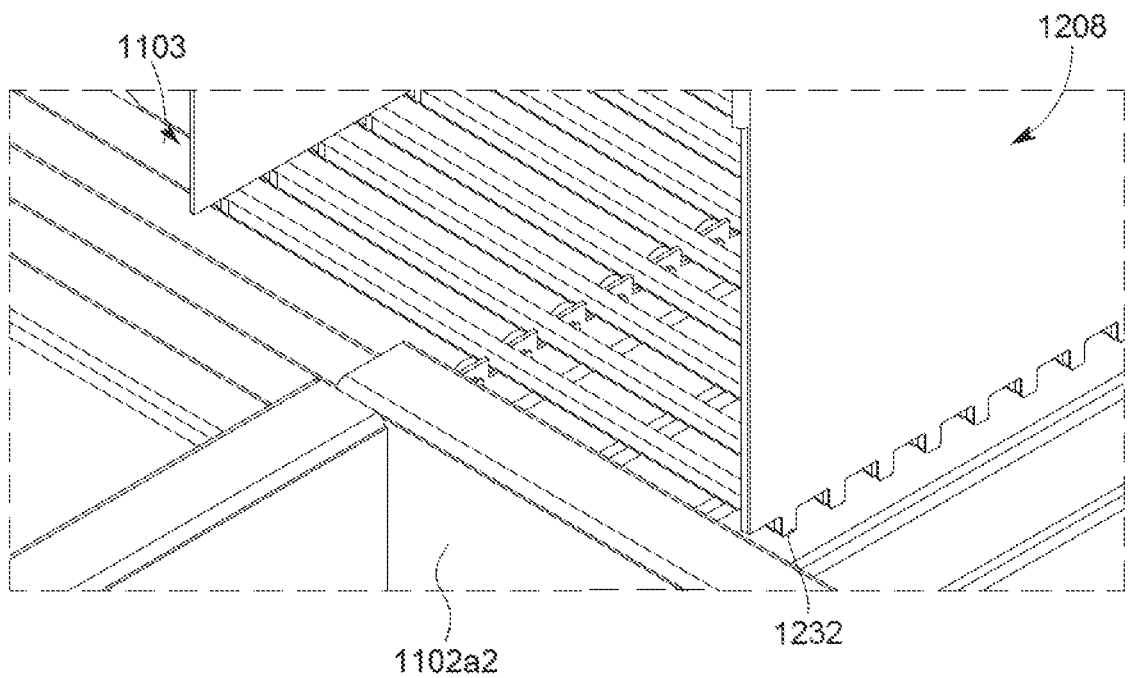
Figure 12E:
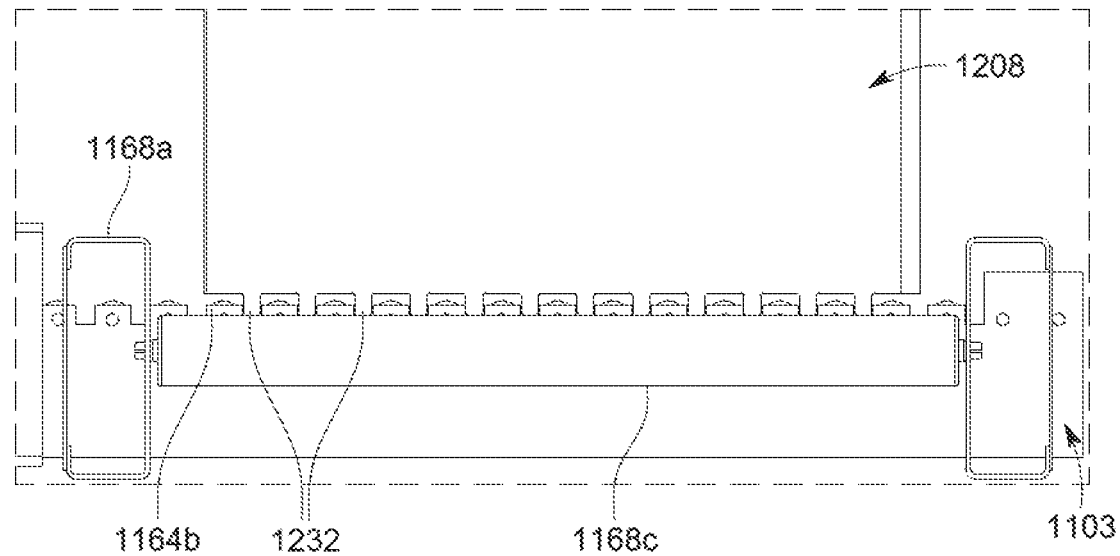
Figure 12F:
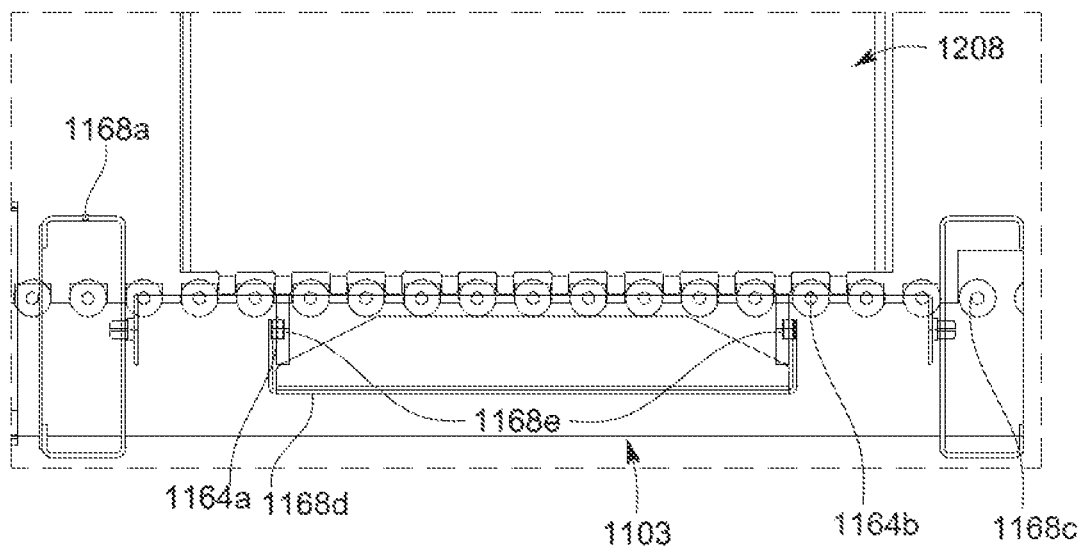
Figure 12G:
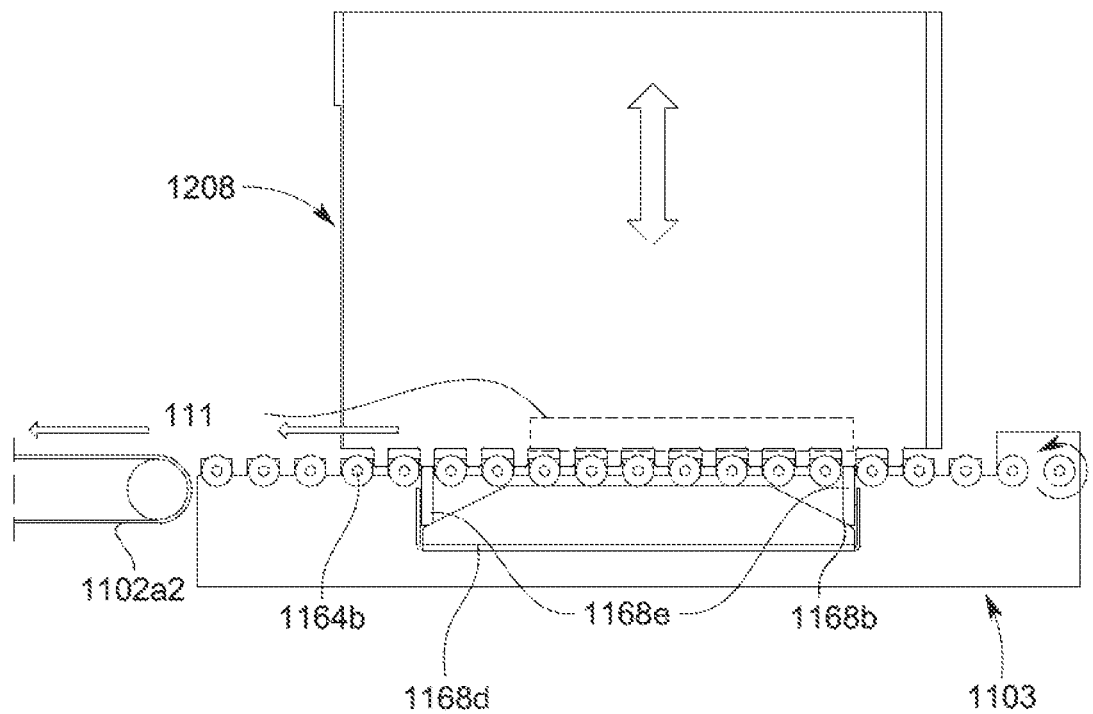
Figure 12H:
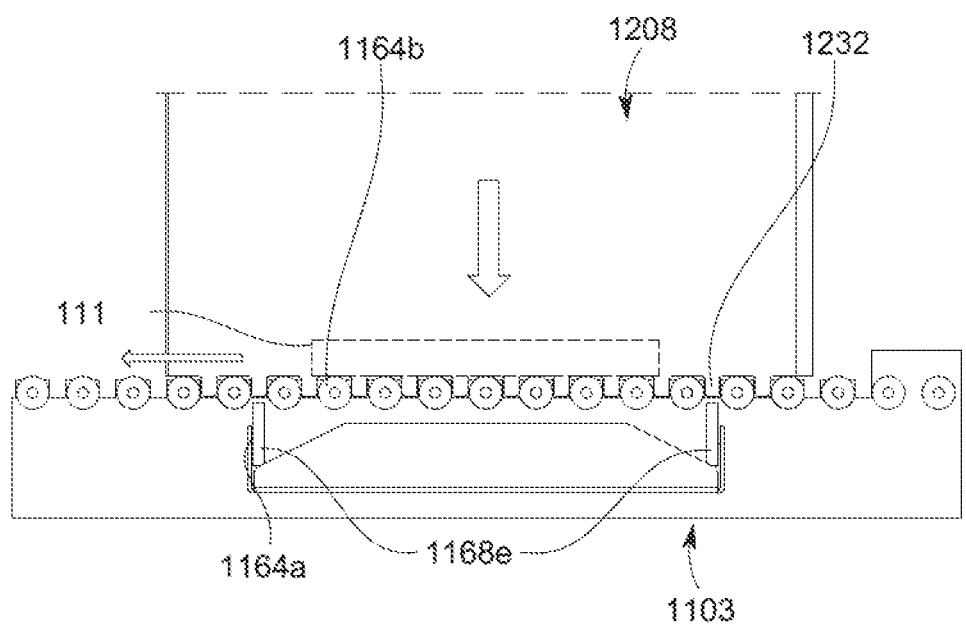

As shown in FIG. 12A-12C, the tote 1208 may be similar to the tote 208c of FIG. 2C. In this example, the conveyor reliefs 1232 extend below the tool reliefs 1210 from the bottom 1222 of the tote 1208 a distance therebelow to engage the transfer 1103. The conveyor reliefs 1232 may be oriented on the first and second conveyor portions 1102a1, a2 such that the tote 1208 is supported and can slidably move thereon as shown in FIG. 12B. In this position, the tote 1208 may be moved onto the transfer 1103 by the transfer belts 1164a as shown in FIG. 11A-11D. The tool reliefs 1210 are shaped to fit between the tote rollers 1164b of the tote transfer 1103 as shown in FIGS. 12E-12F. Once the transfer belt 1164a lowers (FIG. 11D), the tool reliefs 1232 may fall into gaps between the tote rollers 1164b as shown in FIGS. 12G-12H.

As also shown in FIGS. 12A-12H, the tote transfer 1103 includes a frame 1168a, a drive belt 1168b, a drive roller 1168c, and a carriage 1168d. The frame 1168a is notched to correspond to the tool reliefs 1232 as shown in FIG. 12E. The drive roller 1168c rotates the drive belt 1168b which rotates the transfer rollers 1164b. The carriage 1168d is supported on the frame 1168a, and rotationally supports the belts 1164a thereon. Belt rollers 1168e are also supported on the carriage 1168d for rotating the belts 1164a.

Figure 13A:
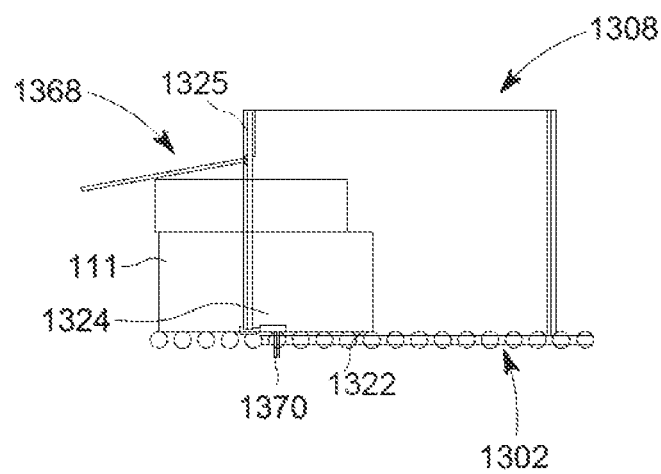
FIG. 13A-13C are schematic diagrams depicting the conveyor tote having a tote door.
Figure 13B:
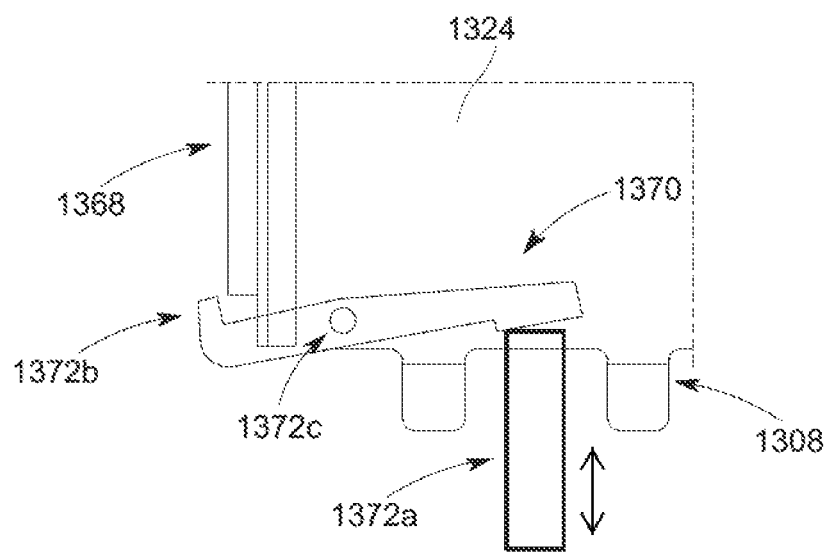
Figure 13C:
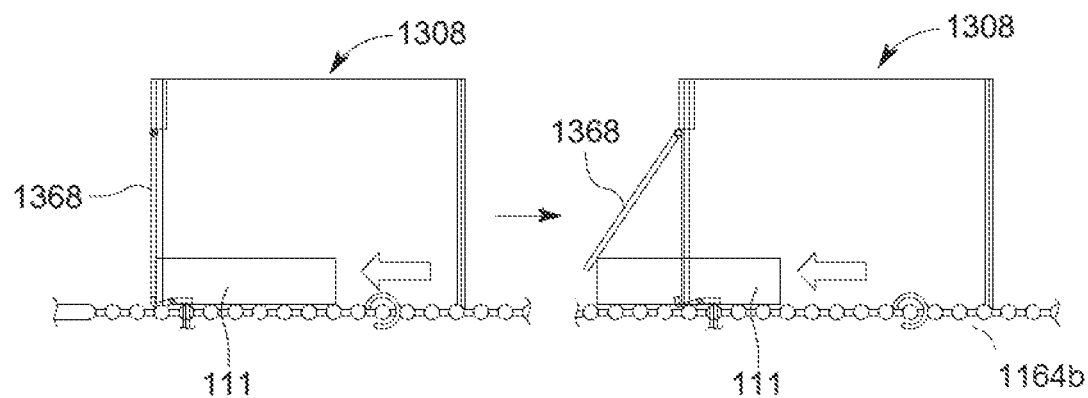

FIG. 13A-13C are schematic diagrams depicting another tote 1308. This tote 1308 is similar to the tote 208c of FIG. 2C, except with a conveyor door 1368. This tote 1308 may be used to activate the conveyor 1302 to remove the items 111 from the tote 1308. The tote 1308 has the conveyor door 1368 hingedly connected to the front wall 1325. The conveyor door 1368 may lift open to reveal the items 111 in the tote 1308 as shown in FIG. 13A.

The tote 1308 is slidably movable along the conveyor 1302. This conveyor 1302 may be similar to the conveyor 1102 of FIGS. 11A-11E, except that the conveyor 1302 is provided with a latch 1370 engageable with the wall 1324 and/or bottom 1322 of the tote 1308. The latch 1370 includes a support bar 1372a, a catch 1372b, and a pivot 1372c. The support bar 1372a may be a linear member connected to the conveyor 1302. The catch 1372b may be an L-shaped member pivotally connected to the conveyor 1302 by the pivot 1372c as schematically shown.

As shown in FIG. 13C, the support bar 1372a may be axially moved to engage and rotate the catch 1372b. Upon rotation of the catch 1372b, a leading tip of the catch 1372b moves to a position above the conveyor 1302 for engagement with the tote 1308. As the tote 1308 passes along the conveyor 1302, the tote 1308 may be stopped by the catch 1372b. Rotation of the rollers 1164b of the conveyor 1302 may urge the items 111 in the tote 1308 to continue advancing along the conveyor 1302 while the tote 1308 is prevented from advancing by the catch 1372b. As the item 111 continues to advance, the item 111 pushes the conveyor door 1368 open. The item 111 continues along the conveyor 1302 apart from the tote 1308.

Figure 14A:
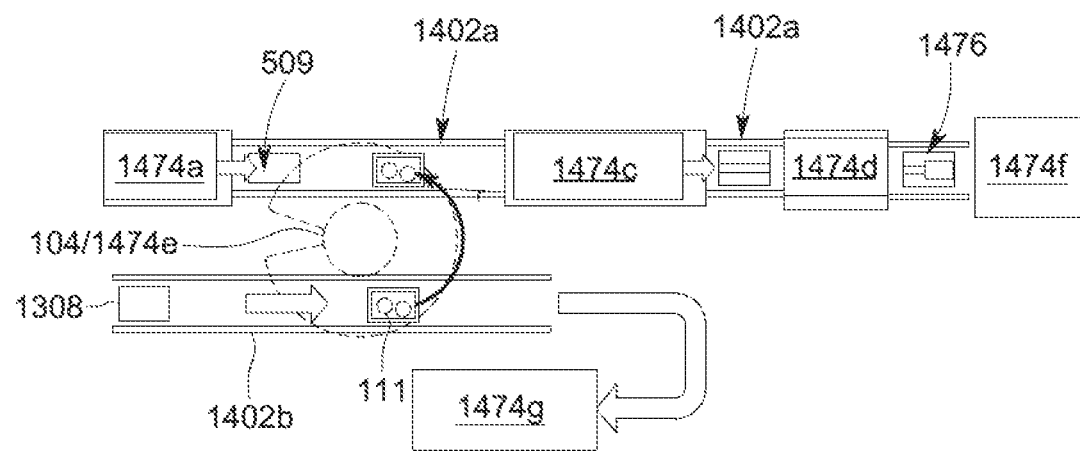
FIG. 14A-14C are schematic diagrams depicting example layouts of tote handling system operations.
Figure 14B:
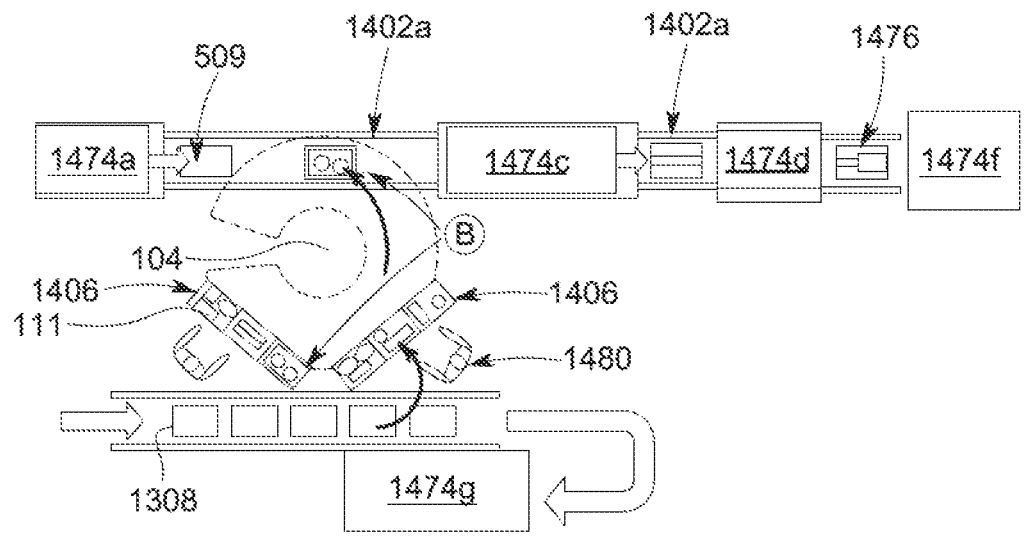
Figure 14C:
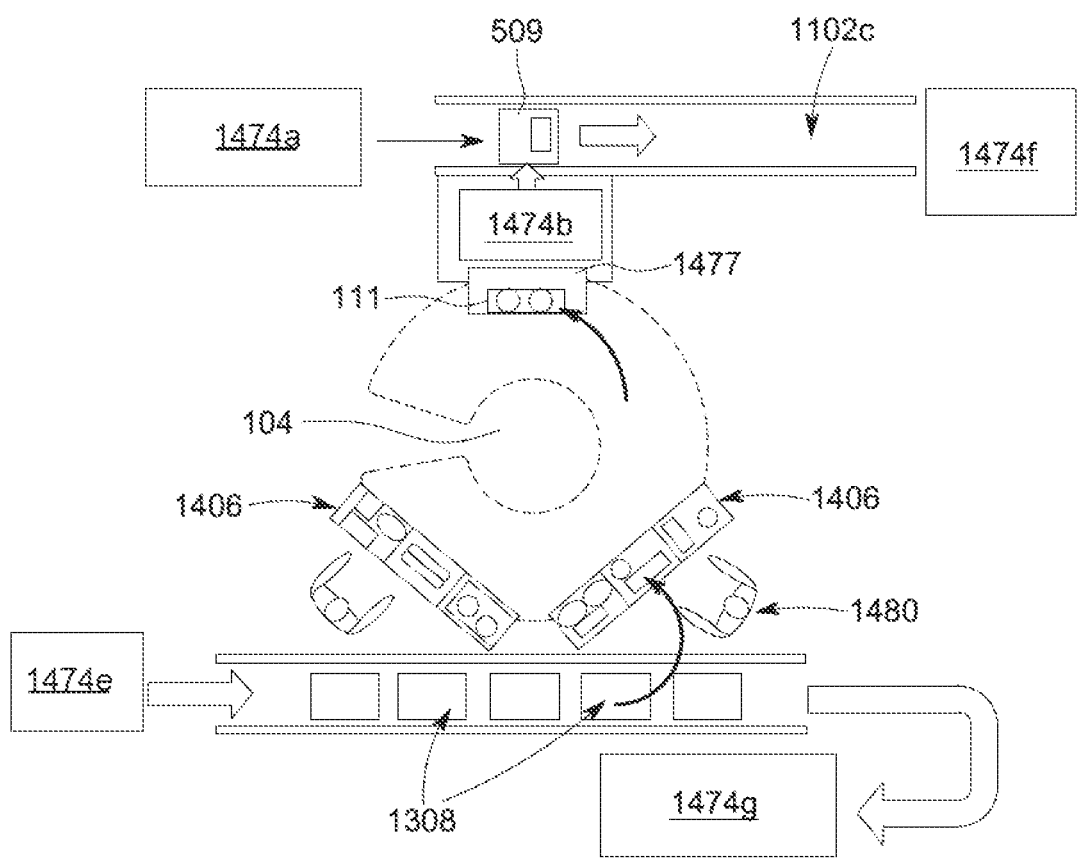

FIG. 14A-14C are schematic diagrams depicting various tote conveyor operations. As shown in these figures, the totes 1308 and items 111 may be selectively moved about the conveyors 1402a, 1402b to cycle to various handling equipment, such as a carton erector 1474a, packager 1474b (e.g., automatic bagging machine or bagger), sealer 1474c, labeler 1474d, loader (e.g., handling robot 114) 1474e, sorter 1474f, picker 1474g, and packer 1474h. While specific configurations are depicted, it will be appreciated that the tote handler 104 may be positioned about one or more forms of the handling equipment 1474a-h and/or conveyors 1402 a, 1402b.

FIG. 14A shows the tote conveyor operation for loading items 111. In this example, the tote 1408 (which may be any tote described herein) advances along the conveyor 1402b. The tote 1408 may be loaded with items 111 as described in FIGS. 7A1-7C. The tote handler 104 may transfer the items 111 from the tote 1408 on the conveyor 1402b to the shipping container 509 on the conveyor 1402a in a manner as described in FIG. 8A. The tote 1408 continues along the conveyor 1402b to return to the picker 1474g to pick up more items 111. The shipping container 509 is formed at the carton erector 1474a, and receives the items 111 from the tote 1408 via the tote handler 104. The shipping container 509 with the items 111 therein advances to the sealer 1474c and is sealed closed. The shipping container 509 then continues to the labeler 1474d to receive the label 1476. The carton 1409 is then sorted using the sorter 1474f in preparation for transport to its final destination.

FIG. 14B shows the tote conveyor operation for loading the items 111 using a manual put wall operation. This version is similar to the tote conveyor operation of FIG. 14A, except that the totes 1308 have batches of items 111 that are first manually transferred to a put wall 1406 by operators 1480, and then transferred from the put wall 1406 to the shipping container 509 using the tote handler 104. The items 111 in the put walls 1406 may be transferred by the tote handler 104 in a similar manner as described in FIGS. 7A1-7B and 8A. While a manual operator 1480 is shown moving items from the totes 1308 to the put wall 1406, a second tote handler 104 may be used to move the items 111 and/or the totes 1308 to the put wall 1406 as described in FIGS. 1A-1D.

FIG. 14C shows the tote conveyor operation for loading the items 111 using the manual put wall operation and an automated packaging operation. This version is similar to the tote conveyor operation of FIG. 14B, except that the conveyor 1402a has been replaced with a polybag conveyor 1402c and an automatic bagger 1474b has been provided in place of the carton erector 1474a, sealer 1474c, and labeler 1474d to perform all of the packaging functions performed thereby. In this version, the items 111 from the totes 1308 are placed in the put wall 1406 as in FIG. 14B, and then passed by the tote handler 104 to the packager 1474*b* for placement in a polybag 1477. Optionally, a loader 1474*e* is provided to load the totes 1308 onto the conveyor 1402*b*. The packager 1474*b* may be a packaging machine similar to the packaging machine 1060 of FIGS. 10A1-10B for receiving the items 111 from the grip hand 116, and then bagging, sealing, and labeling the items 111 for shipment.

FIG. 14D is a flowchart depicting a method 1400 of handling items. The method 1400 involves 1479—providing a tote handler comprising a grip hand with fingers; 1481—providing a tote comprising a tote frame with a chamber for receiving the items therein, the tote frame having tool reliefs therethrough with tool receptacles therebetween; and 1482—removing the items from the tote by passing the fingers of the grip hand through the tool receptacles and lifting the items with the fingers while retracting the grip hand from the tote.

The method 1400 may also involve 1483—selectively inserting the fingers into reliefs in one or more chambers in the tote, 1484—maintaining the items in a pre-determined configuration while moving the items with the grip hand, 1485—stacking the items in pre-determined configurations with the tote handler, 1486—selectively gripping and releasing the items by selectively moving sets of the fingers between and open and closed position, 1487—selectively releasing the items into the tote by selectively extending the fingers a distance into the tote and then moving the fingers apart, 1488—tilting the tote with the grip hand while releasing the items from the grip hand into the tote, 1489—forming a tote wall by stacking the totes, and/or 1490—loading groups of the items into each of the totes on a first side of the tote wall and unloading the groups of the items from each of the totes with the tote handler on a second side of the tote wall.

Part or all of the method may be performed. The method may be performed in any order. Part or all of the method may be repeated as desired.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain tote handling systems comprising various tote conveyors, tote handlers, and totes are provided herein, it will be appreciated that various forms of one or more tote conveyors (or conveyor portions), one or more tote handlers with various tote hands, and one or more totes may be provided. Additionally, various combinations of one or more of the features of the components of the tote handling system may be used. While the figures herein depict a specific configuration or orientation, these may vary. First and second are not intended to limit the number or order.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A tote for a material handling system, the material handling system comprising a mobile carrier and a grip hand comprising fingers, the tote comprising:
   a tote frame movably positionable on the mobile carrier, the tote frame comprising: a bottom; and
   walls extending above the bottom to define a chamber shaped to receive items therein;
   wherein one of the walls comprises a door, the door engageable and movable to an open position by a latch on the mobile carrier;
   wherein at least one of the bottom and the walls comprises tool reliefs, each of the tool reliefs comprising a fixed end and an unfixed end with an elongate body there between, the fixed end of each of the tool reliefs being secured to one of the walls, the tool reliefs being in an aligned positioned parallel to each other with a tool receptacle defined between the tool reliefs, the tool receptacles shaped to receive the fingers of the grip hand therethrough for engagement with the items in the chamber.

2. The tote of claim 1, wherein the walls are positioned along a perimeter of the bottom.

3. The tote of claim 2, wherein the walls further comprise partitions positioned along the bottom and between the walls, the partitions defining sub-chambers within the chamber.

4. The tote of claim 1, wherein the tote comprises additional bottoms, each of the additional bottoms positioned a distance above the bottom, the additional bottoms extending between the walls to define sub-chambers within the chamber.

5. The tote of claim 1, wherein the tote frame is interlockingly connectable to the tote frame of another tote to form a tote wall.

6. The tote of claim 1, wherein the tool reliefs comprise conveyor reliefs extending below the bottom of the tote frame to define conveyor receptacles therebetween shaped to receivingly engage the mobile carrier for movement therewith.

7. The tote of claim 1, wherein the mobile carrier comprises one of: a conveyor, a cart, an autonomous mobile robot, an automated guided vehicle, an automatic storage and retrieval system, a shuttle, and combinations thereof.

8. A grip hand for a material handling system, the material handling system comprising a robot, the grip hand comprising:
   a bearing movably supported by the robot;
   a base slidably movable along the bearing;
   finger assemblies supported by the base, each of the finger assemblies comprising an actuator and fingers, the fingers linked to and extending from the actuator and movable therewith;
   the finger assemblies being movable by the respective actuators towards a closed position wherein the fingers move close together and an open position wherein the fingers move apart; and wherein the fingers are rotatable between a curved and a flat position.

9. The grip hand of claim 8, wherein the finger assemblies are movable by the base between an extended and a retracted position.

10. The grip hand of claim 8, wherein the grip hand further comprises a backing plate secured to the bearing, the fingers extending through the backing plate.

11. The grip hand of claim 8, wherein the grip hand further comprises a finger plate connecting the fingers to the actuator.

12. The grip hand of claim 8, wherein the fingers assemblies are movable between a flat position aligned to each other, an angled position with an angle therebetween, and vertical position parallel to each other.

13. The grip hand of claim 8, wherein a portion of the fingers are extendable from the base.

14. A tote system for handling items,
the tote system comprising: a mobile carrier;
totes positionable on the mobile carrier; and
a tote handler positioned about the mobile carrier, the tote handler comprising:
a foot positioned on a surface;
an arm movably supported on the base; and
a grip hand supported by the arm and movable therewith, the grip hand comprising:
a bearing movably supported by a robot;
a base slidably movable along the bearing; and
finger assemblies supported by the base, each of the finger assemblies comprising an actuator and fingers, the fingers linked to and extending from the actuator and movable therewith;
the finger assemblies being movable by the respective actuators towards a closed position wherein the fingers move close together and an open position wherein the fingers move apart.

15. The tote system of claim 14, wherein the totes form a tote wall.

16. The tote system of claim 14, further comprising a mobile platform, the totes carried by the mobile platform.

17. The tote system of claim 14, further comprising material handling equipment comprising one of: packaging equipment, transfers, additional conveyors, carton erectors, packagers, baggers, sealers, labelers, loaders, sorters, pickers, packers, automatic storage and retrieval systems, and combinations thereof.

18. A method of handling items, the method comprising:
providing a tote handler comprising a grip hand with fingers;
providing a tote comprising a tote frame movably positionable on a mobile carrier, with a chamber for receiving the items therein, the tote frame having tool reliefs therethrough with tool receptacles therebetween,
wherein the tool reliefs comprise conveyor reliefs extending below a bottom of the tote frame to define conveyor receptacles therebetween shaped to receivingly engage the mobile carrier for movement therewith;
removing the items from the tote by passing the fingers of the grip hand through the tool receptacles and lifting the items with the fingers while retracting the grip hand from the tote.

19. The method of claim 18, further comprising selectively inserting the fingers into reliefs in one or more chambers in the tote.

20. The method of claim 18, further comprising stacking the items in pre-determined configurations with the tote handler.

21. The method of claim 18, further comprising maintaining the items in a pre-determined configuration while moving the items with the grip hand.

22. The method of claim 18, further comprising selectively gripping and releasing the items by selectively moving sets of the fingers between and open and closed position.

23. The method of claim 18, further comprising forming a tote wall by stacking the totes.

24. The method of claim 23, further comprising loading groups of the items into each of the totes on a first side of the tote wall and unloading the groups of the items from each of the totes with the tote handler on a second side of the tote wall.

25. The method of claim 18, further comprising selectively releasing the items into the tote by selectively extending the fingers a distance into the tote and then moving the fingers apart.

26. A tote for a material handling system, the material handling system comprising a mobile carrier and a grip hand comprising fingers, the tote comprising:
a tote frame movably positionable on the mobile carrier, the tote frame comprising:
a bottom;
walls extending above the bottom to define a chamber shaped to receive items therein;
wherein at least one of the bottom and the walls comprises tool reliefs, each of the tool reliefs comprising a fixed end and an unfixed end with an elongate body there between, the fixed end of each of the tool reliefs being secured to one of the walls, the tool reliefs being in an aligned positioned parallel to each other with a tool receptacle defined between the tool reliefs, the tool receptacles shaped to receive the fingers of the grip hand therethrough for engagement with the items in the chamber; and
wherein the tool reliefs comprise conveyor reliefs extending below the bottom of the tote frame to define conveyor receptacles therebetween shaped to receivingly engage the mobile carrier for movement therewith.

27. A grip hand for a material handling system, the material handling system comprising a robot, the grip hand comprising:
a bearing movably supported by the robot;
a base slidably movable along the bearing;
finger assemblies supported by the base, each of the finger assemblies comprising an actuator and fingers, the fingers linked to and extending from the actuator and movable therewith;
the finger assemblies being movable by the respective actuators towards a closed position wherein the fingers move close together and an open position wherein the fingers move apart; and
wherein the finger assemblies are movable between a flat position aligned to each other, an angled position with an angle therebetween, and vertical position parallel to each other.

\* \* \* \* \*